US007162387B2

(12) United States Patent
Johnson et al.

(10) Patent No.: US 7,162,387 B2
(45) Date of Patent: Jan. 9, 2007

(54) MEASUREMENT SYSTEM GRAPHICAL USER INTERFACE FOR EASILY CONFIGURING MEASUREMENT APPLICATIONS

(75) Inventors: Brian Johnson, Austin, TX (US); John Breyer, Austin, TX (US); Joseph Albert Savage, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 885 days.

(21) Appl. No.: 10/128,843

(22) Filed: Apr. 24, 2002

(65) Prior Publication Data

US 2003/0001896 A1    Jan. 2, 2003

Related U.S. Application Data

(63) Continuation-in-part of application No. 10/008,792, filed on Nov. 13, 2001, now Pat. No. 6,879,926.

(60) Provisional application No. 60/301,785, filed on Jun. 29, 2001.

(51) Int. Cl.
*G06F 17/00* (2006.01)
(52) U.S. Cl. .................... 702/123; 702/127; 702/119
(58) Field of Classification Search ............... 702/123, 702/127, 119, 176–178, 181, 182–187, 120; 700/85, 86, 81, 17; 715/771, 961, 965, 967, 715/970; 345/440
See application file for complete search history.

(56) References Cited

U.S. PATENT DOCUMENTS

| | | | |
|---|---|---|---|
| 4,812,996 A | 3/1989 | Stubbs | ................... 702/123 |
| 4,868,785 A | 9/1989 | Jordan et al. | ............... 345/440 |
| 4,884,228 A | 11/1989 | Stanley et al. | ............. 702/123 |
| 5,133,045 A | 7/1992 | Gaither et al. | ............... 706/46 |
| 5,136,705 A | 8/1992 | Stubbs et al. | ................ 714/27 |
| 5,155,836 A | 10/1992 | Jordan et al. | ................. 703/23 |

(Continued)

FOREIGN PATENT DOCUMENTS

| | | |
|---|---|---|
| EP | 0 710 910 A2 | 5/1996 |
| WO | 01/59406 A1 | 8/2001 |

OTHER PUBLICATIONS

Microsoft Press Computer Dictionary, 1994, p. 185.*
National Instruments "The Measurement and Automation Catalog 2001", Copyright 2000, pp. 252-255.

*Primary Examiner*—Hal Wachsman
(74) *Attorney, Agent, or Firm*—Meyertons Hood Kivlin Kowert & Goetzel, P.C.; Jeffrey C. Hood; Mark S. Williams

(57) ABSTRACT

System and method for using a graphical user interface (GUI) to generate a measurement task specification (MTS) for performing a measurement task. The measurement task includes measurement and/or signal generation. A measurement task specifier presents a GUI which guides a user in specifying the measurement task. The GUI presents a plurality of GUI elements, e.g., panels, for specifying a plurality of parameters for the measurement task, including measurement type, devices, channels, timing, and/or triggering. The GUI receives user input indicating values for the parameters, and may provide default values for at least some of the parameters. The GUI stores the parameter values in a memory, analyzes the parameter values, and generates the MTS in response to the analyzing. The MTS is then useable to produce a program which implements the measurement task. The specifier may programmatically generate the program, e.g., a graphical program, which is executable to perform the task.

15 Claims, 45 Drawing Sheets

U.S. PATENT DOCUMENTS

| | | | |
|---|---|---|---|
| 5,481,741 A | 1/1996 | McKaskle et al. | 345/522 |
| 5,630,164 A | 5/1997 | Williams et al. | 703/24 |
| 5,764,546 A * | 6/1998 | Bryant et al. | 702/108 |
| 5,812,394 A | 9/1998 | Lewis et al. | 700/17 |
| 5,821,934 A * | 10/1998 | Kodosky et al. | 715/763 |
| 5,926,775 A | 7/1999 | Brumley et al. | 702/127 |
| 5,991,537 A | 11/1999 | McKeon et al. | 717/115 |
| 6,047,219 A * | 4/2000 | Eidson | 700/2 |
| 6,067,584 A | 5/2000 | Hayles et al. | 710/10 |
| 6,096,094 A | 8/2000 | Kay et al. | 717/168 |
| 6,098,028 A | 8/2000 | Zwan et al. | 702/120 |
| 6,128,759 A | 10/2000 | Hansen | 714/738 |
| 6,134,674 A | 10/2000 | Akasheh | 714/33 |
| 6,173,438 B1 * | 1/2001 | Kodosky et al. | 717/109 |
| 6,219,628 B1 | 4/2001 | Kodosky et al. | 703/2 |
| 6,418,391 B1 * | 7/2002 | Umezu et al. | 702/123 |
| 6,647,513 B1 * | 11/2003 | Hekmatpour | 714/37 |
| 6,879,926 B1 * | 4/2005 | Schmit et al. | 702/123 |

* cited by examiner

High-Level Architecture

Acquire N Scans External Scan Clock Digital Trigger (Prior Art)

MEASUREMENT SYSTEM GRAPHICAL USER INTERFACE FOR EASILY CONFIGURING MEASUREMENT APPLICATIONS

CONTINUATION DATA

This application is a Continuation-in-Part of U.S. utility application Ser. No. 10/008,792 titled "Measurement System Software Architecture for Easily Creating High-Performance Measurement Applications" filed Nov. 13, 2001, whose inventors are Geoffrey Schmit, Brent Schwan, Jonathan Brumley, Thomas A. Makowski, and Christopher T. Bartz, and which issued as U.S. Pat. No. 6,879,926, which claims benefit of priority of U.S. provisional application Ser. No. 60/301,785 titled "Measurement System Software Architecture for Easily Creating High-Performance Measurement Applications" filed Jun. 29, 2001, whose inventors are Geoffrey Schmit, Brent Schwan, Jonathan Brumley, Thomas A. Makowski, and Christopher T. Bartz.

BACKGROUND OF THE INVENTION

1. Field of the Invention

The present invention relates generally to the field of measurement and automation systems. More particularly, the present invention relates to a measurement system graphical user interface for allowing a user to easily configure measurement and automation applications.

2. Description of the Related Art

Scientists and engineers often use measurement or automation systems to perform a variety of functions, including measurement of a physical phenomenon or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system includes a computer system with a measurement device or measurement hardware. The measurement device may be or include a computer-based instrument, a data acquisition device or board, a programmable logic device (PLD), a sensor, a smart sensor, an actuator, a signal generator, or other type of device for acquiring or generating data. The measurement device may be a card or board plugged into one of the I/O slots of the computer system, a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or a parallel port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

One drawback of some current measurement system architectures is that complex measurement tasks involving multiple devices require that each device be programmed separately, and that synchronization signals be explicitly routed. Users must typically specify and configure measurement tasks at an advanced level, which is time consuming, expensive, and prone to error. For example, in some prior art systems, users must specify numerous parameter values for channels, timing, and triggering for a measurement task. Typically there is no mechanism for providing default values for the parameters, so that the user must not only know all of the parameters which are needed to specify the task, but must also know what values of the parameters are appropriate for the task. These issues may become more important when multiple devices are utilized to perform the task, in that the number and variety of parameters may increase accordingly.

Additionally, many current measurement systems require that the user perform a significant amount of programming, either in a text-based programming language such as LabWindows or Visual Basic, or in a graphical programming language such as LabVIEW. It would be desirable for a user to be able to more easily create measurement solutions with reduced programming requirements.

Therefore, it would be desirable to provide new systems and methods for specifying and performing measurement tasks.

SUMMARY OF THE INVENTION

A system and method are presented for a measurement system graphical user interface which allows a user to easily configure measurement and automation applications. A measurement task specifier may generate a measurement task specification characterizing a measurement task. The measurement task specifier may display a graphical user interface (GUI) which presents information for guiding the user in specifying the measurement task. The GUI may receive user input characterizing the measurement task, where the user input indicates values for a plurality of parameters of the measurement task. For example, the parameters may include five or more of measurement type, device type, channel parameters, sampling parameters, trigger parameters, clock parameters, scaling parameters, synchronization parameters, routing parameters, and data publishing parameters. The parameter values may be stored in a memory, and analyzed to generate a measurement task specification. The measurement task specification may then be useable to produce a program which implements the measurement task.

The GUI may display a plurality of GUI elements, such as controls and/or indicators, to the user, where each of at least a subset of the plurality of GUI elements presents one or more parameters for the measurement task. As used herein, the term "indicator" refers to any GUI element or component which operates to present information to the user, and the term "control" refers to any GUI element or component which operates to receive input from the user. Examples of GUI elements, i.e., indicators and controls, include panels, menus, tabs, entry fields, buttons, radio buttons, list boxes, active icons, meters, panels, windows, dialog boxes, diagrams, and any other graphical components of a GUI. It is noted that a GUI element may include other GUI elements, such as, for example, a panel which includes one or more indicators and/or controls.

In one embodiment, displaying the graphical user interface may include displaying a plurality of panels which guide the user in specifying the measurement task. The panels presented to the user may be context sensitive, i.e., may depend upon prior user input, or upon prior information presented to the user. For example, the GUI may display a first panel which presents options for specifying values of a first parameter of the measurement task, and receive first user input to the first panel indicating a value of the first parameter. The GUI may then display a second panel which presents information based on the indicated value of the first parameter. The information may indicate a second parameter of the measurement task, and the GUI may receive second user input to the second panel indicating a value of the second parameter of the measurement task. Thus, the particular sequence of panels presented to the user may depend on the user input.

Default values may be provided for at least some of the parameters. For example, the options presented above may include a default value for the first parameter of the measurement task, and the first user input received by the first panel may override the default value with the indicated value, or may indicate acceptance of the default parameter value as the value. Similarly, a default value may be provided for the second parameter, as well, where the second user input may either override the default value of the second parameter with the indicated value of the second parameter, or indicate acceptance of the default value as the value of the second parameter.

In one embodiment, the first panel may present a list of measurement types for the measurement task, and the first user input may indicate a measurement type (from the list) for the measurement task. In response to the first user input specifying the measurement type, the GUI may display a second panel which presents a list of available devices and corresponding channels appropriate for the indicated measurement type, where each of the channels corresponds to a terminal of a corresponding device. In other words, the available devices presented correspond to the indicated measurement type. Second user input may be received by the second panel which indicates one or more channels for a device from the list of available devices and corresponding channels.

The GUI may then display a third panel in response to the second user input, which presents options for specifying values of one or more parameters for the indicated channels. The third panel may receive third user input indicating values of the one or more parameters for the indicated channels. In another embodiment, two or more panel selection controls, e.g., tabs, may be displayed, each corresponding to a respective panel for specifying and/or displaying values of one or more parameters for the indicated channels, e.g., a "settings" panel and a "details" panel. User selection input may be received by one of the two or more panel selection controls, and the respective panel corresponding to the selected panel selection control may be displayed. The selected panel may present options for specifying and/or displaying values of the respective one or more parameters for the indicated channels, and in one embodiment may also receive user input indicating values of the respective one or more parameters for the indicated channels. In one embodiment, the details panel (or its equivalent) may be a "read only" panel which displays parameter values, but which does not allow the values to be set or modified through the panel.

In one embodiment, a device settings panel may be displayed which presents one or more device settings parameters for the measurement task, where the device settings parameters correspond to the selected device. The device settings panel may receive user input indicating values for the presented device settings parameters. A timing panel may also be displayed which presents one or more timing parameters for the measurement task, and which may receive user input indicating values for the presented timing parameters. Similarly, a triggering panel may be displayed which presents one or more triggering parameters for the measurement task, and which may receive user input indicating values for the presented triggering parameters. Thus, a plurality of panels may be displayed for presenting various parameters for the measurement task, and for receiving user input specifying values for the parameters.

In one embodiment, the GUI may also display a help panel which presents context sensitive information related to the measurement task, e.g., information related to other panels (of the plurality of panels). The information presented may be based on which of the other panels are currently displayed. For example, if a panel is displayed which presents channel parameters, the help panel may display information related to the channel parameters, or instructions for specifying values for the channel parameters.

Thus, the GUI may guide the user through a process for specifying values for a plurality of parameters for the measurement task. As mentioned above, the measurement task specifier may then generate a measurement task specification based on the specified parameters, where the measurement task specification is useable to produce a program which implements or performs the measurement task.

In one embodiment, the measurement task specifier may programmatically generate the program which implements the specified measurement task. For example, the GUI may present an option to programmatically generate a program implementing the specified measurement task, and the user may select the option, thereby requesting generation of the program. The measurement task specifier may then generate the program based on the parameter values specified for the measurement task. In another embodiment, the measurement task specifier may generate the program based on the measurement task specification.

The programmatically generated program may be a graphical program, such as a LabVIEW graphical program. A block diagram of the generated program may then be displayed by the GUI, e.g., on a program panel.

In one embodiment, programmatically generating the program may include an expert system analyzing the measurement task specification, and generating a run-time specification for the measurement task in response to the analyzing. The expert system may also validate the measurement task specification prior to generating the run-time specification. A run-time builder may then analyze the run-time specification, and generate a run-time based on the run-time specification. The generated run-time may be executable to perform the measurement task in accordance with the parameters and device(s) specified, i.e., in accordance with the measurement task specification.

BRIEF DESCRIPTION OF THE DRAWINGS

A better understanding of the present invention may be obtained when the following detailed description of the preferred embodiment is considered in conjunction with the following drawings, in which:

FIG. 31B illustrates a VI for acquisition of N scans with an external scan clock digital trigger, according to one embodiment.

Figure 1:
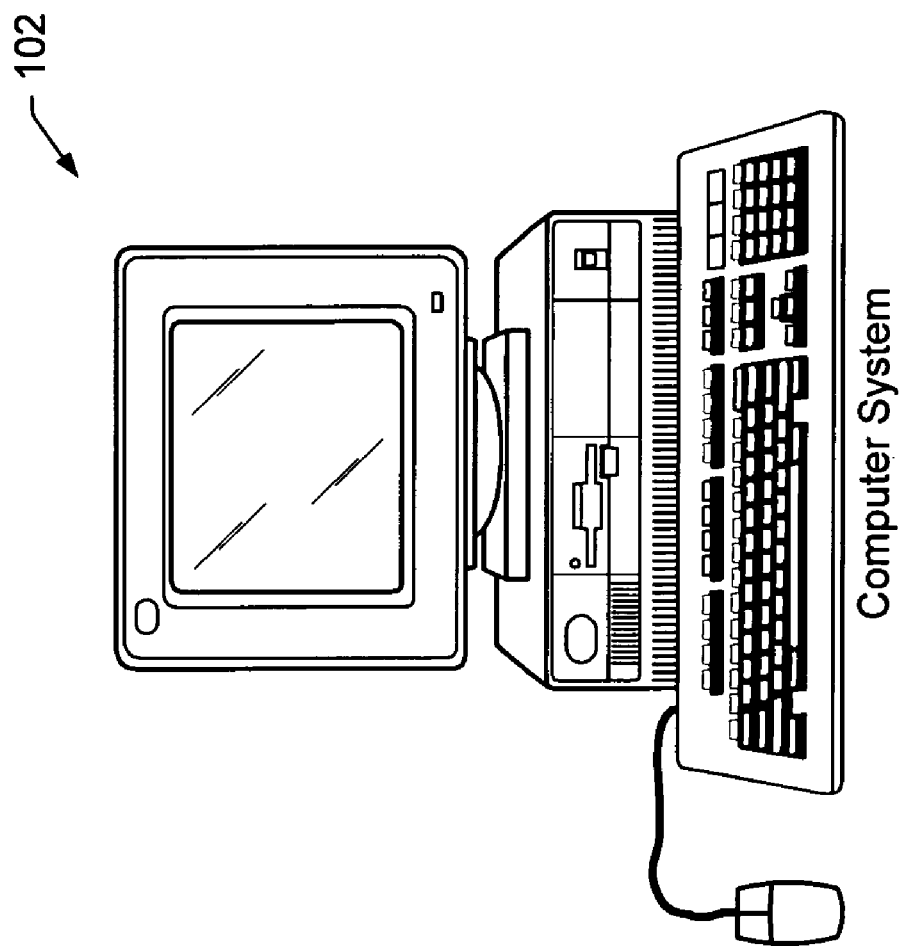
FIG. 1 illustrates an exemplary computer system suitable for implementing various embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

U.S. application Ser. No. 10/008,792 titled "Measurement System Software Architecture for Easily Creating High-Performance Measurement Applications" filed Nov. 13, 2001, and whose inventors are Geoffrey Schmit, Brent Schwan, Jonathan Brumley, Thomas A. Makowski, and Christopher T. Bartz, and which issued as U.S. Pat. No. 6,879,926, is hereby incorporated by reference as though fully and completely set forth herein.

U.S. Provisional Application Ser. No. 60/301,785 titled "Measurement System Software Architecture for Easily Creating High-Performance Measurement Applications" filed Jun. 29, 2001, and whose inventors are Geoffrey Schmit, Brent Schwan, Jonathan Brumley, Thomas A. Makowski, and Christopher T. Bartz is hereby incorporated by reference as though fully and completely set forth herein.

FIG. 1—Computer System

FIG. 1 illustrates a computer system 102 operable to execute various embodiments of the present invention. The computer system 102 may be any type of computer system, including a personal computer system, mainframe computer system, workstation, network appliance, Internet appliance, personal digital assistant (PDA), television system or other device. In general, the term "computer system" may be broadly defined to encompass any device having at least one processor that executes instructions from a memory medium.

As shown in FIG. 1, the computer system 102 may include a display device operable to display operations associated with the methods described herein. For example, the display device may be operable to display a graphical user interface which allows a user to specify or describe a measurement task. The graphical user interface may comprise any type of graphical user interface, e.g., depending on the computing platform. As shown, the computer system 102 may include one or more input devices, such as a keyboard, mouse, etc. The computer system 102 may include one or more processors, e.g., CPUs and/or programmable hardware elements, which may be operable to execute program instructions according to various embodiments of the present invention.

The computer system 102 may include a memory medium(s) on which one or more computer programs or software components according to one embodiment of the present invention may be stored. For example, the memory medium may store one or more software programs which are executable to perform the methods described herein. Also, the memory medium may store a programming development environment application used to create and/or execute measurement software programs. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory or storage as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In addition, the memory medium may be located in a first computer, e.g., computer system 102, or may be located in a second different computer which connects to the first computer over a network, such as the Internet, as described below with reference to FIG. 2. In the latter instance, the second computer may provide program instructions to the first computer for execution.

Figure 2:
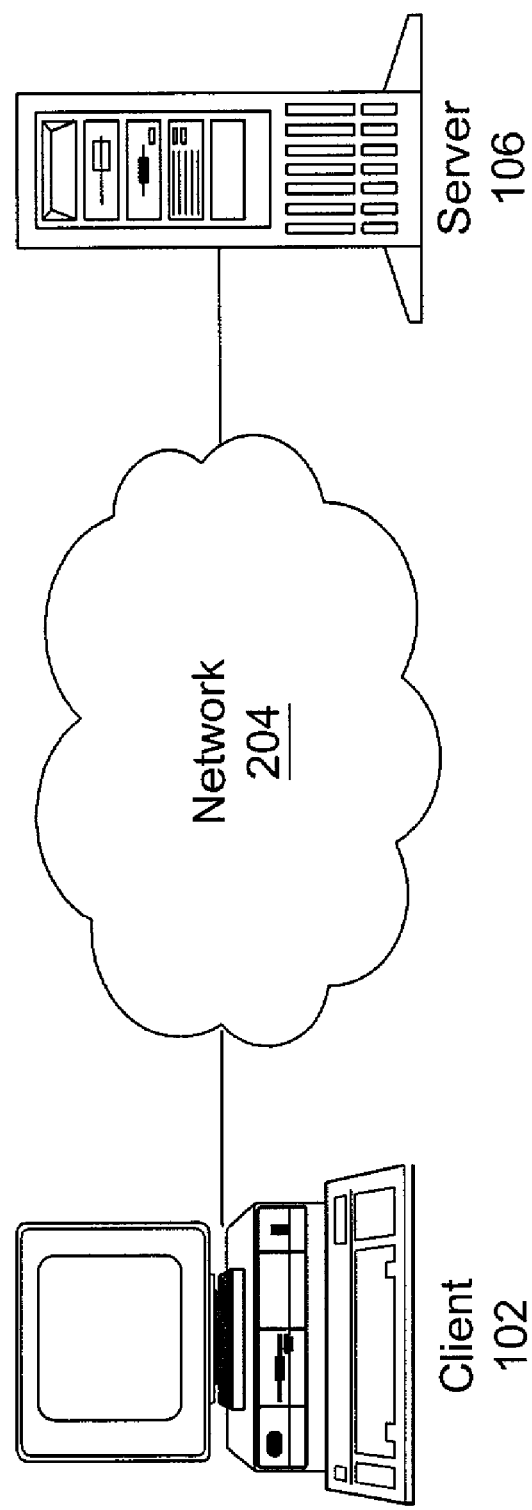
FIG. 2 illustrates the computer system of FIG. 1 coupled to a server across a network, according to one embodiment.

FIG. 2—A Network System

FIG. 2 illustrates a simplified and exemplary network system that operates according to various embodiments of the present invention. In the system shown in FIG. 2 the computer system 102 of FIG. 1 is coupled to a second computer 106, such as a server computer system 106, over a network 204, such as the Internet, or a computer bus. Thus, FIG. 2 illustrates an exemplary distributed system which may be suitable for implementing the methods described herein. The computer systems 102 and 106 may each be any of various types as desired, as described above. Also, the network 204 can also be any of various types, including a LAN (local area network), WAN (wide area network), the Internet, or an Intranet, among others. The transmission medium coupling the systems may include any wired or wireless media, as are well known in the art. Thus, in one embodiment, the host computer 102 and the server computer 106 may comprise a distributed system.

As used herein, the term "distributed system" is intended to include a system comprising two or more interconnected or coupled devices, i.e., two or more devices that are coupled together in some fashion. The two or more devices may be coupled together via wired or wireless means. Wired means may include a network, such as a local area network (LAN) and/or a wide area network (WAN), such as the Internet, a computer bus, a serial or parallel bus, or other wired communication methods. Example local area networks include Ethernet networks, Token Ring networks, and various industrial communication networks such as fieldbus, DeviceNet, and CAN (Controller Area Network) networks. Example parallel buses include the PCI bus, PXI bus, GPIB, and VXI bus, among others. Example serial buses include USB (Universal Serial Bus), IEEE 1394, RS-242, and RS-485, among others. Wireless means may include wireless protocols such as IEEE 802.11 (wireless Ethernet), Bluetooth, and other types of wireless communication.

In one embodiment, the server 106 may store programs, applications, or data which may be accessed or retrieved by the host computer system 102. Thus, the server 103 may store measurement task specification software or information, for example, in a database or library. The computer system 102 may access the server 106 to retrieve data or execute software to implement various embodiments of the system and method described herein.

Figure 3A:
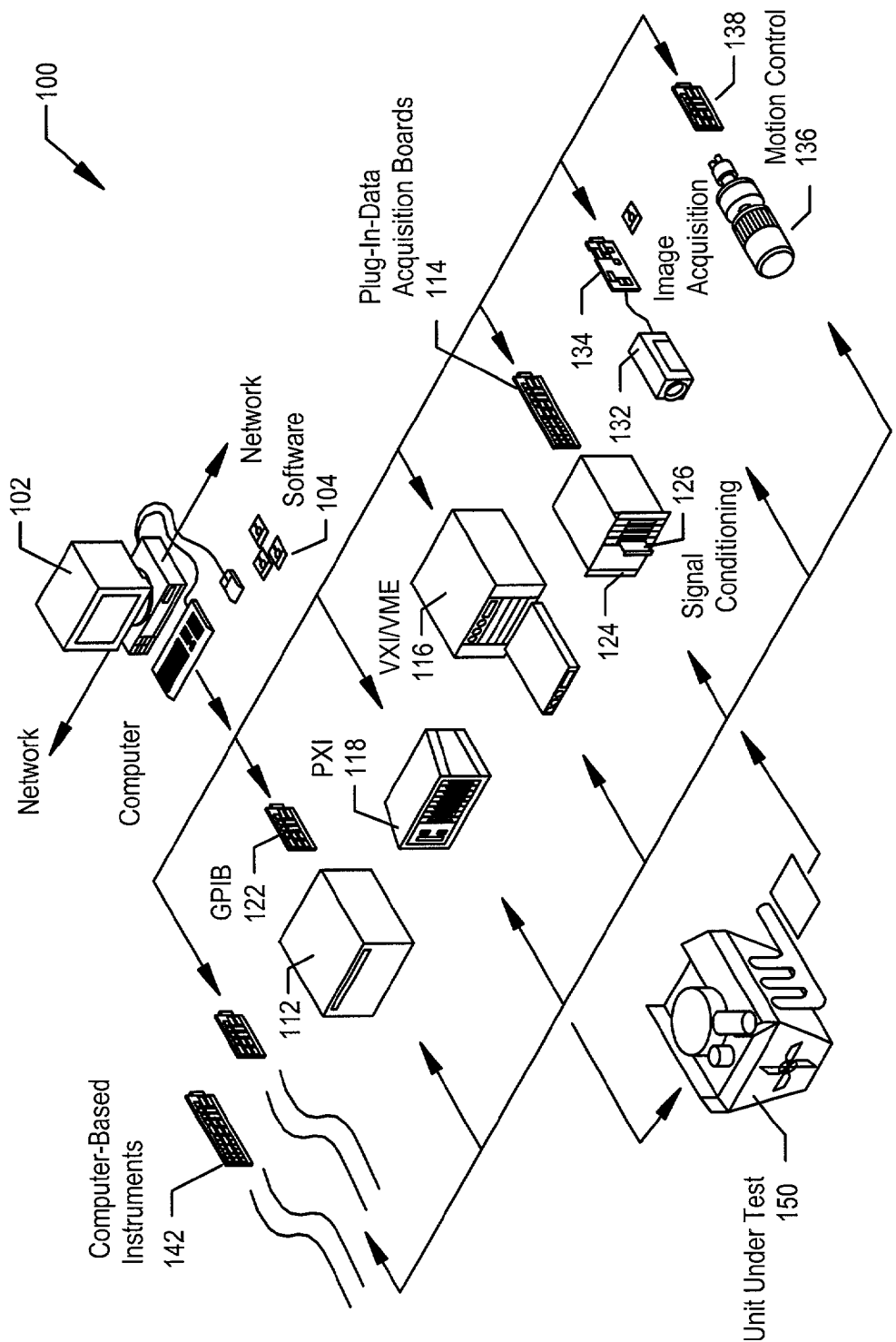
FIGS. 3A and 3B illustrate representative instrumentation and process control systems, including various I/O interface options.
Figure 3B:
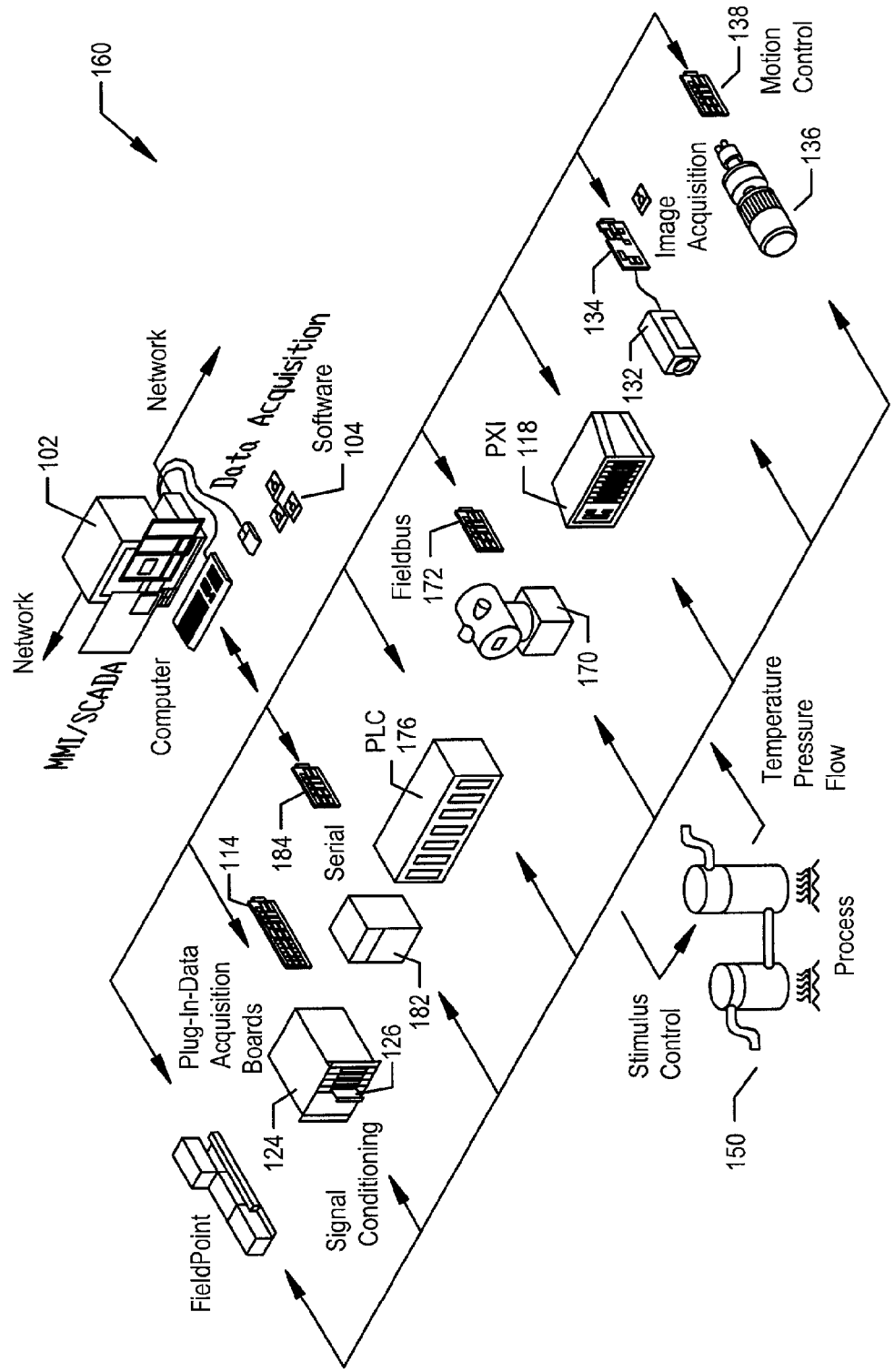

FIGS. 3A and 3B—Instrumentation and Industrial Automation Systems

FIGS. 3A and 3B illustrate exemplary measurement and automation systems. As used herein, the term "measurement system" is intended to include the types of measurement systems and automation systems shown in FIGS. 3A and 3B, as well as other types of systems. The measurement system shown in FIGS. 3A and 3B may include software programs according to one embodiment of the present invention. These programs may of course be stored in or used by other types of systems as desired. In accordance with one embodiment of the present invention, the present system and method includes a novel software architecture and novel software programs for allowing users to more easily create measurement and automation tasks (collectively referred to as "measurement tasks"), verify functionality, and easily create application code to implement desired tasks.

As used herein, the term "measurement system" is intended to include an instrumentation system such as that shown in FIG. 3A, an industrial automation system such as that shown in FIG. 3B, or a modeling or simulation system involved with the design, validation or testing of a product involving "real world I/O", i.e., the acquisition or generation of data to/from a model or simulation of a device or product being designed, validated or tested, such as hardware-in-the-loop validation. The term "measurement" may include instrumentation measurement, data acquisitions, automation, control, and simulation.

FIG. 3A illustrates an exemplary instrumentation control system 100. The system 100 may comprise a host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. These cards 122, 134, 138, 114 may also connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100 may be used in a data acquisition and control application, in a test and measurement application, a process control application, a man-machine interface application, or a simulation application.

FIG. 3B illustrates an exemplary industrial automation system 160. The industrial automation system 160 may be similar to the instrumentation or test and measurement system 100 shown in FIG. 3A. Elements which are similar or identical to elements in FIG. 3A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 3B, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system 102 and/or one or more of the instruments or devices may include a memory medium (or memory mediums) on which software according to the present invention may be stored. The memory medium may store a measurement task specifier, and optionally, an expert system, a plurality of experts, a run-time builder, and/or a plurality of measurement primitives. Additionally, the memory medium(s) may store various products produced by or with these software components, such as a measurement task specification, a run-time specification, and/or a run-time, all of which are described in more detail below. The memory medium(s) may also store configuration information for one or more of the above software programs.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested. However, it is noted that the present invention can be used for a plethora of applications and is not limited to instrumentation or industrial automation applications. In other words, FIGS. 3A and 3B are exemplary only, and the software programs and software architecture may be used for any of various purposes and may be stored in and execute on any of various types of systems to perform any of various applications.

Figure 4:
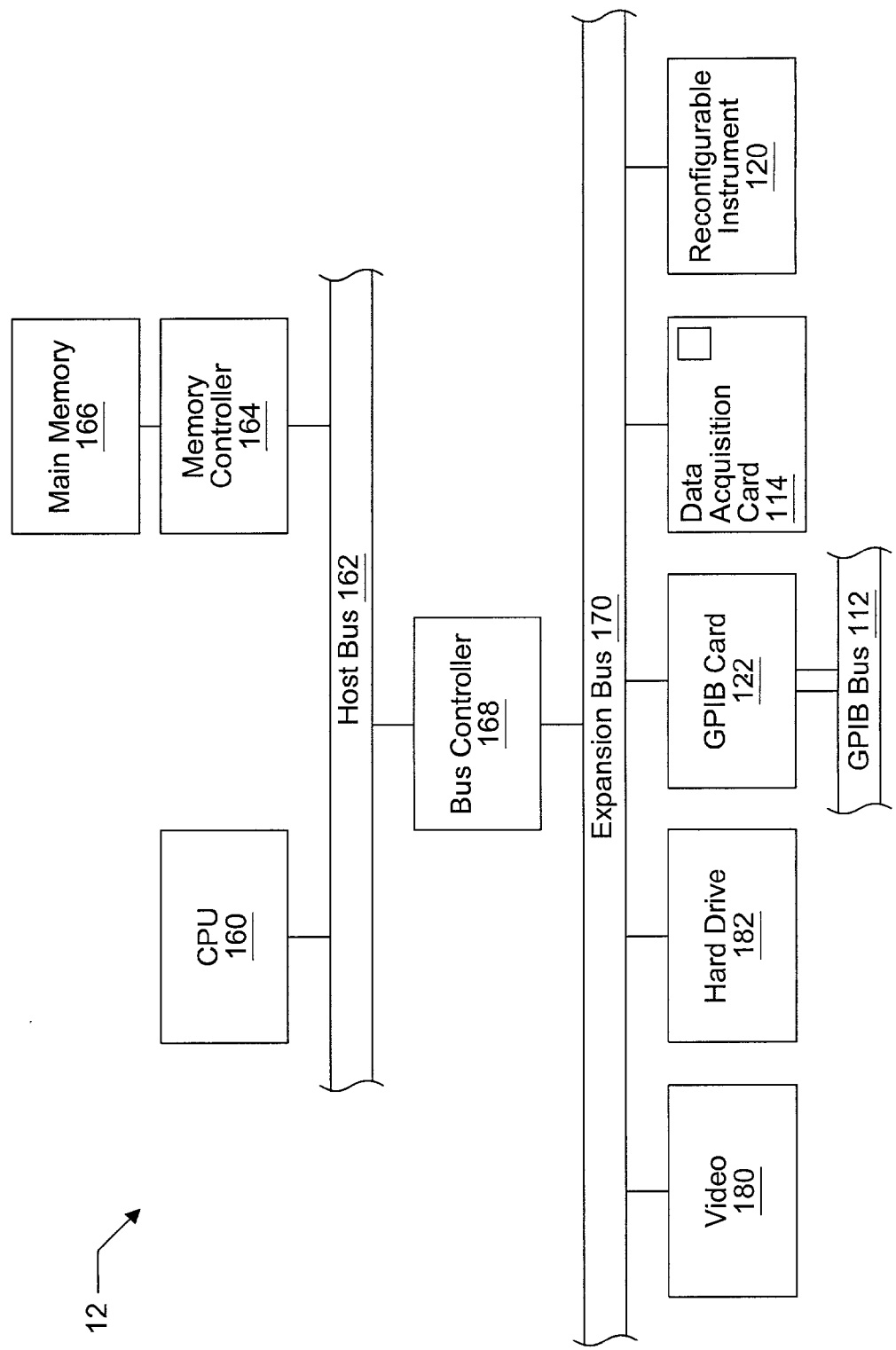
FIG. 4 is a block diagram of the computer system of FIGS. 1, 2, 3A and 3B.

FIG. 4—Computer System Block Diagram

FIG. 4 is an exemplary block diagram of the computer system illustrated in FIGS. 3A and 3B. It is noted that any type of computer system configuration or architecture can be used in conjunction with the system and method described herein, as desired, and FIG. 4 illustrates a representative PC embodiment. It is also noted that the computer system may be a general purpose computer system such as illustrated in FIGS. 3A and 3B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 3A), a GPIB interface card 122 which provides a GPIB bus interface to the GPIB instrument 112 (of FIG. 3A), and a reconfigurable instrument 120. Note that as used herein, the term "reconfigurable instrument" refers to an instrument with one or more of:

1) a processor and memory which is capable of being configured by a user or software program; and/or 2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 5:
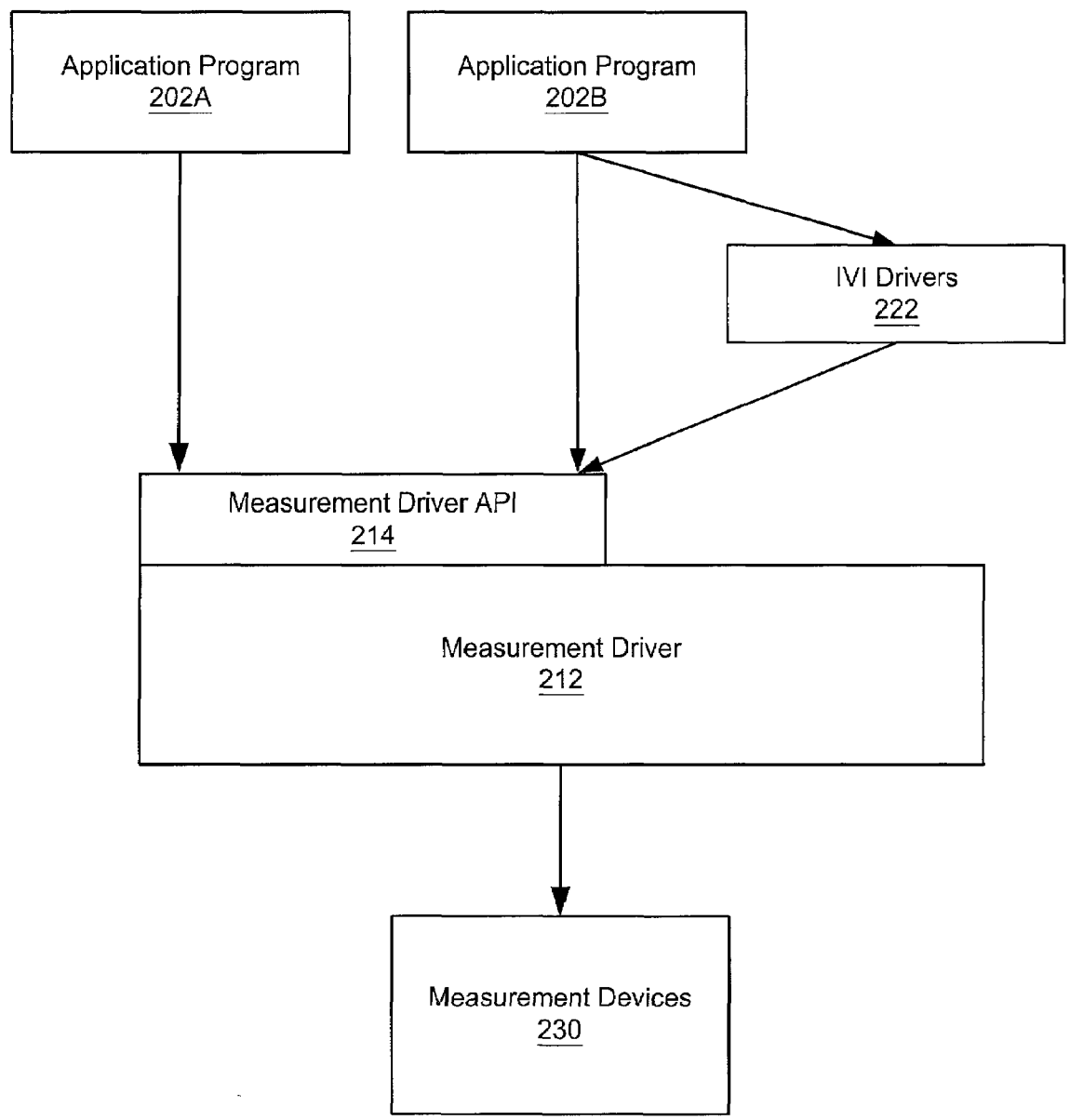
FIG. 5 illustrates one embodiment of a software architecture of a measurement system.

FIG. 5—Creating a Measurement Solution

FIG. 5 illustrates one embodiment of a software architecture for a system such as a measurement system. As shown, the system may include one or more application programs 202. The application programs are typically developed by a user to accomplish a certain task or achieve a certain result. Thus, the application program is typically a user created or developed program to solve a desired problem or accomplish a desired result for the user. It is noted that in addition to user-developed applications, programmatically generated application programs are also contemplated. The application program 202 may be developed in any of various development environments. For example, the application program may be an application developed in the LabVIEW graphical programming environment of National Instruments Corporation. The application program 202 may also be developed in other applications, such as National Instruments Measurement Studio, Visual Basic, Visual C++, Delphi, or other programming development environments. Thus, the application program may be developed in graphical programming environments such as LabVIEW, or a text-based programming environment such as Measurement Studio or Visual Basic. The application program 202 may thus comprise the customer's entire measurement system, and may include many more features and functions in addition to managing the particular measurement task specification and run-time generation, such as data analysis, report generation, or other higher-level functions of the measurement system.

As shown, the application 202 communicates with a measurement driver 212. The measurement driver 212 may include a measurement driver application programming interface (API) 214. As shown, the application program 202A or 202B interfaces with the measurement driver API 214 in order to access capabilities of the measurement driver 212. In this measurement example, the software architecture may also include interchangeable virtual instrument (IVI) drivers 222 wherein the application program 202B may interface through IVI drivers 222, which interface with the measurement driver API 214, to interface with the measurement driver 212.

The measurement driver 212 interfaces to the one or more various measurement devices 230 comprised in this system. The measurement devices 230 may comprise any of the various devices discussed above with respect to FIG. 5A or 3B and may comprise other devices not shown in FIGS. 3A and 3B as desired. In one embodiment, at least one of the one or more measurement devices comprises a hardware measurement device. In another embodiment, at least one of the one or more measurement devices comprises a virtual measurement device.

In one embodiment, the present invention provides an improved system and method for creating application programs, such as application programs 202A and 202B. The measurement driver 212 preferably includes various software that may allow creation of an application program 202A or 202B using a high-level interface and requiring reduced user effort and coding.

Figure 6:
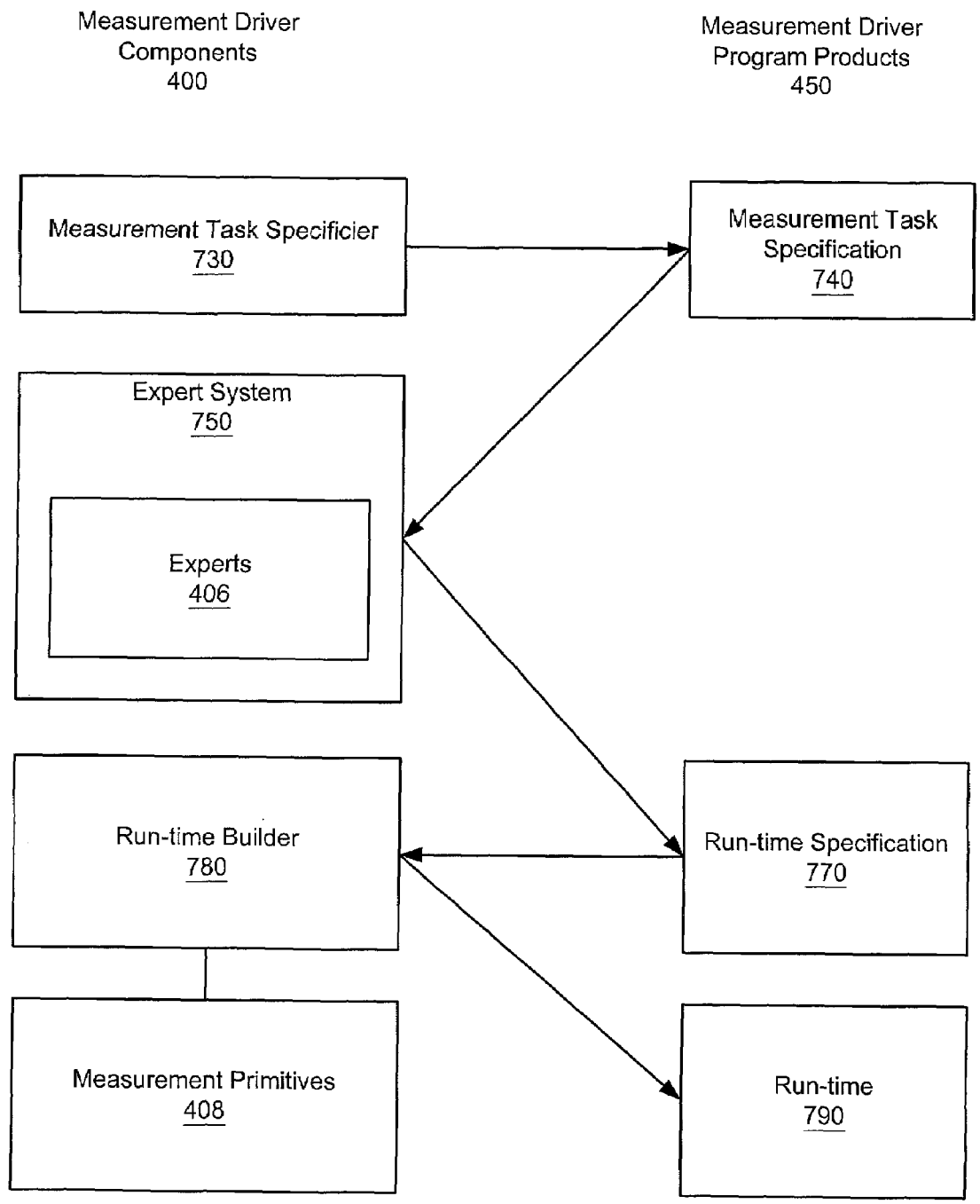
FIG. 6 illustrates measurement driver program components, according to one embodiment.

FIG. 6—Measurement Driver Program Components

FIG. 6 illustrates various software components or programs 400 comprised in the measurement driver program 212. As shown, the measurement driver program 212 may include a measurement task specifier 730, and optionally, an expert system 750 with one or more experts 406, a run-time builder 780, and/or various measurement primitives 408. The measurement driver 212 may include other software components as well.

As FIG. 6 also illustrates, various of the measurement driver components may be operable to generate respective products 450 which may be useable by other measurement driver components, by other software programs or systems, or by a user. More specifically, as shown in FIG. 6, in one embodiment, the measurement task specifier 730 may be operable to generate a measurement task specification 740, also referred to as a task specification. It is noted that the specified measurement task may include both measurement (i.e., inputs) and generation (i.e., outputs) type tasks. For example, in a testing application, the measurement task may include generating one or more signals for excitation or stimulation of an UUT, as well as measuring the response of the UUT to the generated signal(s). The generated signal(s) may also include signals for triggering, synchronization, communication, control, or other functions, as desired. Examples of generated signals include sine wave, square wave, gaussian pulse, and sawtooth waveforms, among others.

In one embodiment, the measurement task specification 740 may comprise software objects or data structures, such as C++ objects, which may specify the measurement task. In one embodiment, the measurement task specifier 730 may be a measurement task wizard, i.e., a software program which leads the user through a measurement task specification process to create the measurement task specification 740. In another embodiment, the measurement task specifier 730 may take the form of a measurement task configuration tool, which is a software program invocable by the user under a development environment, such as the National Instruments LabVIEW environment or Measurement Studio programming development environment. In yet another embodiment, the measurement task specifier 730 may simply be an API through which the user makes calls to generate the task specification. Thus, in various embodiments, the measurement task specifier 730 may generate the measurement task specification 740 in response to user input.

As shown, an expert system 750 may use the measurement task specification 740 to generate a run-time specification 770. The expert system 750 may include a plurality of experts. The expert system 750 may include one or more experts for each of the measurement device types shown in FIGS. 3A and 3B, in addition to various other experts, including routing experts, streaming experts, and synchronization experts, among others. In one embodiment, the expert system 750 may also be utilized by the measurement task specifier 730 in generating the measurement task specification 740. For example, the measurement task specifier 730 may invoke the expert system 750 to validate the measurement task specification 740. In other words, the expert system 750 may analyze the measurement task specification 740 to verify that the specified task is implementable with available software and/or hardware, and/or that the measurement task specification 740 is internally and/or externally consistent. For example, the expert system 750 may detect that two components or sub-tasks specified in the measurement task specification 740 are mutually incompatible, and report an error accordingly.

In one embodiment, the run-time specification 770 may similarly comprise software objects or data structures, such as C++ objects, which may specify the run-time parameters for software and/or hardware used to implement the specified measurement task. The run-time specification 770 may comprise parameter specifications for one or more measurement primitives 408 which correspond to rudimentary measurement tasks or operations. Said another way, the run-time specification 770 may comprise a collection of primitive settings, each of which may comprise a detailed and unambiguous "recipe" for a primitive. For example, primitive settings for a digitizer, such as a National Instruments E-Series digitizer, may include: Dither (Yes, No), Polarity (Bi-polar, Uni-polar), Gain, Mode (Calibration, Differential, Non-Referenced Single-Ended, Referenced Single-Ended, Auxillary, Ghost), Generate Trigger (Yes, No), and Last Channel (Yes, No).

The run-time specification 770 may in turn be interpreted by the run-time builder 780 to generate a run-time 790, which may be executable to perform the specified measurement task. More details of the operation of the measurement driver program are presented below with reference to FIG. 7.

Figure 7:
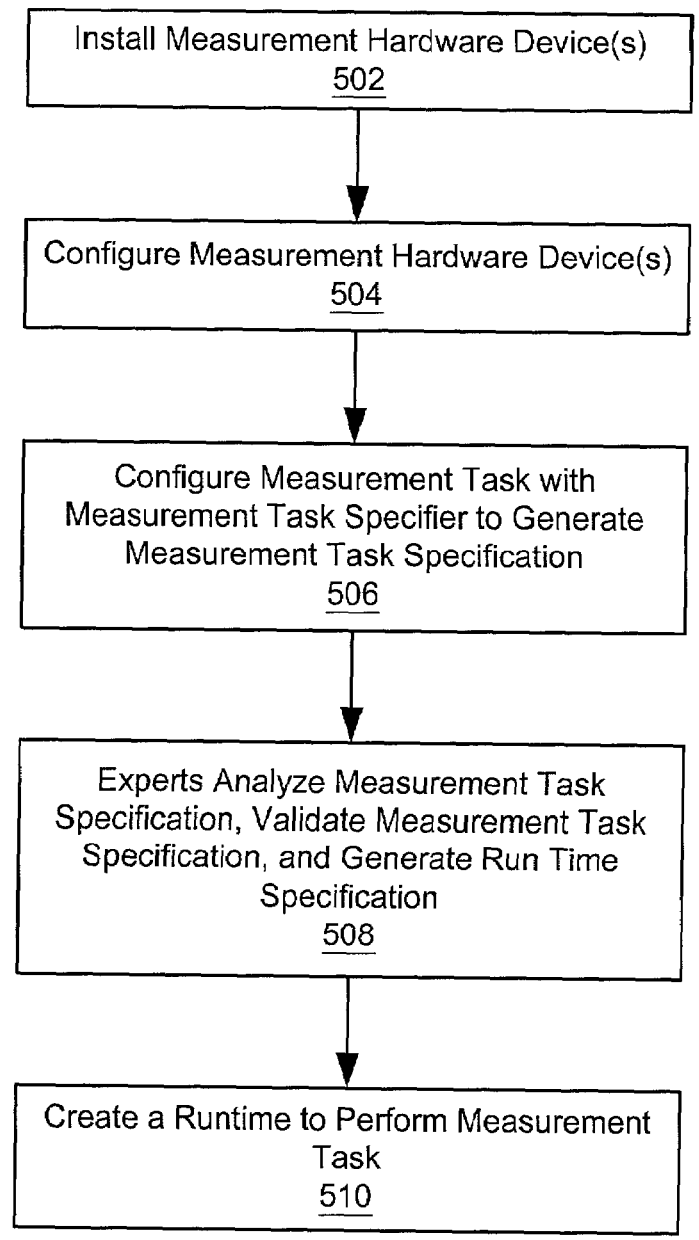
FIG. 7 flowcharts a measurement process, according to one embodiment.

FIG. 7—Method for Performing a Measurement Task

FIG. 7 is a flowchart diagram illustrating one embodiment of the operation of the measurement system, the method being used to configure installed measurement hardware devices and to specify and create a measurement task or application program to operate the measurement system. In one embodiment, the measurement task may comprise a plurality of measurement sub-tasks. In another embodiment, the measurement task may comprise a complex measurement operation using a plurality of measurement devices. It is noted that the flowchart of FIG. 7 is exemplary only. Further, various steps in the flowchart of FIG. 7 may occur concurrently or in different order than that shown, or may not be performed, as desired. Also, various steps may be added as desired.

As shown, in step 502 a user may optionally install measurement hardware within the system. This may comprise connecting a measurement device to the computer system or installing a measurement card or board within a slot of the computer system. This may further comprise installing a measurement card or board in a slot of a chassis, such as a PXI chassis, which itself is coupled to the computer system and/or which may contain a computer system comprised on a card within the chassis. In one embodiment, the measurement hardware may comprise a "reconfigurable measurement device" which may be operable to be reconfigured "on the fly" during a measurement task or operation. For example, the reconfigurable measurement device may include a processor and memory or an FPGA that may be reconfigured with different measurement programs or tasks.

In step 504 the computer system and/or the user may optionally configure the measurement hardware device(s). This may involve operation of standard Plug & Play software to recognize the measurement device and select setting or parameters for the device. It should be noted that in many instances, the user may not be required to perform 502 and/or 504 before generating the measurement task. In other words, the measurement hardware may already be installed and configured and the user may proceed with the configuration and specification of the measurement task in step 506. In another embodiment, "stub" interfaces may be provided, e.g., in software, which emulate the presence of measurement devices, allowing the user to design or specify the measurement task without actually installing the necessary hardware and/or software.

In step 506 the user may invoke the measurement task specifier 730 to configure a desired task in the measurement driver 212, thereby producing a measurement task specification 740. In the preferred embodiment, the measurement task specifier 730 includes an interactive Graphical User Interface (GUI) configuration tool which enables the user to easily and simply configure a desired measurement task. This may involve selecting various parameters of the task such as the type of measurement being performed, e.g., voltage, current, etc., and other measurement settings.

In one embodiment, once the task has been specified, the user may add specification objects, modules, or code, specifying start, read/write, and/or cleanup operations to the task specification. In one embodiment, once the task has been specified, the user may request the task specifier 730 to generate code. The task specifier may then programmatically generate code specifying start, read/write, and/or cleanup operations, among others. In various embodiments, this generated code may comprise one or more icons in a LabVIEW graphical program (i.e., VIs), as described in more detail below, and/or function calls in a text-based program including one or more of C code, C++ code, C# code, Java code, Visual Basic code, or any other form of computer program code, which may specify support operations needed to implement the specified measurement task. In one embodiment, the generated code may comprise icons representing some or all of the specified measurement task operations, including clocking and trigger operations, among others. In one embodiment, the task specifier 730 may generate the icons and connect them together appropriately. In another embodiment, the task specifier 730 may generate the icons, but the user may be required to link the icons appropriately. Thus, in one embodiment, the method may include generating a measurement task diagram in response to user input specifying the measurement task. In one embodiment, the measurement task diagram may comprise a graphical program, such as a LabVIEW graphical program. Further details of programmatic generation of a graphical program are presented below with reference to FIGS. 27, and 28A–28G.

It should be noted that a node for use in a graphical program typically includes a graphical icon which may be displayed in the graphical program to visually represent the node in the graphical program. A node for use in a graphical program may also include underlying program instructions and/or data structures which perform the functionality of the node. When the present application states that a node performs a function, it is understood that the program instructions and/or data structures of the node actually perform this function. Thus, the graphical icon that visually represents the node represents the function, and the underlying program instructions and/or data structures which are represented by the node graphical icon are actually performing the function. Thus the specification and claims of the present application refer generally to a node performing a function, it being understood that the node includes or represents underlying program instructions and/or data structures which are executed by a processor (or programmable hardware element) to perform the function.

In another embodiment, the user may specify the task manually. For example, the user may use a graphical programming development environment such as LabVIEW to place one or more icons or nodes on the display and connect them in a desired way to accomplish the desired result. In one embodiment, the user may select a small number of function icons or nodes, such as a measurement read node or measurement write node, to accomplish the configured measurement task. As another example, the user may use the Measurement Studio programming development environment from National Instruments Corporation (e.g., LabWindows/CVI) to create a text-based program to accomplish the measurement task. This text-based program would typically comprise very few lines of code. Thus, complex measurement procedures may be encapsulated and represented by simple icons or function calls, allowing the user to rapidly and easily create measurement "programs" to implement or carry out complex measurement operations.

In one embodiment, the measurement task specifier 730 may comprise a measurement task wizard. In other words, the measurement task specifier 730 may be a software program which leads the user through a measurement task specification process, thereby generating the measurement task specification 740. In another embodiment, the measurement task specifier 730 may comprise a measurement task configuration tool. The measurement task configuration tool may be a software program invocable by the user within a development environment, such as National Instruments' LabVIEW environment, Measurement Studio programming development environment, or any other development environment. For example, the user may specify or configure a measurement task by placing or "dropping" nodes or icons on a graphical diagram and connecting the nodes via virtual "wires" to generate a graphical diagram or model of the measurement task. The graphical development environment program (e.g., LabVIEW) may generate software objects or data structures corresponding to the components of the graphical diagram which specify the measurement task. These data structures may comprise the measurement task specification 740. In one embodiment, at this stage the measurement task specification 740 is not executable per se, but provides information which may be used by other components of the system to generate a measurement application suitable to carry out the measurement task, i.e., to implement the specified measurement operation.

In another embodiment, the measurement task specifier 730 may be an API through which the user makes calls to generate the task specification. For example, the user may make API function calls in a C++ application program to specify the various attributes or aspects of the desired measurement task, such as measurement type (voltage, current, pressure, etc.), timing or sampling parameters, or other measurement task specification information. The executed functions may produce corresponding data structures which contain specification information for the measurement task. When the application program 202 is executed, the API function calls may generate the measurement task specification 740, which may then be used later in the execution process to produce the run-time specification, as described below.

In step 508 an expert system comprised in the measurement driver may operate to receive the measurement task specification 740, then analyze the measurement task specification 740, validate the measurement task specification 740, and create a run-time specification 770 based on the measurement task specification 740. The run-time specification 770 preferably comprises parameter settings for one or more measurement devices and other hardware comprised within the system, and may also specify software components or software programs which are to be used during execution of the task. In one embodiment, the run-time specification 770 may comprise a specification of the parameters of one or more measurement primitives, where each measurement primitive comprises a software object and corresponding configuration settings, and where each measurement primitive is operable to implement at least a portion of the measurement task. Thus, the run-time specification 770 may be useable to configure one or more measurement devices to perform the measurement task, and may be further useable to generate a run-time 790 which is executable to perform the measurement task using the configured one or more measurement devices. The measurement driver 212 may include expert system 750 comprising the plurality of experts 406 where one or more experts 406 are available for each of the various types of measurement tasks or sub-tasks. Thus, depending upon the type of measurement task configured by the user in step 506, one or more corresponding experts 406 may be invoked to create the run-time specification. In one embodiment, multiple experts may each produce a candidate run-time specification. Thus, the measurement task specification 740 may be used in step 508 to ensure that the measurement task can operate as configured by the user.

In one embodiment, one or more of the generated measurement task specification 740, the generated run-time specification 770, and configuration information for the one or more measurement devices may be stored, such as in a memory medium, e.g., a computer system's RAM or persistent storage medium.

In one embodiment, the run-time builder 780 may analyze the selected run-time specification 770, and then reserve one or more resources, such as hardware and/or software, according to the selected run-time specification 770. The run-time builder 780 may also un-reserve resources if the analysis of the selected run-time specification indicates that previously reserved resources are no longer needed to implement the measurement task. In another embodiment, the run-time builder 780 may handle abnormal process termination and/or unexpected device removal.

In step 510 a run-time 790 may be created which embodies or implements the measurement task configured in step 506 based on the generated (and/or selected) run-time specification 770. In one embodiment, the run-time 790 may comprise a collection of measurement operation primitives (or instances of measurement operation primitives) sequenced together which are executable to implement the measurement task.

When the user (or software program) enters input to execute or run the program, the measurement driver 212 may invoke the run-time builder program. The run-time builder program operates to access the run-time specification and use the parameters and data contained in the run-time specification to assist in creating the run-time at run time. In one embodiment, the run-time builder uses the run-time specification to instantiate instances of various objects or primitives comprised in the measurement driver 212. After the run-time builder instantiates various instances of objects, the run-time builder may apply various parameters from the run-time specification to these object instances. The run-time builder may also provide various parameters to hardware and/or software resources or devices comprised in the system to configure the hardware and/or software devices in the system according to the run-time specification to allow these devices to be used during execution of the run-time 790. In other words, the run-time builder 780 may configure one or more measurement devices according to the run-time specification 770. After the run-time builder 780 has completed creating the run-time 790, the run-time may be executable to perform the task specified by the user.

After step 510 the user (or a software program) may execute the run-time 790 to perform the measurement task. In other words, the run-time execution may invoke the various configured hardware and/or software components to perform the specified measurement task.

It should be noted that the above method, described in terms of a measurement task, may also be applied to other types of tasks, as well, including, but not limited to, machine vision, scientific, engineering, financial, business, e-commerce, and medical tasks, among others.

Further details of the program generation are described below with reference to FIG. 9, FIG. 12, and FIGS. 27–28G.

Examples of Measurement Problems

Below are listed several example problems suitable for solution by various embodiments of the present invention. It should be noted that these solutions are for example purposes only, and are not intended to limit the domains of application of the present invention.

1. Point of Sale Configuration: Given all the hardware and software in the National Instruments catalog and a single computer, determine a set of hardware, hardware connections, hardware settings, and software configuration that can maintain a level in a tank (whose simulated linear model is specified to be M) by monitoring the present value of the tank level and controlling a valve connected to the tank. The solution should display the tank level and valve position on an HMI. Constraints include cost <$10000 and standard deviation of the tank level <D. Preference is for the lowest cost solution.

2. Out of the Box Configuration: Given 2 thermocouples, a National Instruments SCXI 1102 module, a National Instruments SCXI-1000 chassis, a National Instruments PCI-MIO-XE-50, and a set of appropriate terminal blocks cabling, determine the hardware connections (in the form of a wiring diagram), hardware settings, and software configuration for monitoring the two temperature values at a rate of 10 Hz each, with an accuracy=A and precision=P for each temperature measurement.

3. Run-time Configuration: Given a high-frequency switch connected to three 2-channel scopes, determine the hardware settings and software configuration for measuring the waveform, overshoot, and rise time of a set of five simultaneous 10 MHz digital clock signals connected to the switch. The accuracy and precision of the measurements must meet certain requirements, and all 5 measurements should be synchronized to a start event which is triggered by a high level of the first digital clock. (The solution should take into account the signal delays from various routings through the switch).

In various embodiments, the present invention may include some or all of the following features:

1. Interactive design—the user may not have to specify a complete specification up front. Instead, the system may ask the user for more information as needed. For instance, while the system is building a solution, it may encounter one or more possibilities and may ask the user to specify new preferences at that point.

2. Graphical and visual display of system specifications and realizations (including text-based displays where appropriate)—The system may display realizations so that they can be edited directly.

3. Extensibility—ability to add new measurement methods/drivers to the system and use those methods in a derived realization as the system evolves over time to include more domains. The user is able to participate in this process by adding custom measurement methods. The system may be extended with new measurement methods/drivers in multiple independent efforts (i.e. with independent releases). Groups of extensions may be packaged with different products and installed separately.

4. Visibility—ability for the user to see solutions generated by the system and extend and modify those solutions.

5. Robustness—ability to detect and help correct invalid specifications and invalid realizations.

The features mentioned above may allow the user to specify and execute a measurement task in substantially less time and with substantially less effort than previous methods. In addition, the system described may prevent the user from implementing a measurement solution which is inappropriate for the available resources. Further details of the system design, architecture, and operation are described below with reference to FIGS. 9–12.

Figure 8:
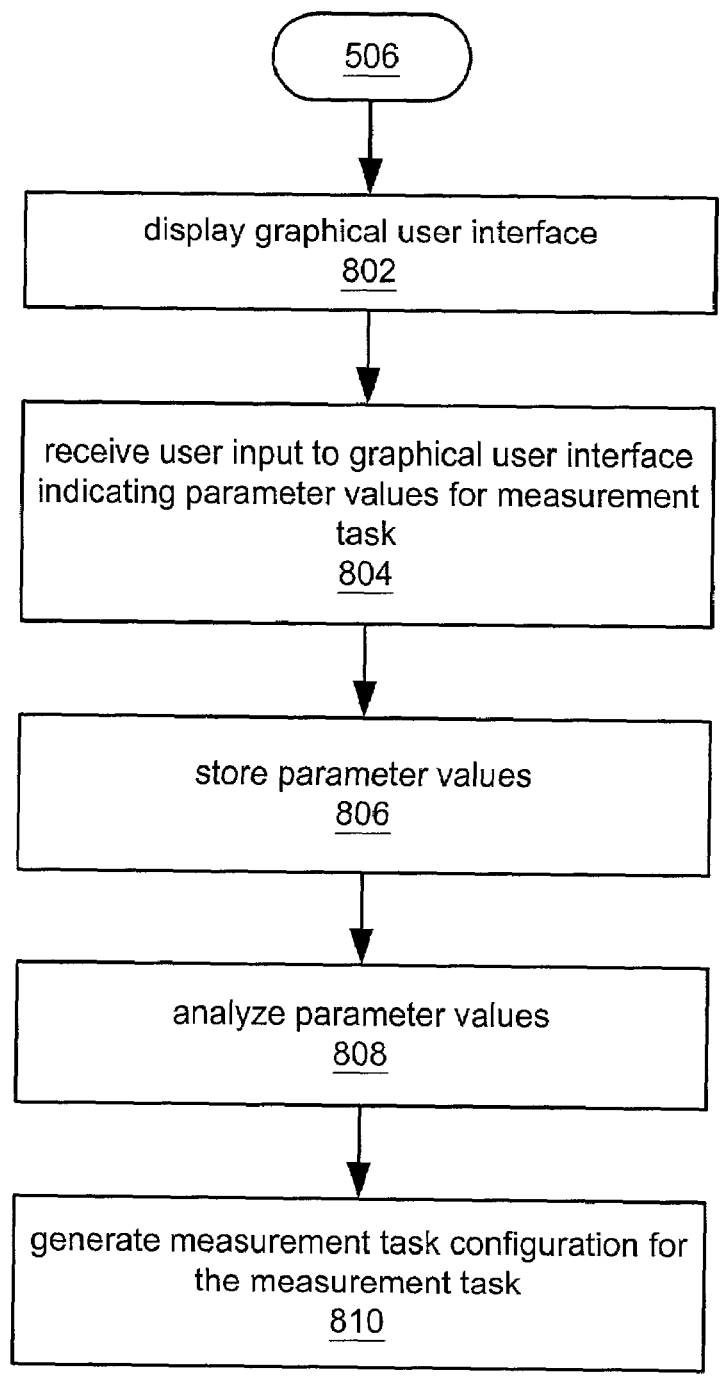
FIG. 8 flowcharts a process for generating a measurement task specification, according to one embodiment.

FIG. 8—Method for Specifying a Measurement Task

FIG. 8 flowcharts one embodiment of a method for specifying a measurement task. In particular, FIG. 8 flowcharts a detailed embodiment of step 506 of FIG. 7, described above. As noted above, in other embodiments, various steps in the method may occur concurrently or in a different order than shown, or may be omitted, as desired. Also, various additional steps may be performed as desired.

As FIG. 8 shows, in 802, a graphical user interface (GUI) may be displayed which presents information for guiding the user in specifying a measurement task. The measurement task may involve a simple measurement using a single instrument or device, or may comprise a complex measurement operation using a plurality of measurement devices. In one embodiment, at least one of the plurality of measurement devices may comprise a measurement hardware device. In another embodiment, at least one of the plurality of measurement devices may comprise a virtual measurement device.

In one embodiment, displaying the graphical user interface may include displaying a plurality of GUI elements, such as controls or indicators, to the user, where each of at least a subset of the plurality of GUI elements presents one or more parameters for the measurement task. As used herein, the term "indicator" refers to any GUI element or component which operates to present information to the user, and the term "control" refers to any GUI element or component which operates to receive input from the user. Examples of GUI elements, i.e., indicators and controls, include panels, menus, tabs, entry fields, buttons, radio buttons, list boxes, active icons, meters, panels, windows, dialog boxes, diagrams, and any other graphical components of a GUI. It is noted that a GUI element may include other GUI elements, such as, for example, a panel which includes one or more indicators and/or controls.

In another embodiment, displaying the graphical user interface may include displaying a plurality of panels which guide the user in specifying the measurement task. Note that as used herein, the term "panel" refers to a graphical region of the GUI which includes one or more controls for receiving user input and/or indicators for presenting information to the user. Thus, a panel may be any of a dialog box, an alert box, a list box, a window, a screen, a pop-up menu, or any other functional graphical area of the GUI. Thus, the GUI may comprise one or more panels. In the descriptions that follow, the GUI is described in terms of panels, although it is noted that other GUI elements are also contemplated for implementing various embodiments of the measurement task specifier.

In a preferred embodiment, the particular sequence of panels or GUI elements presented to the user may depend upon the user input. In other words, the presentation of panels or GUI elements may be context sensitive. Additionally, the information presented by a given GUI element, e.g., a panel, may itself be context sensitive. Examples of such context sensitivity are described below.

In 804, the graphical user interface may receive user input characterizing the measurement task. The user input may indicate parameter values for a plurality of parameters of the measurement task, such as, for example, measurement type, device type, channel parameters, sampling parameters, trigger parameters, clock parameters, scaling parameters, synchronization parameters, routing parameters, and data publishing parameters, among others. In one embodiment, the user input may indicate values for five or more of these parameters to characterize the measurement task. Various embodiments of the method are described below. Additionally, a step-by-step example of one embodiment of the method steps 802 and 804 is presented below with reference to FIGS. 14–29.

In 806, the parameter values may be stored in a memory. As mentioned above, the memory may be comprised on the host computer 102, or on a system coupled to the host computer, such as server computer 106. In one embodiment, the parameter values indicated by the user (including any default values used) may be stored in a temporary location during the specification process, then moved to a different storage location, e.g., long term storage, when the user "saves" the configuration. For example, the user may select a "save" option, or the measurement task specifier may automatically save on exit. In another embodiment, the parameter values may be stored as they are entered, and modified as needed based on subsequent user input.

In 808, the parameter values may be analyzed, then in 810, a measurement task specification may be generated based on the analysis. The measurement task specification may be useable to produce a program which implements the measurement task, as described with reference to FIGS. 7, 9, and 12. Further details of the measurement task specification are presented below with reference to FIGS. 10A–11B.

As mentioned above, in one embodiment, the GUI may present a plurality of panels to the user which may interactively guide the user through the specification process. As also mentioned above, at least a subset of the panels may be context sensitive. For example, in one embodiment, the GUI may display a first panel which presents options for specifying values of a first parameter of the measurement task. The GUI may then receive first user input to the first panel indicating a value of the first parameter. The GUI may then display a second panel which presents information based on the indicated value of the first parameter. In one embodiment, the information may indicate a second parameter of the measurement task. The GUI may then receive second user input to the second panel indicating a value of the second parameter of the measurement task. Thus, the GUI may display various context sensitive panels for configuring parameters associated with the measurement task in response to user input. As another example, the GUI may display context sensitive help information, where the help information displayed is based on which of the plurality of panels or other GUI elements are currently displayed.

In one embodiment, one or more of the panels may include default values for one or more parameters of the measurement task. For example, the presented options may include a default value for the first parameter of the measurement task. In this case, the first user input to the first panel may override the default value with the input value, or may indicate acceptance of the default parameter value as the input value. Similarly, the information presented by the second panel may include a default value for the second parameter of the measurement task. The second user input to the second panel may then either override the default value of the second parameter with the value of the second parameter, or may indicate acceptance of the default parameter value of the second parameter as the value of the second parameter. It should be noted that the default values may be utilized without explicitly being presented to the user by a panel. For example, if the user sets values for a minimal required set of input parameters for a measurement task, the remainder of the parameters may assume the default values provided by the system, i.e., panels associated with the remainder of the parameters needn't be displayed for the default parameter values to be put into effect.

Various embodiments of the process of specifying the measurement task using the GUI are described below. As noted above, the GUI's use of panels as GUI elements is intended to be exemplary, and is not intended to limit the form or mechanisms of the GUI to any particular type of GUI element.

Figure 15:
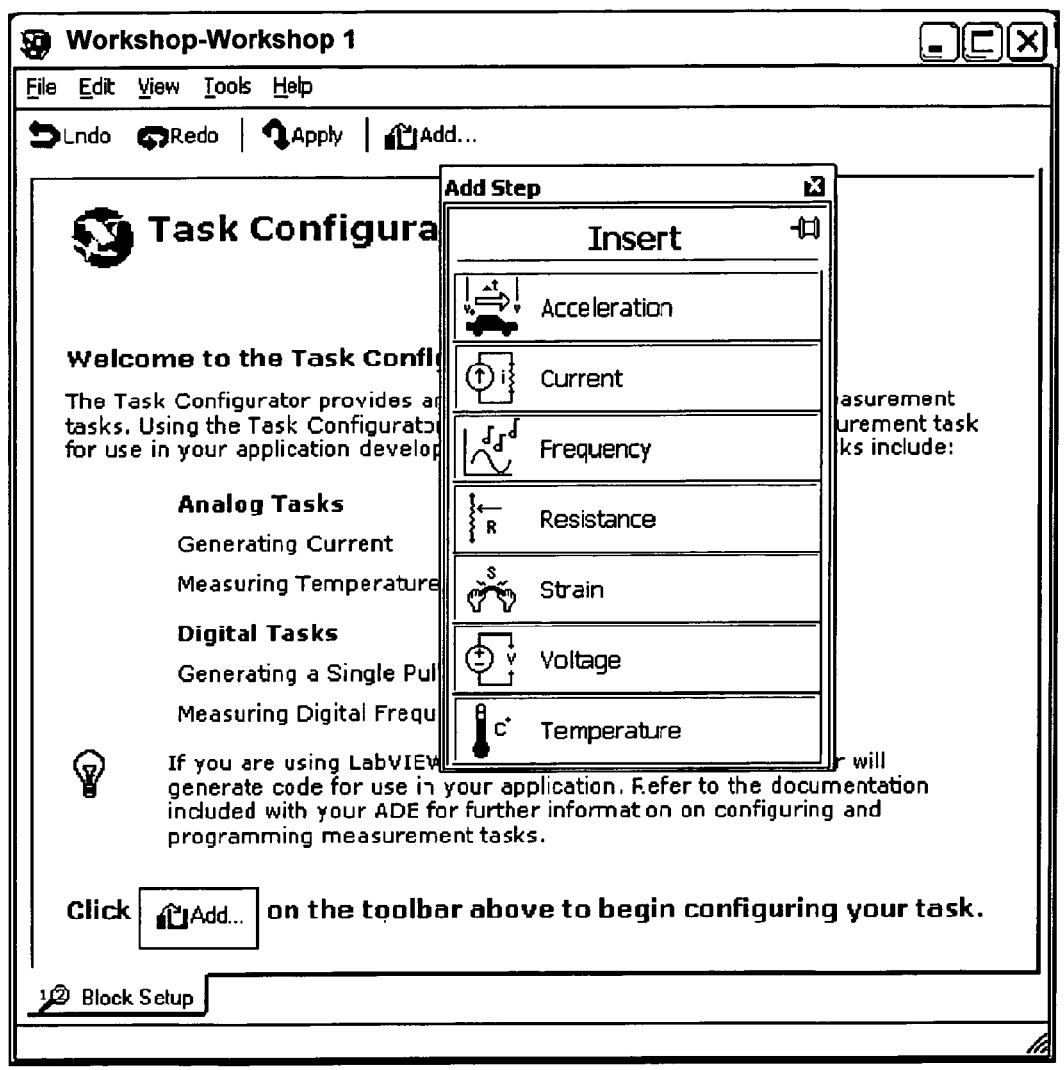
FIG. 15 illustrates measurement type selection for the measurement task specifier of FIG. 14, according to one embodiment.

In one embodiment, the GUI may display a first panel, e.g., a measurements type panel, which may present a list of measurement types for the measurement task. For example, the list may include one or more of: acceleration, current, frequency, resistance, strain, voltage, and temperature, among others. Of course, these measurement types are intended as examples only, and any and all other measurement types are also contemplated as being in the scope of the present invention. As noted above, the measurement types may also include signal generation, e.g., voltage output. An example of the GUI's presentation of measurement types is shown in FIG. 15, described below. The GUI may then receive first user input to the first panel indicating a measurement type for the measurement task.

Figure 16:
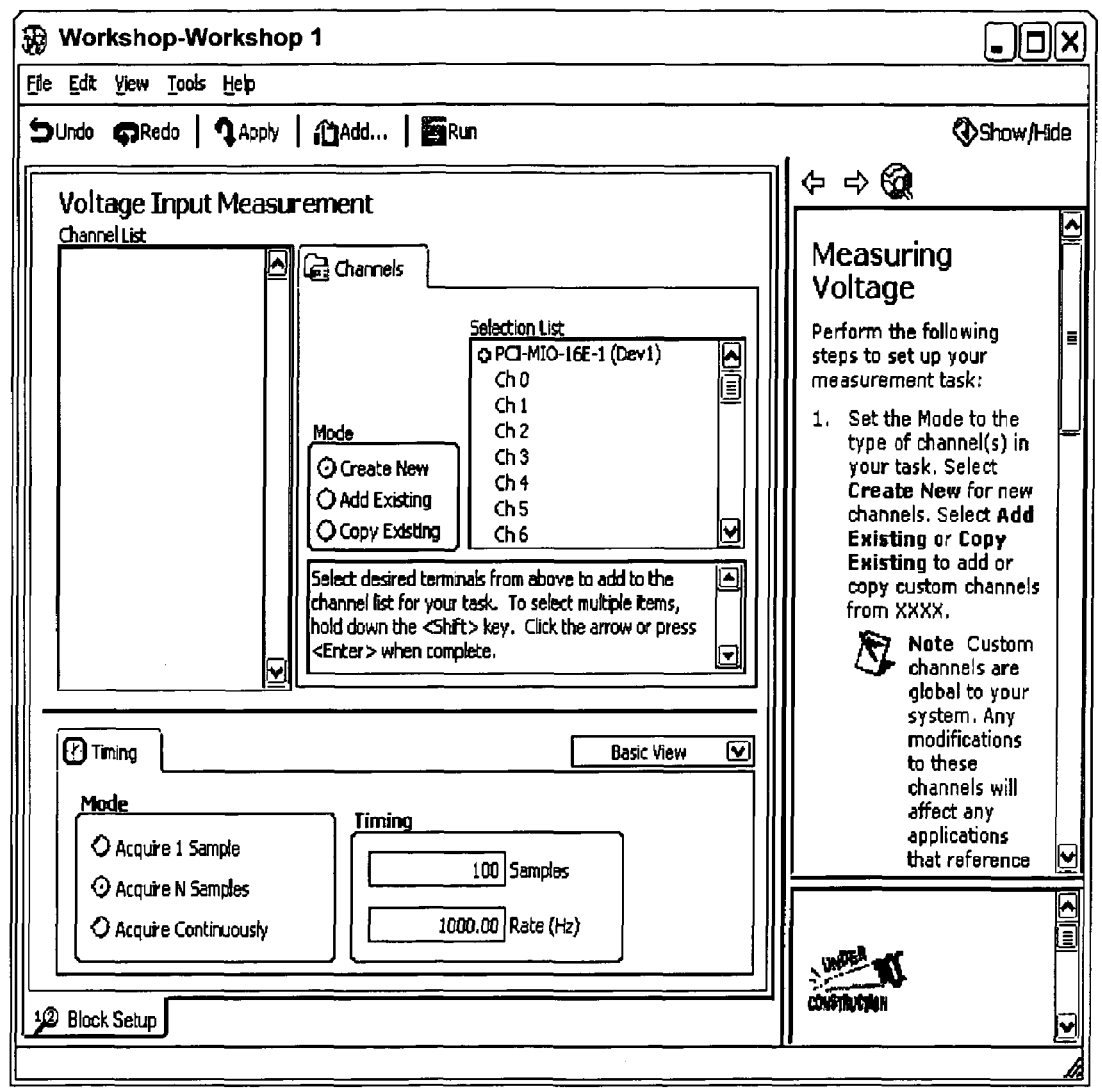
FIG. 16 illustrates a main configuration screen for the measurement task specifier, according to one embodiment.

In response to the first user input, the GUI may display a second panel, e.g., a channels selection panel, which presents a list of available devices and corresponding channels. The available devices may correspond to the indicated measurement type. For example, if the selected measurement type were voltage, the devices listed may be those devices available to the system which are suitable for measurement a voltage. An example of the device and channel list is shown in FIG. 16, described below.

Figure 17:
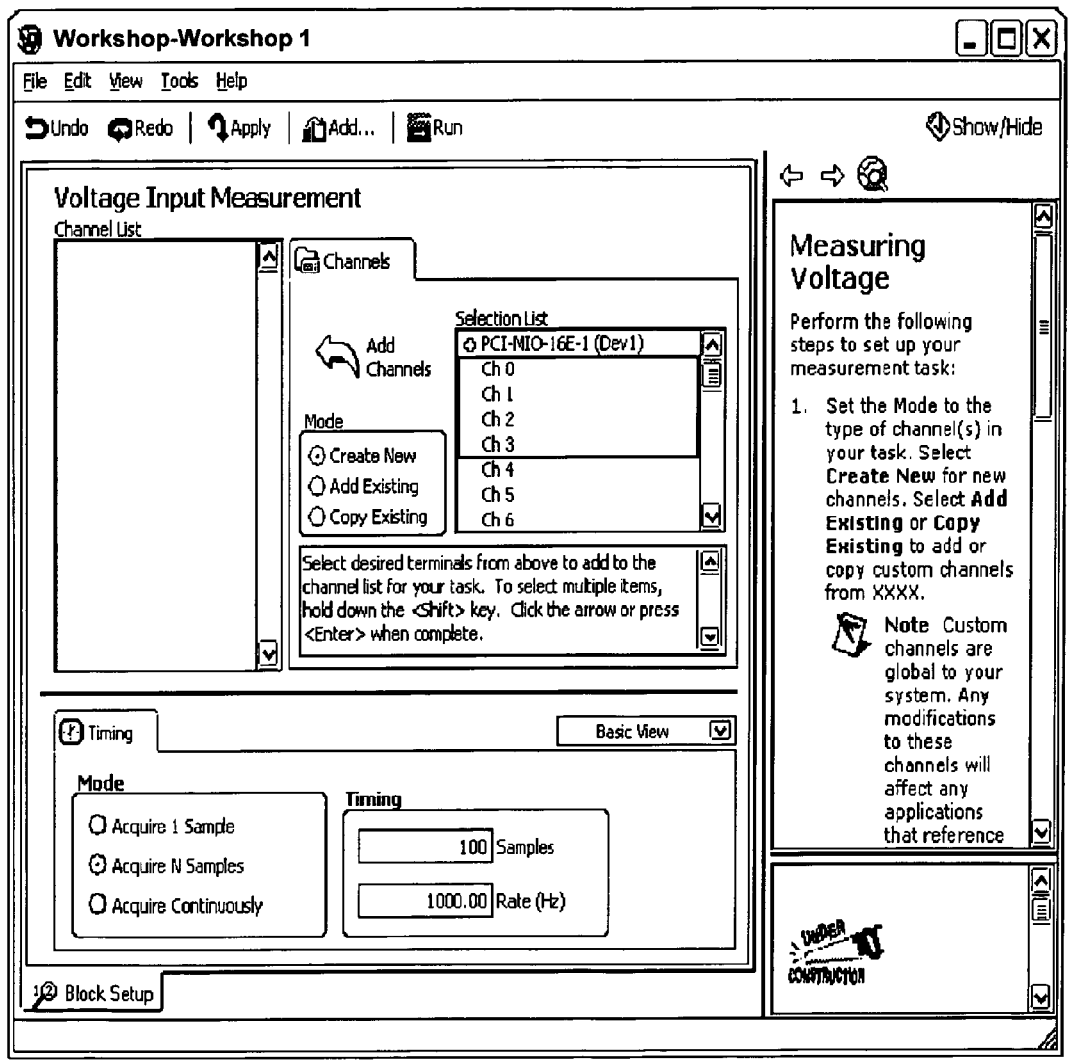
FIG. 17 illustrates channel selection for the measurement task specifier, according to one embodiment.

The GUI may then receive second user input to the second panel indicating one or more channels for a device from the list of available devices and corresponding channels, an example of which is shown in FIG. 17. In one embodiment, each of the one or more channels may correspond to a terminal of the corresponding device.

In response to the second user input, the GUI may display a third panel, e.g., a channel configuration panel, which presents options for specifying values of one or more parameters for the indicated channel(s). Examples of parameters for channel configuration include input range (or output range in the case of signal generation) and units, e.g., voltage, current, etc., as well as channel parameters specific to a particular measurement type, such as, for example, bridge type for strain measurements, and excitation source, sensitivity, and resonant frequency for an acceleration measurement. The GUI may then receive third user input to the third panel indicating values of the one or more parameters for the indicated channel(s). For examples of channel configuration panels, see FIGS. 18A and 18B, described below.

In one embodiment, a plurality of panels may be presented for specifying a set of parameters, where the parameters are grouped in subsets. For example, in one embodiment, basic channel parameters, such as input range and units, may be presented by a "settings" panel, while further channel parameters may be presented by a "details" panel, such as, for example, scaling parameters which specify a scaling function to be applied to the channel data. In one embodiment, the GUI may display two or more panel selection controls, e.g., tabs, each of which may correspond to a respective panel for specifying values of one or more parameters for the indicated channel(s). In this embodiment, the GUI may receive user selection input to one of the two or more panel selection controls, e.g., one of the tabs may be selected by the user.

In response to the user selection input, the GUI may display the respective panel corresponding to the selected panel selection control. The respective panel may present options for specifying values of the respective one or more parameters for the indicated one or more channels. The GUI may then receive user input to the respective panel indicating values of the respective one or more parameters for the indicated one or more channels. In one embodiment, the details panel (or its equivalent) may be a "read only" panel which displays parameter values, but which does not allow the values to be set or modified through the panel.

In one embodiment, the GUI may display a timing panel, which presents one or more timing parameters for the measurement task. The GUI may then receive user input to the timing panel indicating values for the one or more timing parameters for the measurement task. The GUI may also display a triggering panel which presents one or more triggering parameters for the measurement task. The GUI may then receive user input to the triggering panel indicating values for the one or more triggering parameters for the measurement task. In one embodiment, the timing and triggering panels may be a single panel. For examples of timing and triggering panels, please see FIGS. 16, 24, and 25, described below.

In one embodiment, the GUI may display a device settings panel which presents one or more device settings parameters for the measurement task. The device settings parameters may correspond to the device selected from the channel selection panel, described above. Thus, the device settings panel may be presented in response to the user input which selected the device (and channels). The GUI may then receive user input to the device settings panel indicating values for the one or more device settings parameters for the measurement task. One example of a device settings panel is described below with reference to FIG. 26.

Thus, as described above, the measurement task specifier 730, i.e., the configuration tool 730, may be operable to guide the user in specifying parameter values for the measurement task. As mentioned above in 808 and 810, the task specifier 730 may then analyze the parameters and generate a measurement task specification 730.

In one embodiment, the GUI may present an option to programmatically generate a program implementing the specified measurement task, for example, based on the generated measurement task specification. In another embodiment, the program may be generated based on the parameters received from the user (and any default values provided by the measurement task specifier). As mentioned above, in various embodiments, the program generated may be a graphical program, such as a LabVIEW graphical program, a text-based program, such as a C program, or any other kind of program which is operable to perform the specified measurement task. Thus, in response to receiving user input selecting the option to generate the program, the configuration tool 730 may programmatically generate the program based on the parameter values described above.

In one embodiment, the generated program may be executable to perform the measurement task. In another embodiment, the generated program may comprise a source program which is usable to generate an executable program.

In the case where the generated program is a graphical program, the GUI may display a program panel comprising a block diagram of the graphical program, e.g., a LabVIEW graphical program block diagram. The execution of the graphical program may invoke one or more processes to generate an executable run-time 790 which performs the specified measurement task using the device(s) specified for the task.

In one embodiment, programmatically generating the program based on the parameter values may include an expert system 750 analyzing the measurement task specification 740, and generating a run-time specification 770 for the measurement task in response to the analyzing. In one embodiment, the expert system 750 may validate the measurement task specification 740 prior to generating the run-time specification 770.

A run-time builder 780 may then analyze the run-time specification 770, and generate a run-time 790 based on the run-time specification 770, where the run-time 790 is executable to perform the measurement task. In one embodiment, the run-time builder 780 may configure one or more measurement devices (i.e., the devices specified in the measurement task configuration) according to the run-time specification 770. The run-time 790 may then be executable to perform the measurement task using the configured measurement devices.

The embodiments described above are but examples of some of the measurement task configuration parameters which may be specified using the configuration tool 730, i.e., the measurement task specifier 730. It is further noted that although numerous panels were described for presenting and specifying parameters, in other embodiments, different panel/parameter groupings may be used. For example, in one embodiment, a single panel may be presented which displays most or all of the configurable parameters. In one embodiment, the single panel may add or modify various indicators and/or controls in response to user input, dynamically presenting appropriate parameters in response to the user's input.

Figure 9:
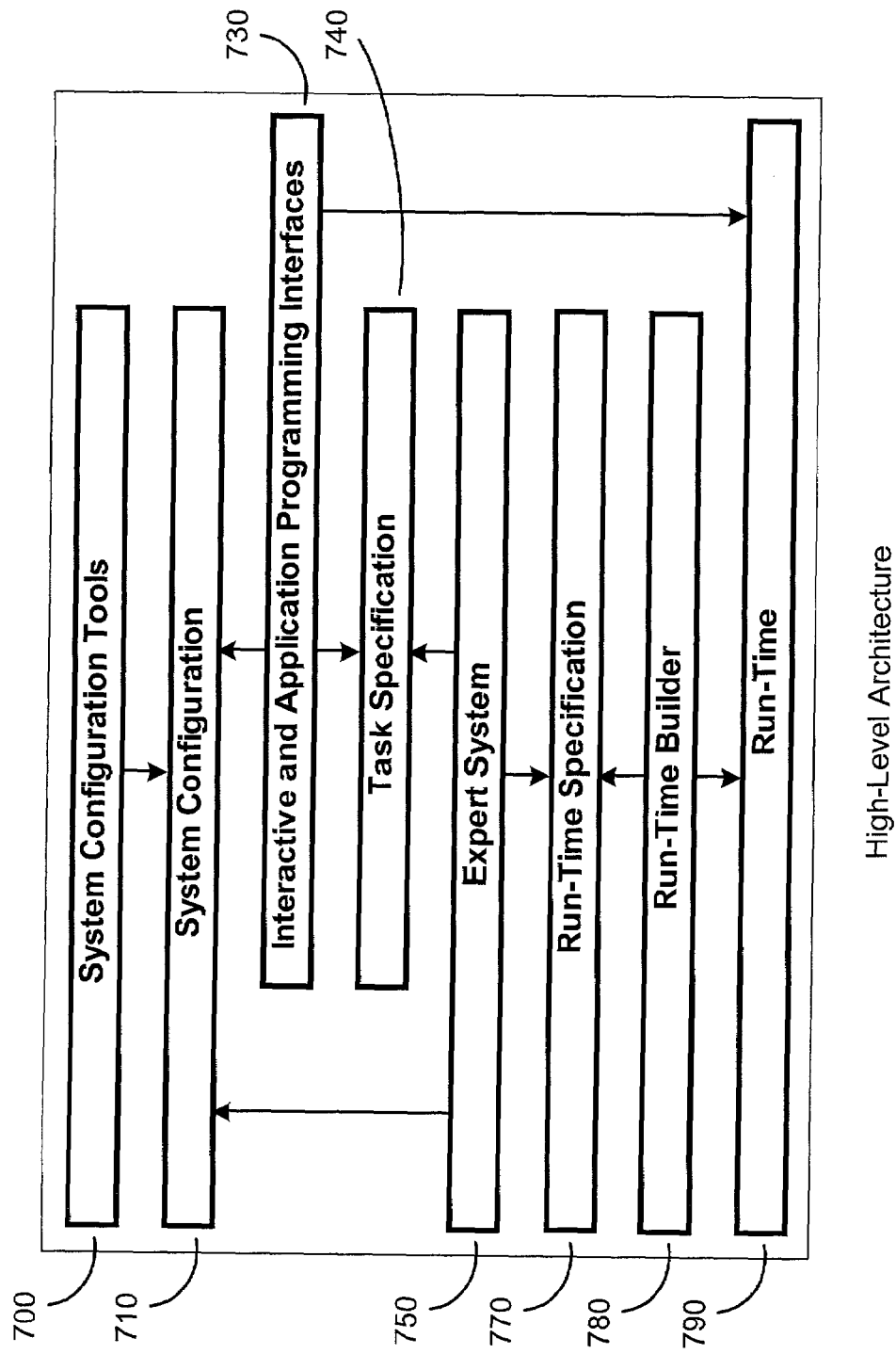
FIG. 9 illustrates a high level architecture of the system, according to one embodiment.

FIG. 9—High-Level Architecture

FIG. 9 is a block diagram of a high-level architecture of the present system, according to one embodiment. As FIG. 9 shows, the primary components of the system may comprise system configuration tools 700, system configuration 710, interactive and application programming interfaces 730 which comprise one or more measurement task specifiers 730, task specification 740, expert system 750, run-time specification 770, run-time builder 780, and the run-time 790. FIG. 9 also shows the communication between the various components.

FIGS. 10A–D—Static Diagrams of the System

FIGS. 10A–10D are static diagrams of the architecture and function of primary functional components or subsystems used to implement measurement tasks according to one embodiment. FIGS. 10A–10D illustrate an embodiment of a measurement system architecture based on National Instruments measurement products.

Figure 10A:
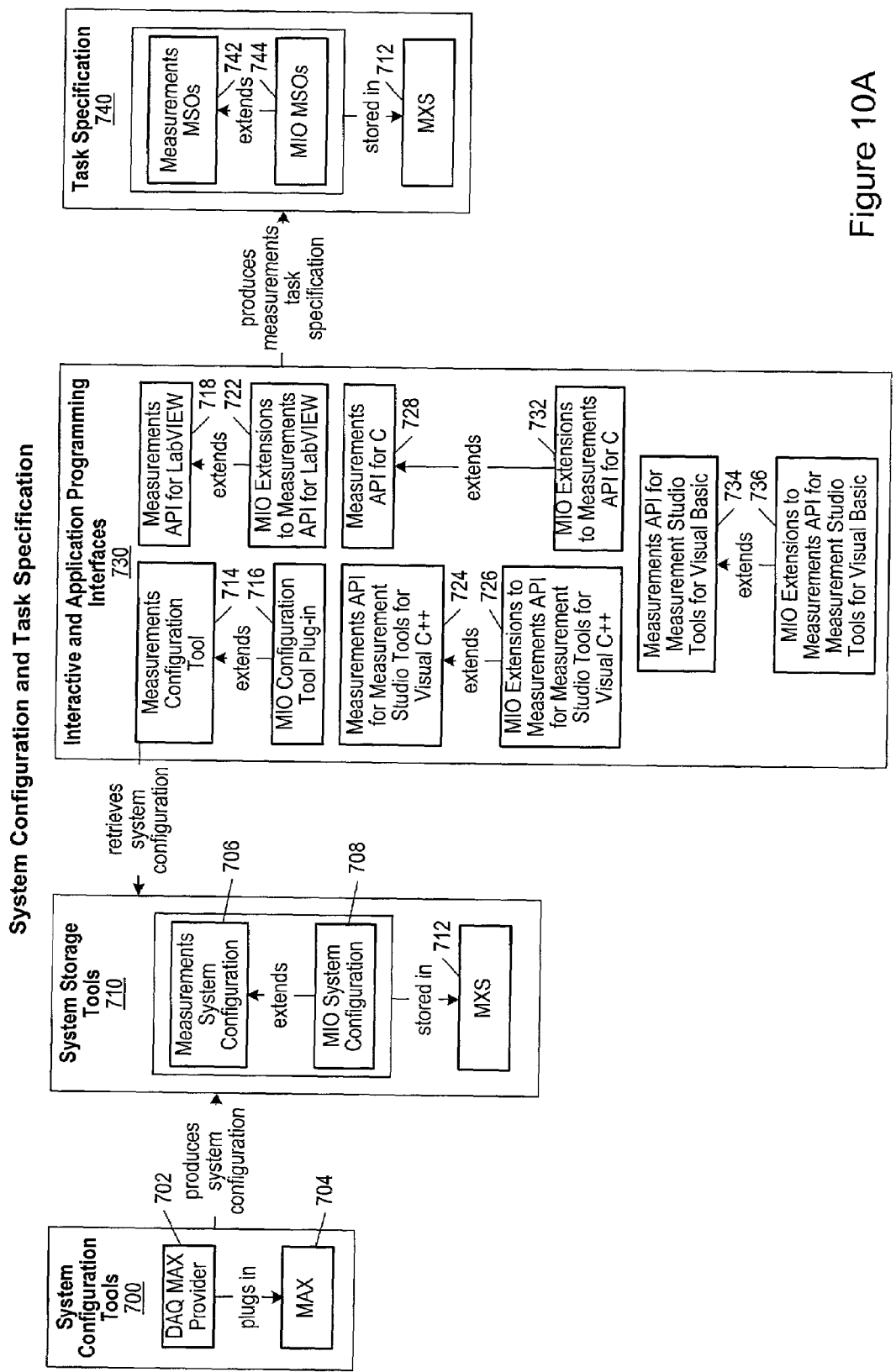
FIG. 10A is a block diagram of a system for system configuration and task specification, according to one embodiment.

FIG. 10A—System for System Configuration and Task Specification

FIG. 10A is a block diagram of one embodiment of system configuration and measurement task specification components of the present invention. As FIG. 10A shows, there are four main functional groups, comprising system configuration tools 700, system configuration storage 710, interactive and application programming interfaces 730, and task specification 740. In one embodiment, the system configuration tools 700 comprise a DAQ measurements and automation explorer (MAX) provider 702 which may plug in to MAX 704. In one embodiment, the system configuration tools 700 may facilitate system configuration specification by the user. In other words, the system configuration tools, e.g., MAX provider 702, may receive user input indicating system configuration parameters and set system configuration parameters for the one or more measurement devices in response to the user input.

As FIG. 10A also shows, once the user has specified a system configuration, the specified system configuration may be stored in system configuration storage 710. The system configuration storage 710 may be operable to store a measurements system configuration 706, as well as an MIO system configuration 708. The term "MIO" refers to a type or class of measurement device. In one embodiment, the MIO system configuration 708 may operate to extend the measurements system configuration 706. As may be seen, both the measurements system configuration 706 and the MIO system configuration 708 may be stored in MAX storage (MXS) 712.

In one embodiment, interactive and application programming interfaces (IAPIs) 730 may be used to access various objects and functions of the system. These interfaces may provide mechanisms through which the user, other system components, or other systems, may specify a measurement task. As FIG. 10A shows, the IAPIs 730 may include a measurements configuration tool 714 and MIO configuration tool plug-in 716, which may be operable to extend the measurements configuration tool 714. In one embodiment, the system configuration information stored in system configuration storage 710 may be retrieved via the measurements configuration tool 714.

The IAPIs may further include measurements APIs for various development environments or languages, such as a measurements API for LabVIEW 718 and MIO extensions to measurements API for LabVIEW 722, which may be operable to extend the measurements API for LabVIEW 718; a measurements API for C 728 and MIO extensions to measurements API for C 732, which may be operable to extend the measurements API for C 728; a measurements API for Measurement Studio Tools for Visual C++ 724 and MIO extensions to measurements API for Measurement Studio Tools for Visual C++ 726, which may be operable to extend the measurements API for Measurement Studio Tools for Visual C++ 724; and a measurements API for Measurement Studio Tools for Visual Basic 734 and MIO extensions to measurements API for Measurement Studio Tools for Visual Basic 736, which may be operable to extend the measurements API for Measurement Studio Tools for Visual Basic 734. It should be noted that in other embodiments, other interfaces or APIs may be included for other development environments and/or programming languages.

As FIG. 10A further shows, a task specification 740 may be generated via the IAPIs 730. The task specification 740 may include measurements-wide measurements specification objects (MSOs) 742 and MIO MSOs 744, which may be operable to extend the measurements MSOs 742. Note that both the measurements MSOs 742 and the MIO MSOs 744 may be stored in the MXS 712. As noted above, the term "MIO" refers to a type or class of measurement device. Thus, the measurement task specification 740 may comprise a collection of measurement specification objects, or MSOs, as described in more detail below.

Thus, the system components described above may allow the user to configure the system, as well as to generate a measurement task specification 740.

Figure 10B:
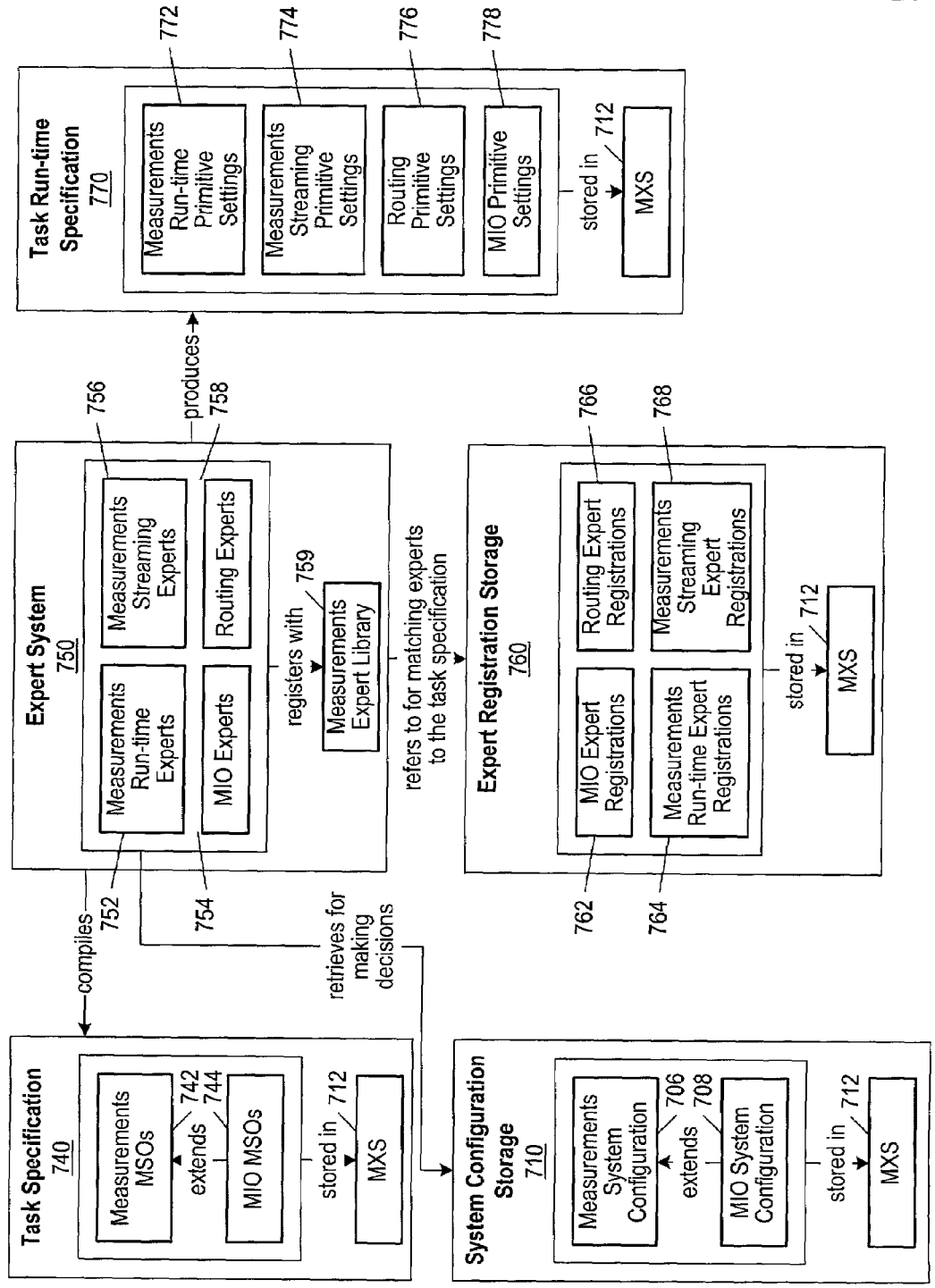
FIG. 10B is a block diagram of a system for compiling a task specification to a task run-time specification, according to one embodiment.

FIG. 10B—System for Compiling a Task Specification to a Task Run-Time Specification FIG. 10B is a block diagram of one embodiment of system components for compiling the task specification to a task run-time specification. As FIG. 10B shows, in one embodiment, the system components for compiling the task specification to a task run-time specification may include the task specification 740 and the system configuration storage 710, described above with reference to FIG. 10A, as well as an expert system 750, an expert registration storage 760, and a task run-time specification 770.

In one embodiment, the expert system 750 may be operable to retrieve system configuration information from the system configuration storage 710 to make decisions regarding the measurement task specification 740. The expert system 750 may be further operable to compile the task specification 740 to produce the task run-time specification 770, as shown. As FIG. 10B also shows, the expert system 750 may refer to the expert registration storage for matching experts to the task specification 740. In one embodiment, the expert system 750 may include measurements run-time experts 752, measurements streaming experts 756, MIO experts 754, routing experts 758, and a measurements expert library 759. Further examples of experts include sensor experts, smart sensor experts, scaling experts, and system calibration experts, among others. In general, an expert may be defined and used for any device or function. For example, a scaling expert may be operable to make changes to the run-time specification to specify or implement custom scaling operations for a measurement channel. In one embodiment, each of the experts may be operable to register with the measurements expert library 759 to indicate availability to the system. For further details of the design and operation of the expert system, please see U.S. application Ser. No. 10/008,792 titled "Measurement System Software Architecture for Easily Creating High-Performance Measurement Applications" filed Nov. 13, 2001, and which issued as U.S. Pat. No. 6,879,926, which was included by reference above.

As FIG. 10B shows, the expert registration storage 760 may include registration components which correspond to each of the experts included in the expert system 750. For example, the expert registration storage 760 may include components for MIO expert registrations 762, measurements run-time expert registrations 764, routing expert registration 766, and measurements streaming expert registrations 768. It should be noted that the expert system 750 and the expert registration storage 760 may also respectively use and store other experts and other expert registrations as needed. As shown, each expert registration may be stored in MXS 712.

As mentioned above, the expert system 750 may produce the task run-time specification based on the task specification 740, the system configuration information stored in the system configuration storage 710, and the various experts comprised in the expert system 750. In one embodiment, the task run-time specification 770 may include various primitive settings specified by one or more of the above-mentioned experts. For example, the settings may include measurements run-time primitive settings 772, measurements streaming primitive settings 774, routing primitive settings 776, and MIO primitive settings 778. The primitive settings may each be stored in MXS 712, as shown.

Note that when the measurement task specification does not specify any product-specific properties, i.e., any properties or specifications particular to a given device or product, then the measurement task specification may be compiled to various different measurement systems without modification. In other words, to the extent that the measurement task specification is generic, it is also portable, and thus a single measurement task specification may be used or compiled for multiple measurement systems.

Figure 10C:
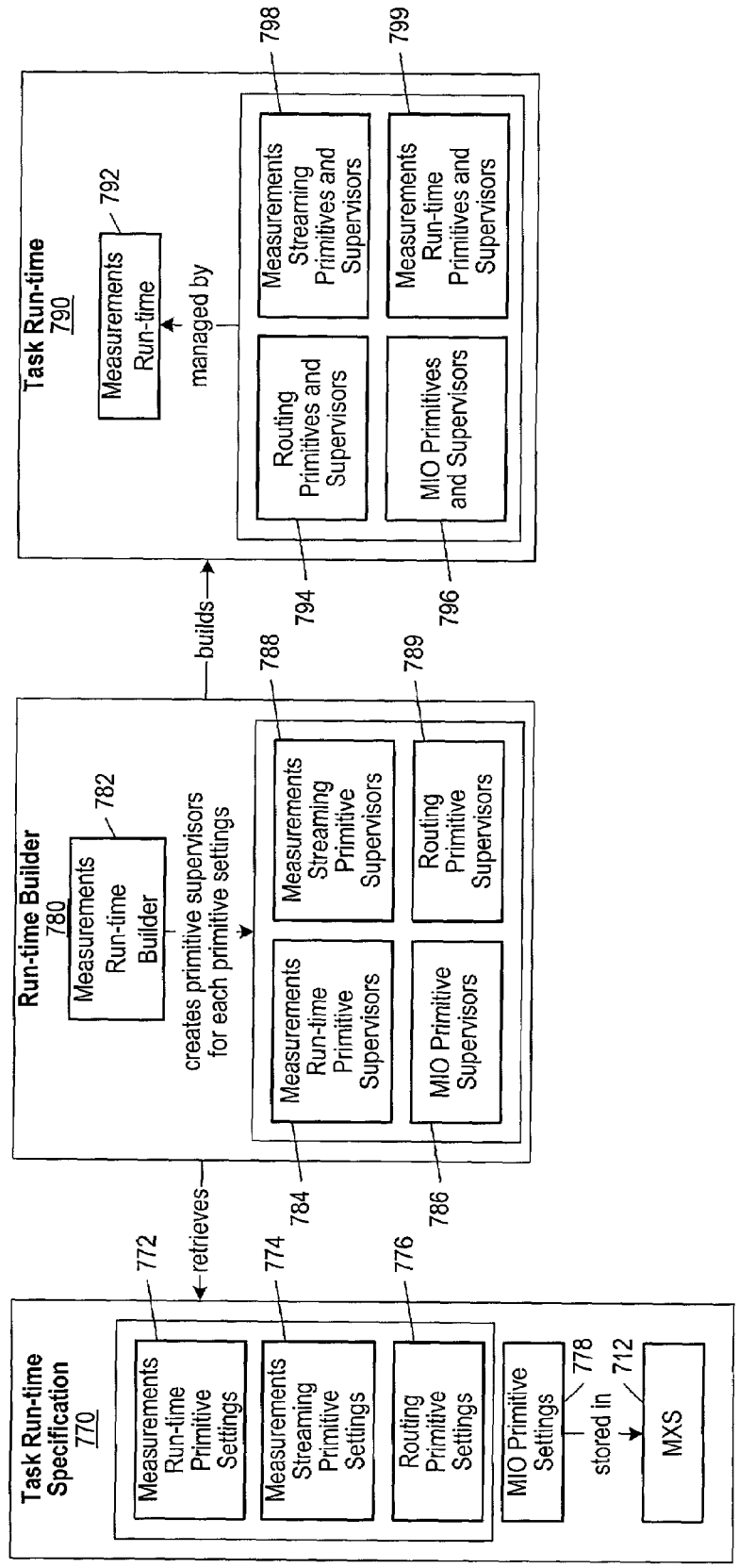
FIG. 10C is a block diagram of a system for building a task run-time from a task run-time specification, according to one embodiment.

FIG. 10C—System for Building a Task Run-Time from a Task Run-Time Specification FIG. 10C is a block diagram of system components for building a task run-time from a task run-time specification, according to one embodiment. As FIG. 10C shows, the system components for building a task run-time from a task run-time specification may include the task run-time specification 770, described above with reference to FIG. 10B, a run-time builder 780, and a task run-time 790. As shown, the run-time builder 780 may be operable to retrieve the task run-time specification (possibly from MXS 712) and build the task run-time 790.

In one embodiment, the run-time builder 780 may include a measurements run-time builder 782 which may be operable to create primitive supervisors for each primitive setting in the run-time specification 770, such as measurements run-time primitive supervisors 784, MIO primitive supervisors 786, measurements streaming primitive supervisors 788, and routing primitive supervisors 789. As FIG. 10C shows, these primitives and supervisors may be included in the task run-time 790, described below.

In one embodiment, the task run-time 790 may include a measurements run-time 792 which may manage routing primitives and supervisors 794, MIO primitives and supervisors 796, measurements streaming primitives and supervisors 798, and measurements run-time primitives and supervisors 799. The task run-time 790 may be operable to be executed by the system to implement the specified measurement task, as described below with reference to FIG. 10D.

Figure 10D:
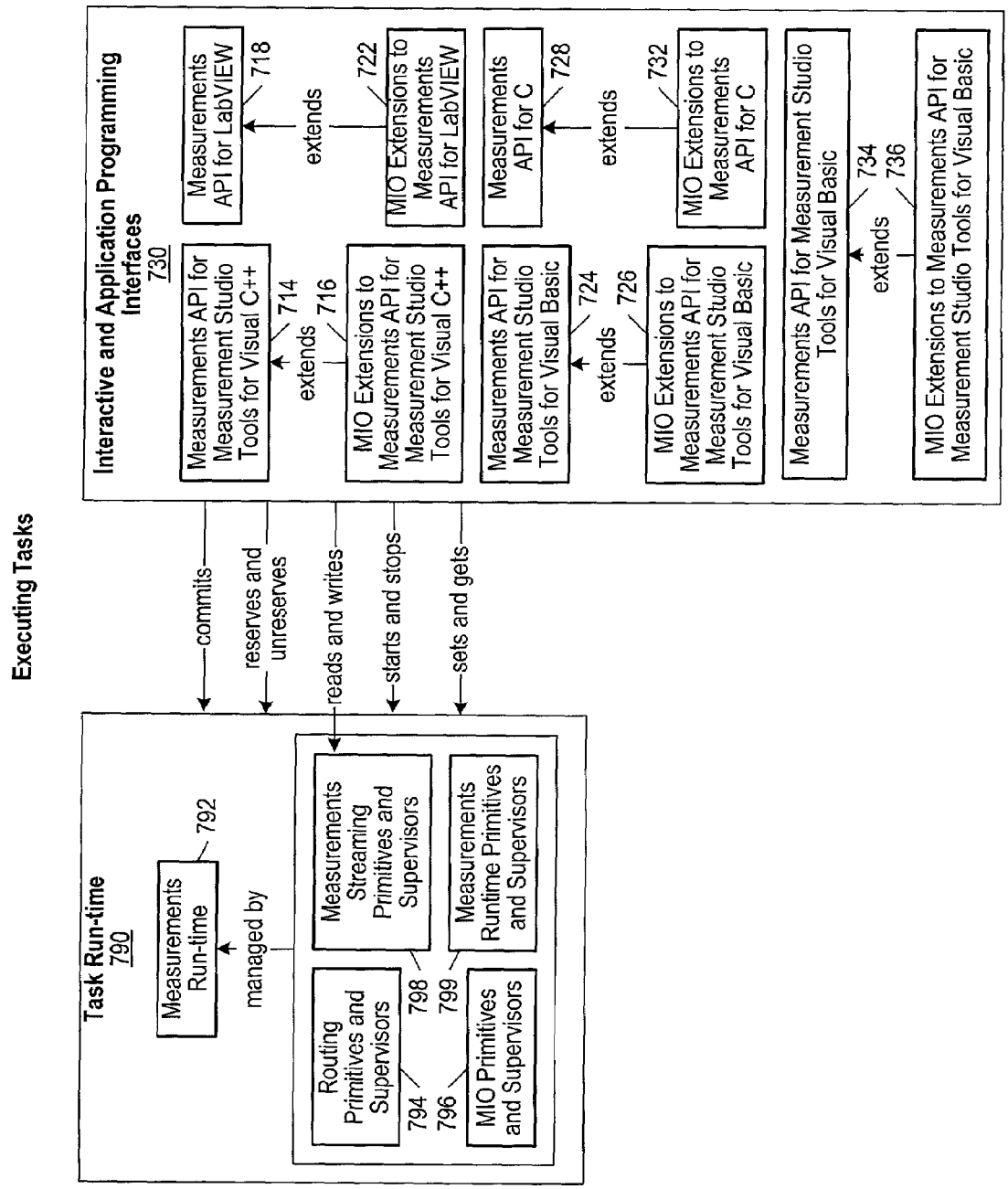
FIG. 10D is a block diagram of a system for executing tasks, according to one embodiment.

FIG. 10D—System for Executing Tasks

FIG. 10D is a block diagram of a system for executing measurement tasks. As FIG. 10D shows, the system may include the task run-time 790, described above with reference to FIG. 10C, as well as the interactive and application programming interfaces (IAPIs), described above with reference to FIG. 10A. As may be seen in FIG. 10D, in one embodiment, the IAPIs 730 may provide means for issuing start, stop, commit, reserve, unreserve, set, and get commands to the task run-time 790. The IAPIs 730 may also provide means for issuing reads and writes to the measurements streaming primitives and supervisors 798 as shown. Thus, the measurement task may be implemented by executing the task run-time 790 via various commands or calls via one or more of the IAPIs.

Figure 11A:
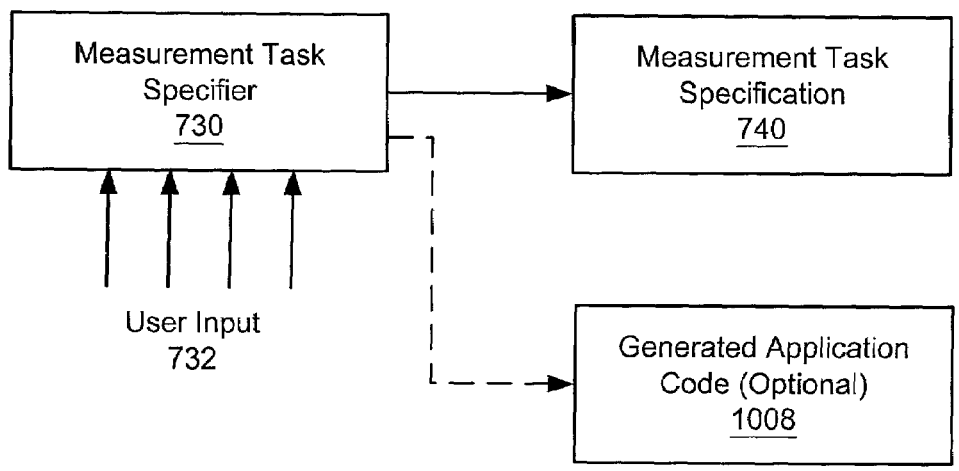
FIG. 11A is a block diagram of measurement task specifier functionality, according to one embodiment.

FIG. 11A—Measurement Task Specifier

FIG. 11A is a block diagram of the functionality of the measurement task specifier, according to one embodiment. As FIG. 1A shows, the measurement task specifier 730 preferably operates to receive user input 732 describing a desired measurement task and generate a measurement task specification 740 which is usable to produce a program which implements the specified measurement task. The measurement task specifier 730 may present a graphical user interface which interactively guides the user through the task specification process, collecting user input which describes the desired measurement task. The measurement task specifier 730 may then analyze the user input and generate the measurement task specification 740 which may be stored and/or used to generate the program. It is noted that in one embodiment, the graphical user interface may include default values for at least a subset of the task parameters, so that for simple measurement tasks, the user may fully specify the task with minimal input.

As FIG. 11A also shows, in addition to the measurement task specification 740, the measurement task specifier 730 may optionally generate application code 1008 for performing the specified task, as described with reference to FIG. 7 and FIGS. 27 and 28A–28G. For example, the graphical user interface may present an option to the user for application code generation, and if the user so indicates, may programmatically generate the application code 1008, also referred to as an application program. As mentioned above, the application program may implement start, read/write, and/or cleanup operations, among others, and may comprise icons in a LabVIEW graphical program (i.e., VIs), and/or function calls in a text-based program including one or more of C code, C++ code, C# code, Java code, Visual Basic code, or any other form of computer program code. In one embodiment, the generated code may comprise a measurement task diagram, e.g., a LabVIEW diagram, for a graphical program, e.g., a LabVIEW graphical program. Further details of the generated application program are presented below with reference to FIGS. 28A–28G.

The use of a graphical user interface to guide the user in the specification of a measurement task is to be contrasted with typical prior art methods of task specification in which a user has to manually set values for the many parameters for a desired task. For example, in prior art systems, the user typically has to manually write code, such as C code or LabVIEW code, using a collection of APIs or function calls to set the value of each parameter. In the prior art systems, default values for the parameters are typically not provided, thus the user is expected not only to know all of the channel, timing and triggering parameters required for the task, but the appropriate values for each, as well. Examples of prior art solutions are compared to solutions generated by the methods described herein are presented below with reference to FIGS. 30A–30B.

Figure 11B:
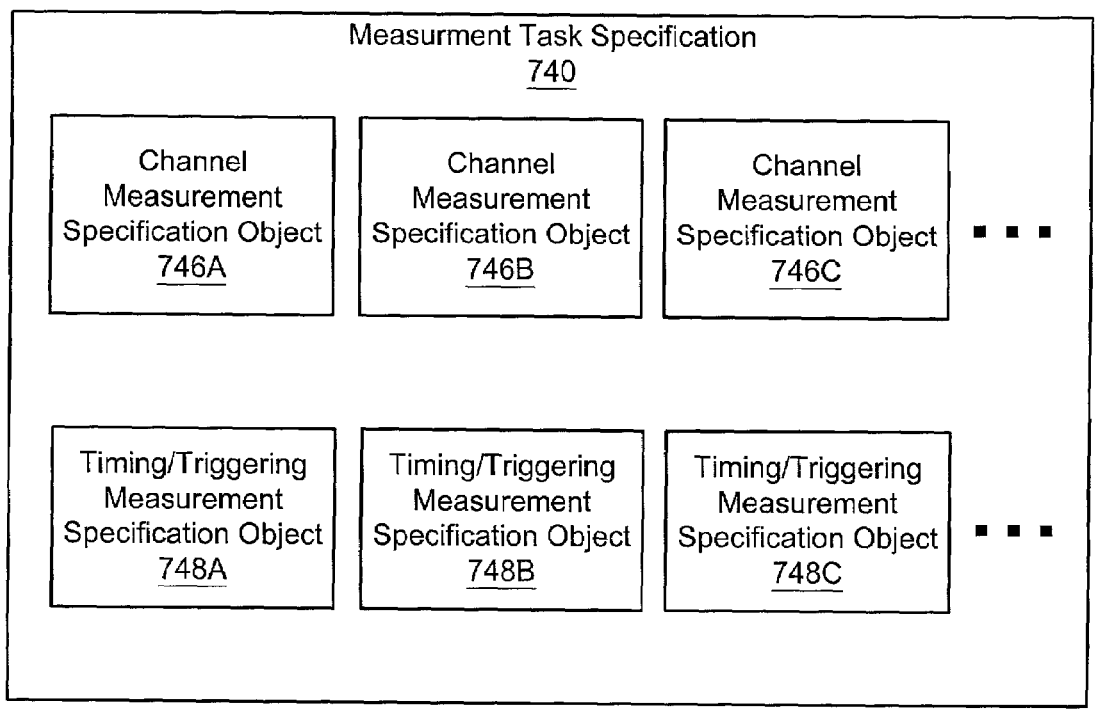
FIG. 11B illustrates a measurement task specification, according to one embodiment.

FIG. 11B—Measurement Task Specification

FIG. 11B is a high-level block diagram of a measurement task specification 740, according to one embodiment. As mentioned above, in one embodiment, the measurement task specification may include configuration information for one or more measurement devices, where, after being configured with the configuration information, the one or more measurement devices are operable to perform the measurement task. As FIG. 11B shows, in one embodiment the measurement task specification 740 may include a collection of measurement specification objects (MSOs). Measurement specification objects may comprise atomic objects in the form of data structures or software classes which reflect the primary concepts and collaborations of the measurements domain. The use of these objects may enable complex solutions to be broken down into simpler components in a consistent way. Said another way, the MSOs may describe the user's measurement task in a device-independent manner, and may also be operable to describe device-specific aspects of the task.

As shown, in one embodiment, the MSOs which compose the measurement task specification 740 may include one or more channel MSOs 746 and timing/triggering MSOs 748. The channel MSOs 746 may each include one or more parameters for configuring a channel for the measurement task. For example, channel configuration parameters included in a channel MSO 746 may include one or more of: task name, channel name, terminals, input ranges, units, scales, and sensors, among others. The timing/triggering MSOs 748 may each include one or more parameters specifying timing and/or triggering for the measurement task. Examples of timing parameters include scan rate, number of samples, duration, clock type, and clock source, among others. Example triggering parameters include trigger type, source, edge, level, window, and hysterisis, among others. Thus, each MSO may codify (via one or more parameters) a particular aspect or component involved in performing the measurement task.

One example of an MSO corresponds to a measurement. In one embodiment, a 'measurement MSO' may comprise a phenomenon (i.e., a detectable signal), a terminal configuration, a desired resolution, a name, and one or more constraints. The particular values of these fields may thus specify a particular measurement. Different measurement specification objects may be linked together to form a measurement task specification.

Figure 12:
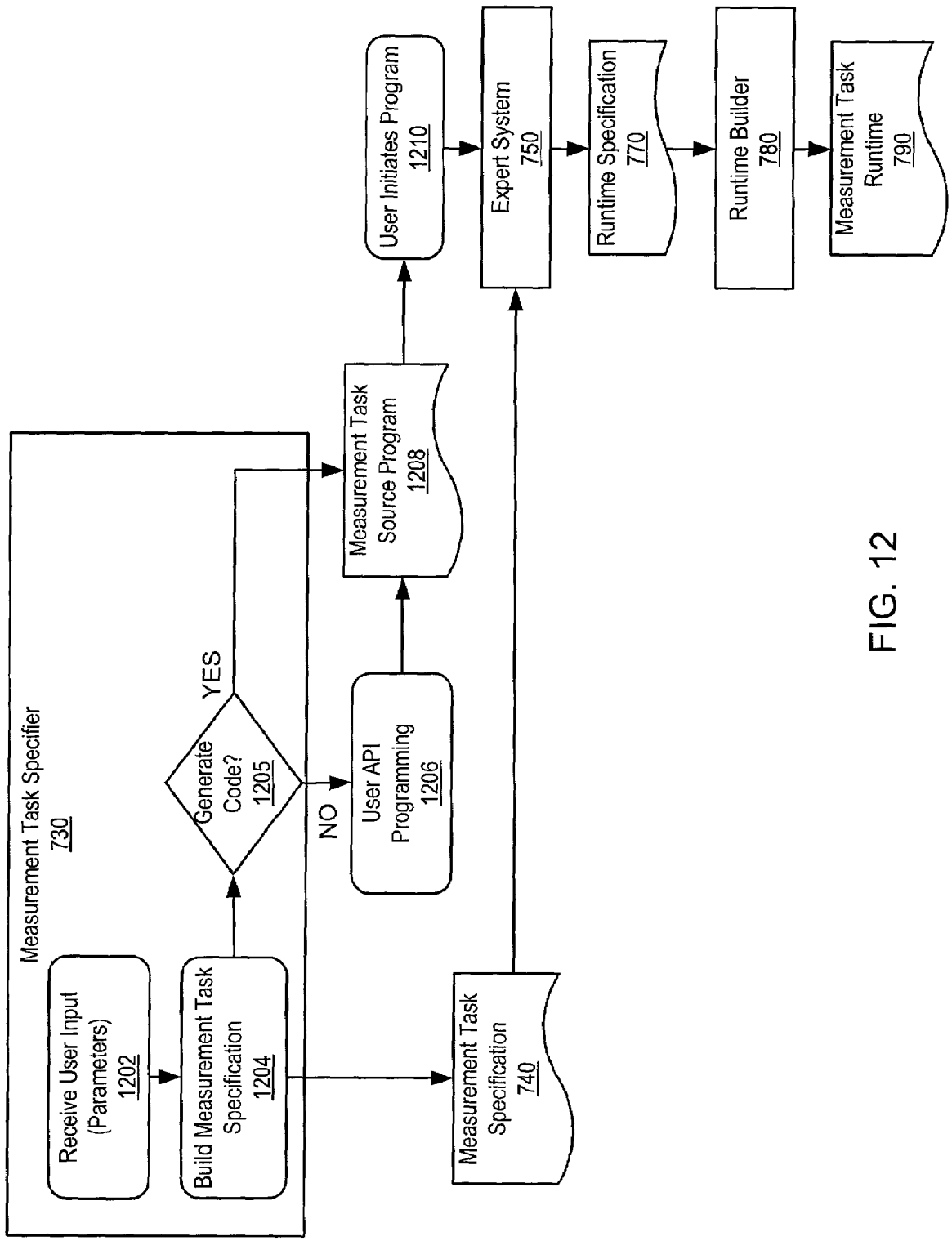
FIG. 12 illustrates one embodiment of measurement task specification operations.

FIG. 12—Measurement Task Specification Process

FIG. 12 illustrates one embodiment of a process for specifying a measurement task, and optionally, for generating a program for performing the task. FIG. 12 illustrates primary components of the system (rectangles), method steps of the process (rounded rectangles), and various products which may be produced in the process (document symbols).

As FIG. 12 shows, the measurement task specifier 730 may receive user input describing or characterizing the measurement task, e.g., values for a plurality of parameters, as indicated by 1202. The measurement task specifier 730 may then analyze the user input and generate a measurement task specification 740, as indicated by 1204. As mentioned above, the measurement task specification 740 may comprise a collection of linked MSOs, each of which includes one or more parameter values specifying an aspect or component of the measurement task. In one embodiment, after the measurement task specification 740 has been generated, the specification 740 may be verified or validated. In one embodiment, the specification 740 may be verified by the expert system 750. The verification of the measurement task specification 740 may include checking for completeness, as well as internal and external consistency. In other words, the expert system 750 may verify that the specified task is specified entirely, and that the task as specified may be performed by the available resources of the system. As mentioned above, once the measurement task specification 740 has been generated, the specification 740 may be stored for later use, e.g., in a library of task specifications stored on a server, or used to generate an executable program for performing the specified task, as described below.

As FIG. 12 also shows, in one embodiment, an option may be presented to the user to programmatically generate application source code in the form of a measurement task source program 1208, as 1205 indicates. If the user selects this code generation option, then the measurement task source program 1208 may be generated automatically. If the user does not select this option, then the user may produce the source program 1208 manually, e.g., by programming via an API, graphical or text-based. In another embodiment, the measurement task specifier 730 may automatically generate the source program 1208, i.e., without the user selecting an option to do so. In yet another embodiment, the measurement task specifier 730 may not provide for the programmatic generation of the source program 1208, and the user may thus be required to produce the source program 1208 manually. Thus, whether programmatically or manually, the measurement task source program 1208 may be generated. Further details of the measurement task source program 1208 are presented below with reference to FIGS. 13, 27, and 28A–28G.

Once the measurement task source program 1208 has been generated, the user may initiate the program, as indicated in by 1210. In an embodiment where the measurement task source program 1208 is a graphical program, e.g., a LabVIEW program, the program initiation 1210 may simply involve the user activating a node, e.g., a "play" or "read/write" node or icon of the graphical program. Further details of the "play" node are presented below with reference to FIGS. 28A–28G and 30A–30B. In an embodiment where the measurement task source program 1208 is a text-based program, e.g., a C program, the program initiation 1210 may involve the user initiating compilation or interpretation of the source program 1208.

As FIG. 12 shows, in one embodiment, the initiation of the program 1210 may invoke the expert system 750 to analyze the measurement task specification 740 and generate a run-time specification 770 which is useable to produce an executable run-time 790. In one embodiment, a run-time builder 780 may analyze or process the run-time specification 770 and generate the executable run-time 790, i.e., the measurement task run-time 790. The measurement task run-time 790 may comprise an executable program which configures measurement hardware and/or software to perform the specified measurement task. In one embodiment, the run-time builder may configure one or more measurement devices according to the run-time specification, where the run-time executes to perform the measurement task using the configured measurement devices. For a more detailed description of the generation of the measurement task run-time 790 from the measurement task specification 740, please see U.S. application Ser. No. 10/008,792 titled "Measurement System Software Architecture for Easily Creating High-Performance Measurement Applications" filed Nov. 13, 2001, and which issued as U.S. Pat. No. 6,879,926, which was incorporated by reference above.

Figure 13:
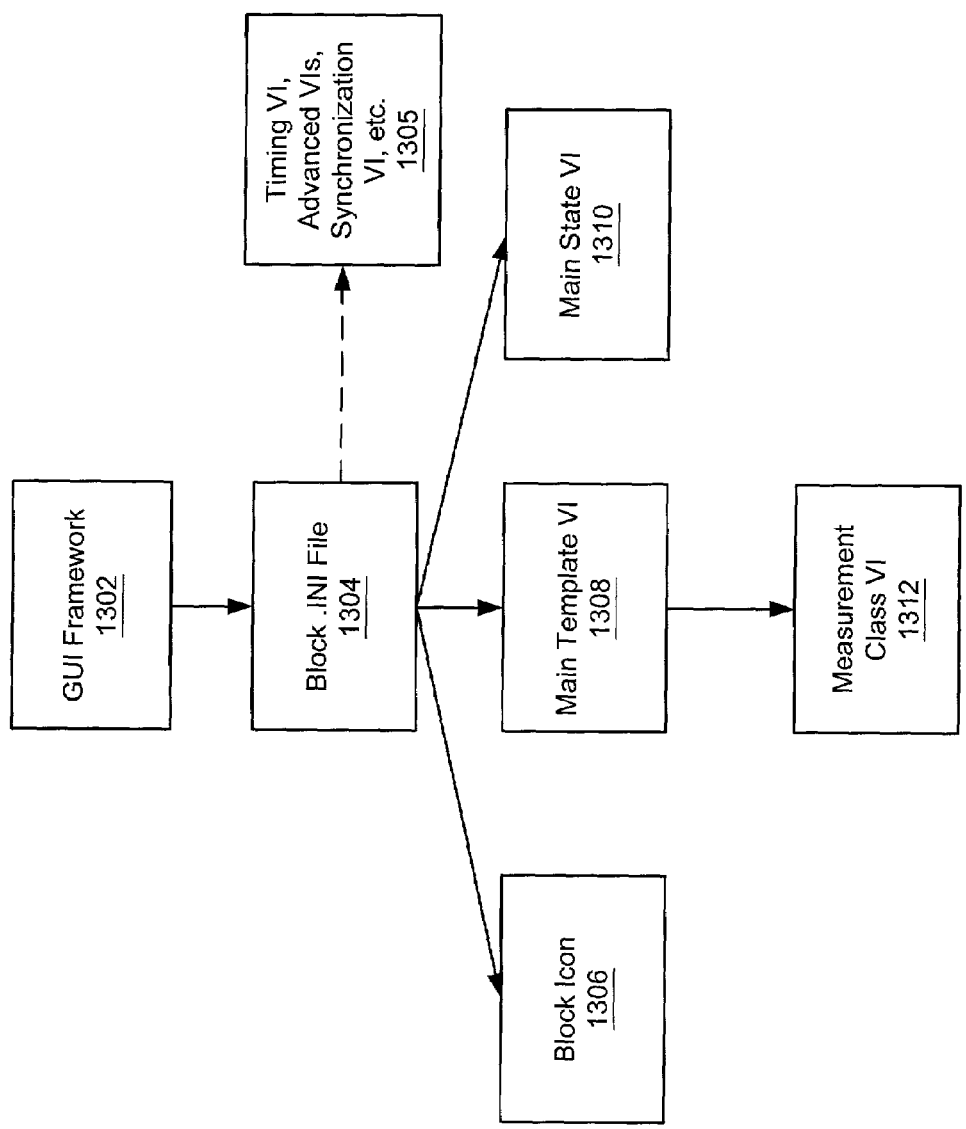
FIG. 13 illustrates a high level measurement task configuration tool architecture, according to one embodiment.

FIGS. 13–17, 18A, 18B, 19–22, 23A, 23B, 24–27, 28A–28G, 29, and 30A–30B—Measurement Task Configuration Tool As mentioned above, the measurement task specifier 730 may be implemented in a variety of forms, including a graphical measurement task configuration tool, a wizard, or an API, among others. In a graphical measurement task configuration tool embodiment, the measurement task specifier 730 may comprise a software program invocable by the user under a development environment. The measurement task configuration tool may comprise an interactive Graphical User Interface (GUI) which may provide an intuitive and powerful way for a user to specify a measurement task. FIGS. 13–17, 18A, 18B, 19–22, 23A, 23B, 24–27, 28A–28G, 29, and 30A–30B illustrate various embodiments of the measurement task configuration tool and its operation, as described below. In particular, FIG. 13 illustrates one embodiment of a high-level architecture of a measurement task configuration tool 730, and FIGS. 14–17, 18A, 18B, 19–22, 23A, 23B, 24–27, 28A–28G, 29, and 30A–30B provide a step by step example of a task specification process using one embodiment of the measurement task configuration tool 730. In this embodiment, a series of panels is presented to the user by the GUI in an interactive manner, allowing the user to completely specify or configure the desired measurement task. It is noted that the measurement task configuration tool 730 and task specification/configuration process described are meant to be exemplary, and are not intended to limit the configuration tool 730 or process to any particular form.

FIG. 13—Measurement Task Configuration Tool Architecture

In one embodiment, the measurement task configuration tool may be implemented in a graphical programming language, such as National Instruments' LabVIEW graphical programming environment. The GUI of the configuration tool may be a Virtual Instrument (VI) accessed by the user to specify and configure measurement tasks.

FIG. 13 is a block diagram of one embodiment of a configuration tool architecture. In one embodiment, the configuration tool may be hosted in a GUI Framework 1302, e.g., National Instruments Workshops framework, which may provide a high-level framework that multiple applications can plug into, providing common user experiences. In the preferred embodiment, the configuration tool addresses application configuration. The purpose is to present the user with the ability to configure exactly what their application does (i.e., voltage measurement, current measurement, digital generation, voltage generation, etc.), and then build a single task that encompasses all of this information. The task may then be referenced in any application development environment (ADE).

For example, in one embodiment, the configuration tool (hosted by the Workshops framework) may run stand-alone, launched directly from an ADE, or may be hosted in another application, such as National Instruments' MAX [Measurement & Automation Explorer] program.

In one embodiment, there may be two parts to the plug-in architecture: plugging-in to Workshops, and plugging-in to a configuration tool framework.

Workshop Plug-In Architecture

In one embodiment, the configuration tool may be written entirely in National Instruments' LabVIEW graphical programming language. Hosting a Virtual Instrument (VI) from the Workshops framework may utilize some or all of the following:

1) A Main State VI 1010 that maintains execution, which is preferably not visible to users.

2) A GUI VI through which a user may configure their task.

3) A Block .INI File 1304 specifying the directory paths of the VI's, block names, help file, etc. 1305.

4) A Block Icon 1306 for the GUI application.

In one embodiment, each .INI file specification may automatically appear as a "block" in an "Add" popup palette or menu of the workshops framework (see FIG. 15). Clicking on this block may launch a corresponding GUI VI and add an icon and text to a ring control, shown in FIG. 29, as described below.

In one embodiment, the GUI and/or Workshops framework may support "Undo", "Redo", and full-state "Restore" commands by automatically copying appropriate controls from the GUI to the State VI, and then storing/restoring this data. A block VI may be programmed to respond to these events and freely exchange its data to/from the workshop in order to support these features.

Measurement Task Configuration Tool Plug-In Architecture

To maximize extensibility and development ease of use, and to minimize disk footprint, there may be a single Main Template VI 1308 that dynamically displays only the measurement type/phenomenon that is being configured. For example, if a user is configuring a voltage measurement, the VI may only display the configuration components necessary for a voltage measurement (See FIGS. 18A, 18B, 19–22, 23A, 23B, and 24–26). Likewise, the user may add a temperature measurement, and with the exact same VI, configure a temperature measurement. This architecture may greatly shorten development time, since all measurement blocks may share a common interface. Thus, changes to the GUI may need only be made in one location.

In one embodiment, each measurement class component (the piece of the UI that is specific to the measurement type being configured) may be a separate VI, referred to as a Measurement Class VI 1312 that may be dynamically loaded by the main GUI template. A "measurement class" ID may be passed to this VI by the Workshop, which tells it what measurement class component VI to load based on which button was selected from the popup palette. Each Measurement Class VI 1312 may be a small state-model VI used for processing events unique to its own front panel, and may have a number of built-in system events for communication to/from the Main Template VI 1308 for such operations as initialization and data processing. The remainder of events may be user-instantiated events which tell the VI how to act when a user changes a control on the front panel, for example.

Figure 14:
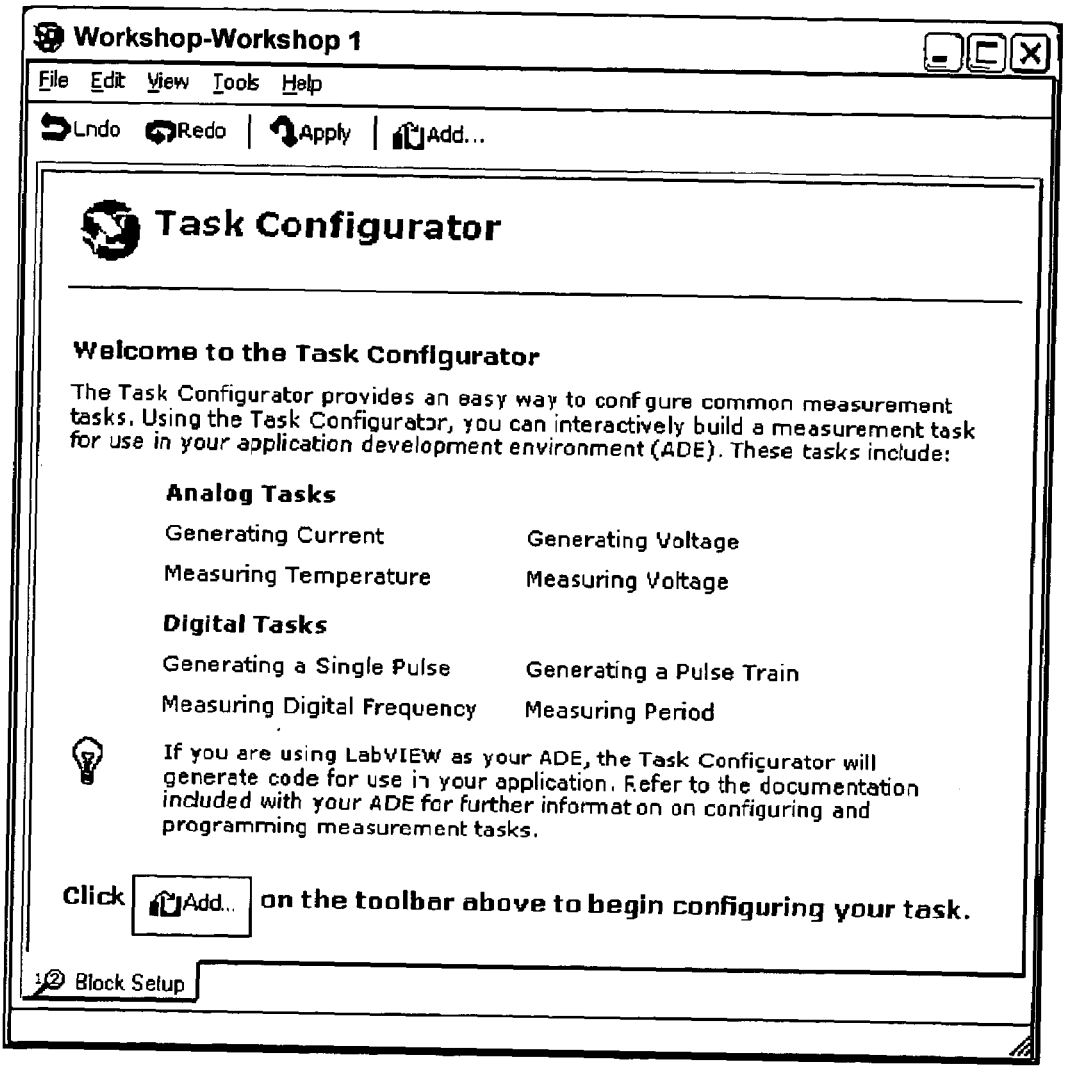
FIG. 14 illustrates an initial screen of an exemplary measurement task specifier, according to one embodiment.

FIG. 14—Initial Screen

In one embodiment, upon launch of the measurement task specifier 730 (also referred to as a measurement task configuration tool or task configurator in this embodiment) the graphical user interface (GUI) may present an initial screen to the user. FIG. 14 illustrates one embodiment of this initial screen. As FIG. 14 shows, in this embodiment, the initial screen may function as a "welcome screen", providing the user with information regarding the use of the configuration tool 730, and means to begin the task configuration process, e.g., a button or menu selection. In addition, as FIG. 14 also shows, the configuration tool 730 may provide additional features, such as "undo", "redo", and "apply", which may allow the user to easily retrace and modify steps taken in the specification/configuration process. In one embodiment, the GUI may include means for coupling the measurement task specifier 730 to other tools or systems. For example, FIG. 14 includes a tab at the bottom of the Figure labeled "Block Setup"; other auxiliary tabs are also contemplated for activation of and/or communication with, other tools. For example, a digital waveform editor or wiring diagram may be accessed via these auxiliary tabs.

FIG. 15—Measurement Type Selection

When the user begins the specification process, such as by clicking the "add" button of FIG. 14, a list of available measurement types may be presented to the user, as shown in FIG. 15. In this embodiment, the GUI displays a panel which presents the list of measurement type options, including acceleration, current, frequency, resistance, strain, voltage, and temperature. In other embodiments, the list of measurement types may include other types, such as, for example, photonic intensity, magnetic field strength, or any other measurable phenomena.

In one embodiment, the selection of a measurement type may spawn a sub-menu which may provide additional selection options. For example, as mentioned above, the measurement task may include signal generation, as well as measurements, thus, in one embodiment, in response to the user's selection of the voltage measurement type, the GUI may display a sub-menu or sub-control which presents additional selection options related to voltage, e.g., "voltage input" or "voltage output", among others. Although a measurements types panel is presented in this embodiment, in other embodiments, other controls may be used, such as pop-up menus and text entry fields, among others.

The selection of the measurement type may establish logical guidelines for subsequent GUI displays. In other words, the information and/or options presented by the GUI to the user may depend upon the measurement type selected. This type of context-dependency may pervade the structure and operation of the measurement task specifier 730, various examples of which are described below.

FIG. 16—Main Configuration Screen

In response to the selection of the measurement type, a main configuration screen may be displayed by the GUI corresponding to the selected measurement type, one embodiment of which is illustrated by FIG. 16. The main configuration screen may provide for the specification of primary parameters for the measurement task. In a preferred embodiment, default parameter values may be provided by the GUI, so that with a minimum of input, the user may specify a workable measurement task, i.e., a task that is implementable using the available resources of the system. In other words, parameter values not set expressly by the user may assume the default values.

As FIG. 16 shows, in this example, a voltage input measurement has been selected. In response to this selection, the GUI may present a channel selection panel for selection of one or more device channels for the voltage input measurement, as shown.

In this embodiment, a channel selection list is presented which lists available devices suitable for performing a voltage input measurement, and corresponding channels, e.g., channels 0 through 6 of a PCI-MIO-16E-1 device, and other available devices and corresponding channels. Each of the channels of a device corresponds to a terminal of the device, and so selection of one or more channels for the device indicates that data will be read from the corresponding terminals of the device. Further details of channel selection and configuration are presented below with reference to FIGS. 17, 18A, 18B, 19–22, 23A, and 23B.

Just below the channel selection panel is a timing panel, presented by the GUI for the user to specify timing parameters for the measurement task, such as sampling mode, number of samples, and sample rate. In this example, the timing panel shown is a "basic view" of timing and triggering parameters. An "advanced view", selectable from the view control shown, is described below with reference to FIG. 24. It should be noted that the timing (and triggering) configuration parameters may apply to the entire measurement task, i.e., may be common to the selected channels.

As mentioned above, the GUI may also display a context sensitive help panel, here shown to the right of the screen. The help panel may display useful information related to the currently displayed configuration panels. For example, if the GUI presents a panel for setting channel parameters, the help panel may present information related to the channel parameters, or instructions for specifying values for the channel parameters. In one embodiment, the GUI may also display an auxiliary display panel, here shown below the help panel with an "under construction" label, which may be used to display auxiliary information of any type, as desired. For example, in one embodiment, the auxiliary display panel may be an error display window whereby error messages and codes may be presented to the user when errors are detected by the system.

FIG. 17—Channel Selection

FIG. 17 illustrates channel selection for the measurement task using the channel selection panel of FIG. 16, in this case, channels 0 through 3 of the indicated device. It should be noted that the device/channel list is scrollable, and so other devices and corresponding channels may also be selected as desired. As shown, in this embodiment, the channel selection panel also allows the user to determine a channel selection mode, whereby new channels may be created and configured, existing channels may be selected (and possibly modified), and/or copies of existing channels may be made. The selected channels may then be displayed in a channel list, as shown in FIG. 18B, described below.

Figure 18A:
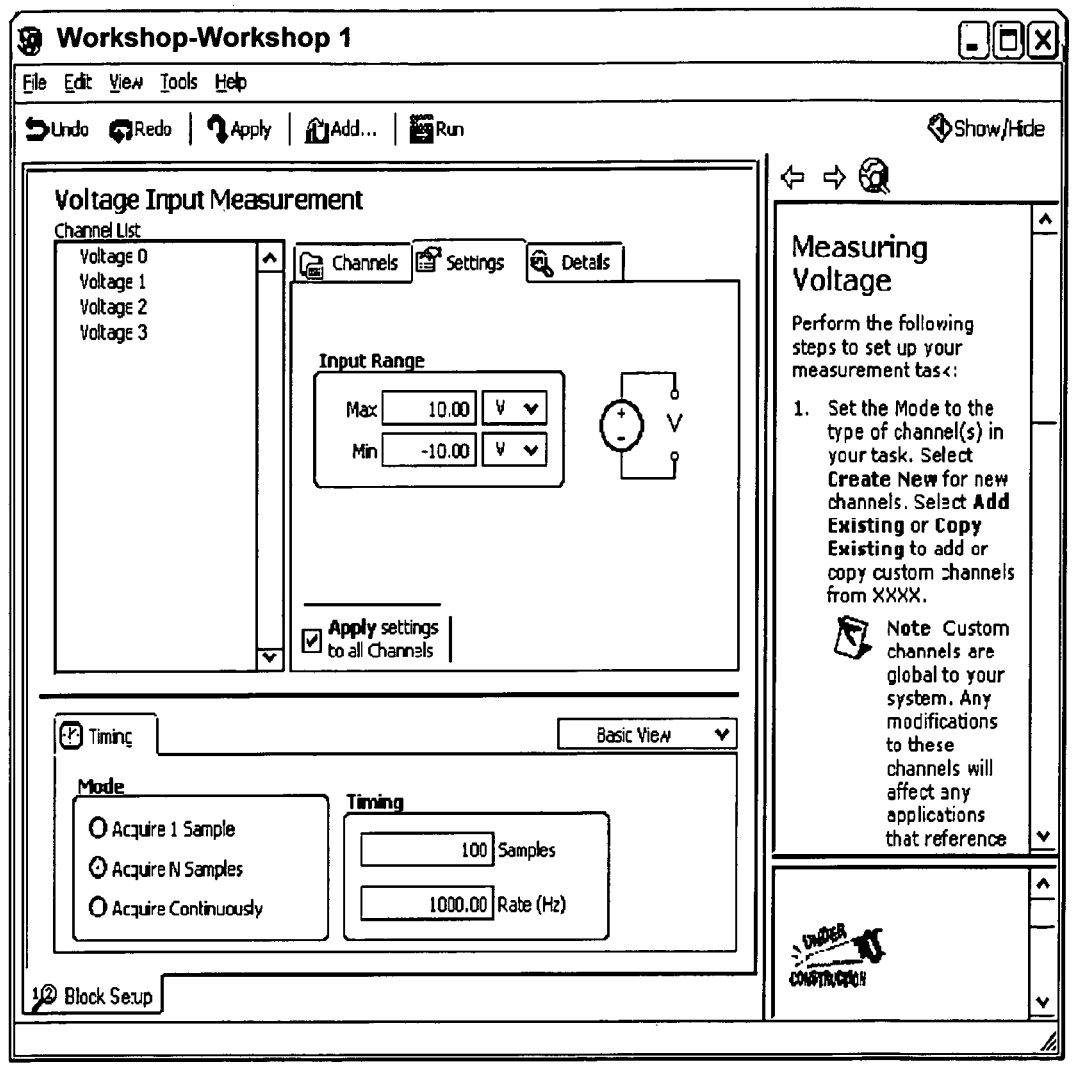
FIG. 18A illustrates a channel list of the selected channels for the measurement task specifier, according to one embodiment.
Figure 18B:
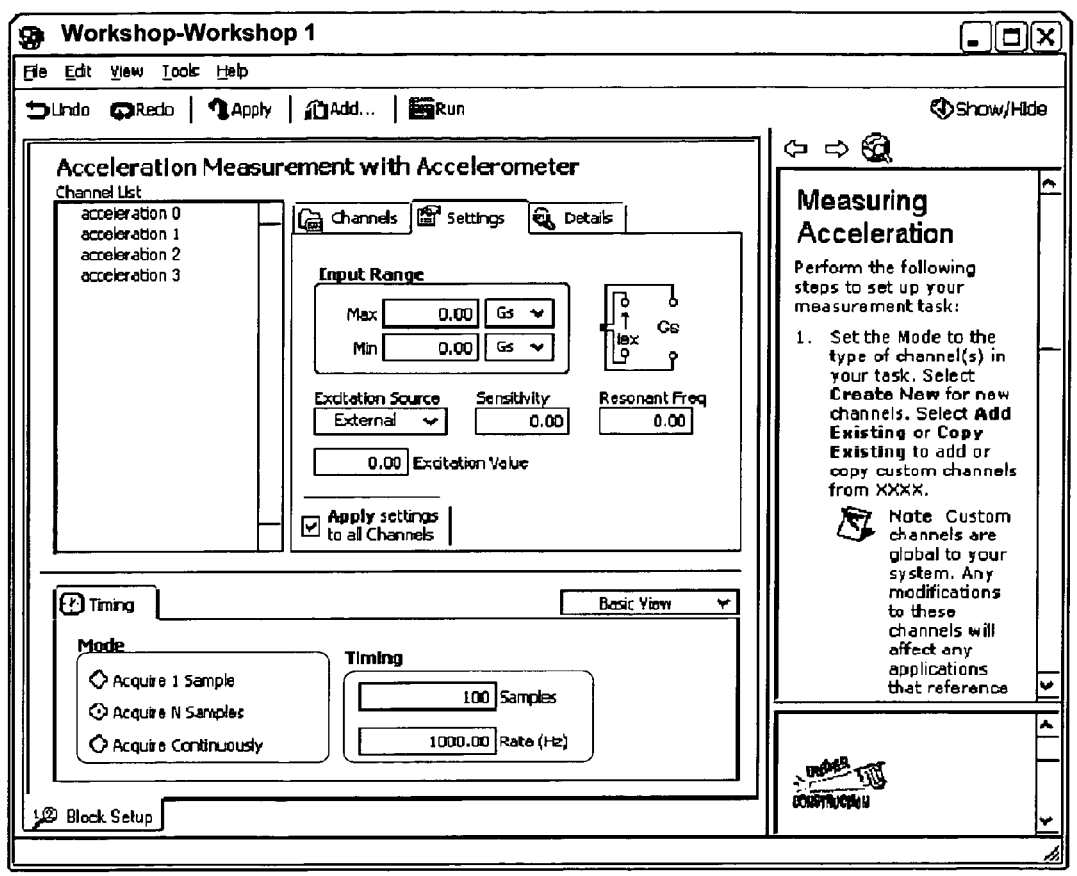
FIG. 18B illustrates a configuration panel for an acceleration measurement for the measurement task specifier, according to one embodiment.

FIGS. 18A–18B—Channel Configuration

In response to the channel selection described above, the GUI may present one or more channel configuration panels, as FIGS. 18A–18B show. FIG. 18A illustrates a channel list of the selected channels for the voltage measurement specified above. In this example, the selected channels are named in accordance with the selected measurement type, i.e., Voltage 0, Voltage 1, and so on. A settings panel is also displayed whereby the user may specify an input range for the voltage measurements, as well as desired units, e.g., V(olts). An option may also be provided for specifying whether the settings are to be applied to all of the selected channels, or to one or more of the selected channels. In this example, basic settings are presented in the settings panel, while more detailed settings are accessible by selection of the "details" tab shown, as described below with reference to FIG. 19.

FIG. 18B illustrates a configuration panel for a different measurement type, in this case, an acceleration measurement, as another example of a channel settings panel. As FIG. 18B shows, in addition to input range and unit, controls are provided for setting excitation source and value, sensitivity, and resonant frequency for the acceleration measurement. Thus, the channel configuration parameters presented may depend upon the measurement type and/or the device selected for the measurement task.

Figure 19:
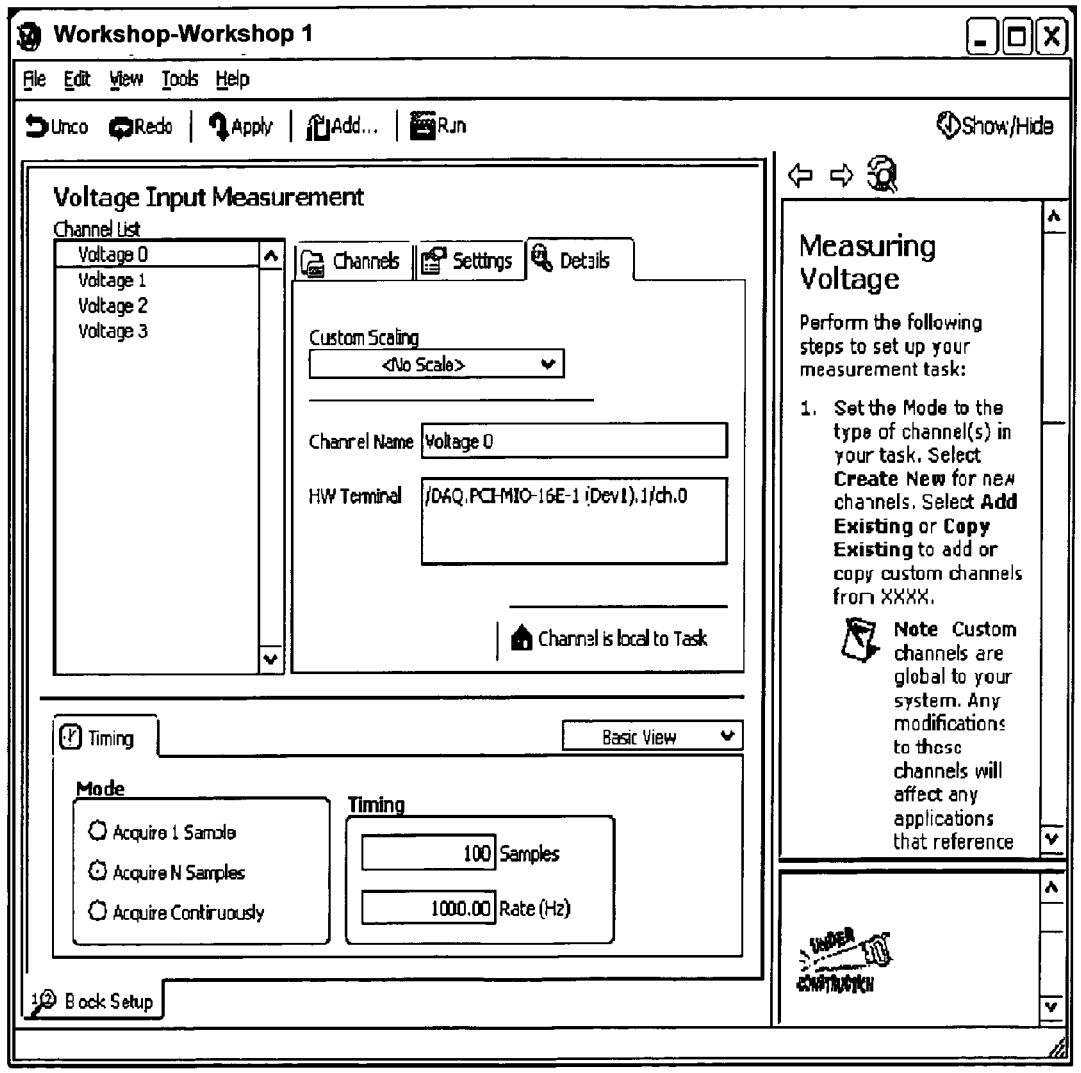
FIG. 19 illustrates detailed channel configuration panel for the measurement task specifier, according to one embodiment.

FIG. 19—Channel Configuration: Details

FIG. 19 illustrates another channel configuration panel, referred to here as a "details" panel, whereby further configuration parameters for the channels may be specified, such as scaling and channel name, among others. In this example, a particular channel (Voltage 0) has been selected for further configuration. The details panel presents a text entry field or control for modifying the channel name, as well as a control (in this case, a ring control) for selecting or specifying a scaling operation to be applied to channel signals. Further details of the scaling specification are provided below with reference to FIG. 20. The details panel may also display the selected channel's hardware terminal association, e.g., the full hardware path, as shown.

As FIG. 19 also shows, an option may be presented to the user for making one or more of the selected channels global or local channels. A global channel is one which is made available to other tasks and systems, and so any parameter changes made to the channel's configuration may affect the other tasks. Said another way, a global channel is stored in a common storage area accessible by users for other tasks. In contrast, a local channel may only be available to the local user for the specified task. If the user decides to change a locally defined or configured channel to a global channel, the system may move the channel to the global or common storage area and make the channel accessible to others. If the user decides to change a global channel to a local channel, the system may make a local copy of the global channel, generating a corresponding local channel, which then 'belongs' to the user and which may be modified as desired without affecting the original global channel.

Of course, in other embodiments, the parameters presented by the details panel and the setting panel described above with reference to FIG. 18 may be displayed by a single panel, or by more than two panels, as desired. For example, in one embodiment, the scale selector ring control may appear on the settings tab instead of the details tab. This may facilitate having independent scale selections for each channel in the channel list.

In another embodiment, the details tab may be a read-only type information tab, with no parameters actually set by the user. This tab would then be for display purposes only, presenting detailed channel information to the user, such as configured device and terminals, for example.

In one embodiment, in addition to configuring tasks that may contain one or more local or global channels, the measurement task specifier may also be operable to configure channels independent of any particular task. These channels are inherently global, as defined above, and, after being configured, can later be inserted into tasks as necessary. In this embodiment, the measurement task specifier may not present any task specific configuration panels to the user, such as the timing, triggering, and device panels, but rather, may present only panels that are used to specify channel properties. Thus, in this embodiment, the generated measurement task specification may contain only channel specific configuration information, which may then be applied to any tasks.

Figure 20:
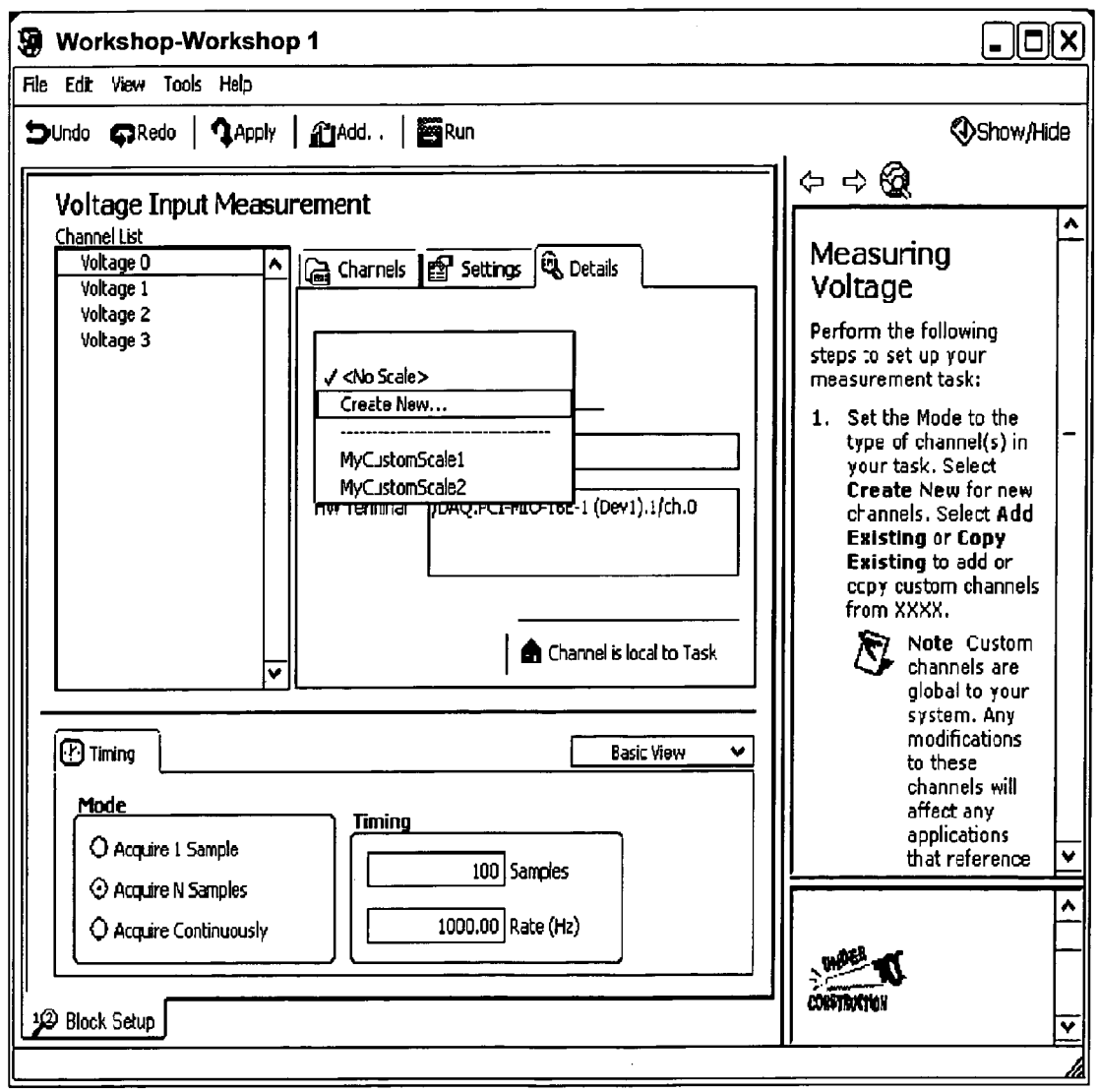
FIG. 20 illustrates selection of a scaling operation to be applied to the selected channel for the measurement task specifier, according to one embodiment.

FIG. 20—Channel Configuration: Scaling

FIG. 20 illustrates the selection of a scaling operation to be applied to the selected channel. As FIG. 20 shows, options may be provided for selection of a previously defined scaling operation, or creation of a new custom scaling operation. In this example, a new scaling operation is specified, as shown in FIG. 21.

Figure 21:
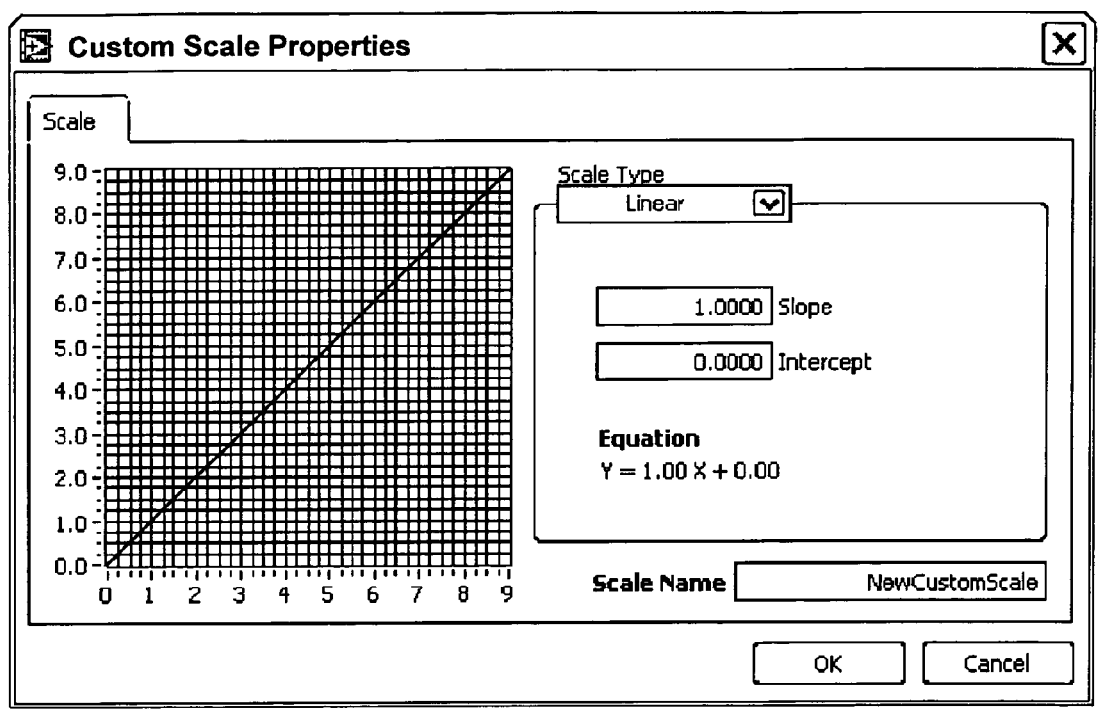
FIG. 21 illustrates an example custom scaling panel displayed in response to the scaling of FIG. 20, according to one embodiment.

FIG. 21—Channel Configuration: Custom Scaling

FIG. 21 illustrates an example custom scaling panel displayed by the GUI in response to the custom scaling selection described above with reference to FIG. 20. As FIG. 21 shows, controls may be presented for specifying one or more parameters for a given scaling operation or function. The user may first select a scaling type, such as linear, logarithmic, etc. In response to the selection of the scaling type, controls may be presented for specifying parameter values for the selected scaling type. In this example a linear scaling type has been selected, and so controls for specifying slope and intercept values for the linear scale are displayed. A field is also presented for naming the custom scaling function. In one embodiment, the specified scaling function may be displayed graphically, as shown.

Figure 22:
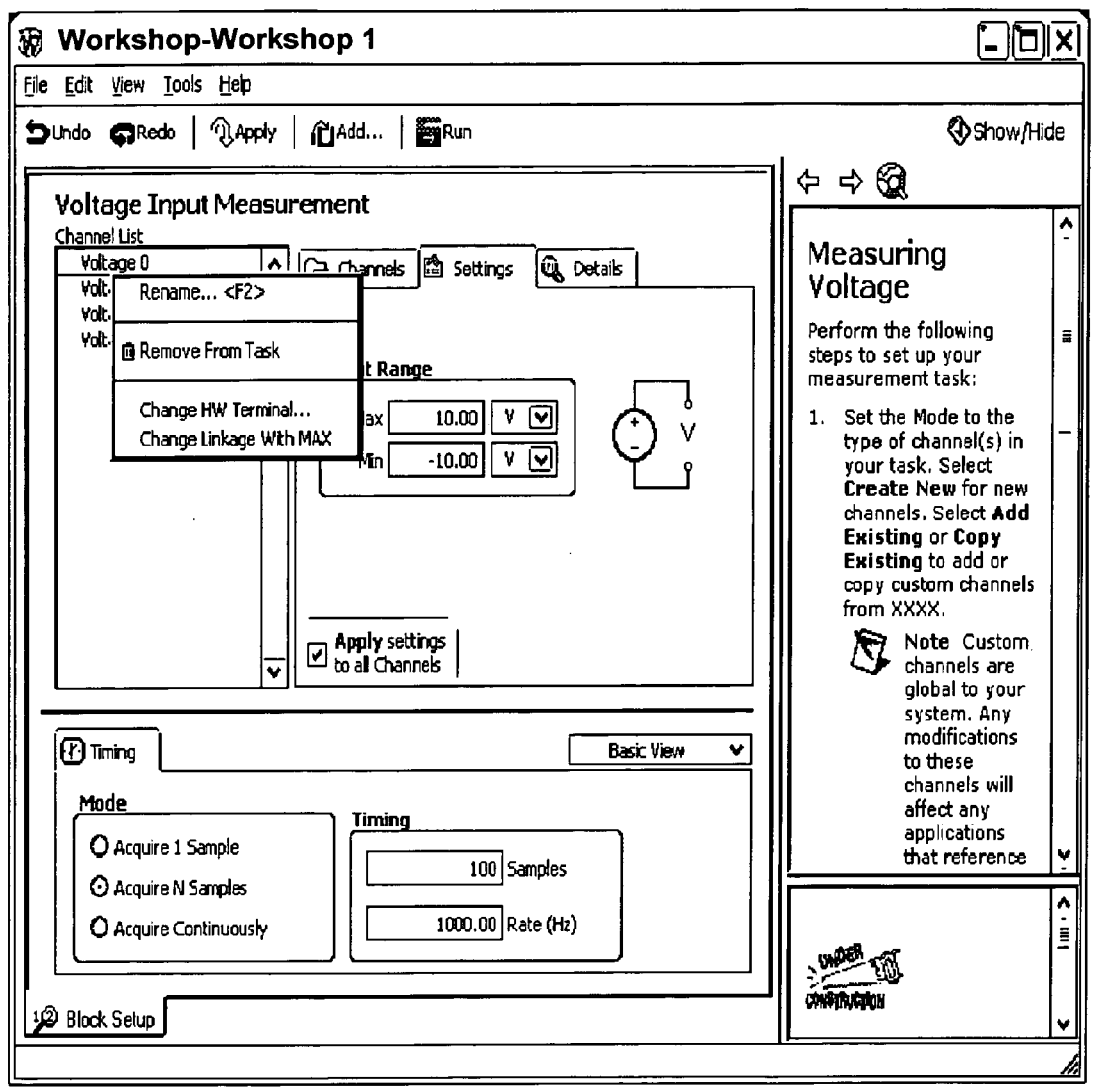
FIG. 22 illustrates an alternative approach for configuring channel settings using a pop-up menu of configuration options for the selected channel, according to one embodiment.

FIG. 22—Channel Configuration: Pop-Up Menu

FIG. 22 illustrates another approach for configuring channel settings. In this example, the user "right-clicks" on the selected channel, invoking a pop-up menu of configuration options for the selected channel, including renaming, removal, and hardware association, among others. Thus, the user may configure the channels in a variety of ways. The selection of an option from this menu may generate subsequent controls or panels by which the user may specify the corresponding parameters, examples of which are shown in FIGS. 23A and 23B.

Figure 23A:
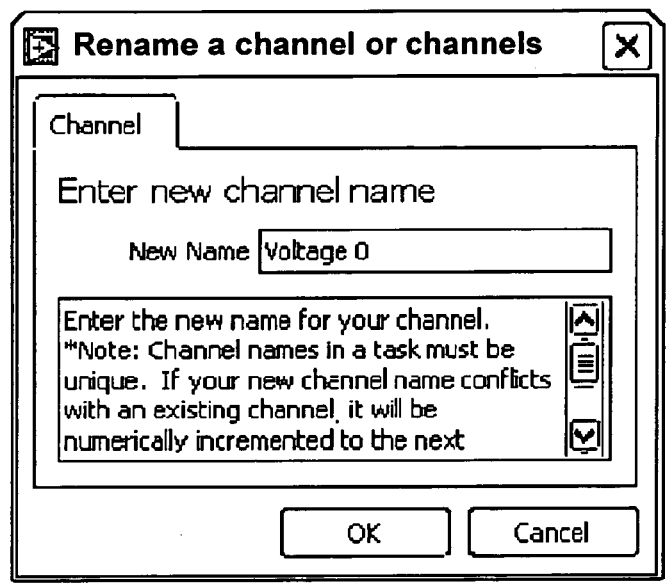
FIGS. 23A and 23B illustrate pop-up panels presented in response to the menu selections of FIG. 22 for the measurement task specifier, according to one embodiment.
Figure 23B:
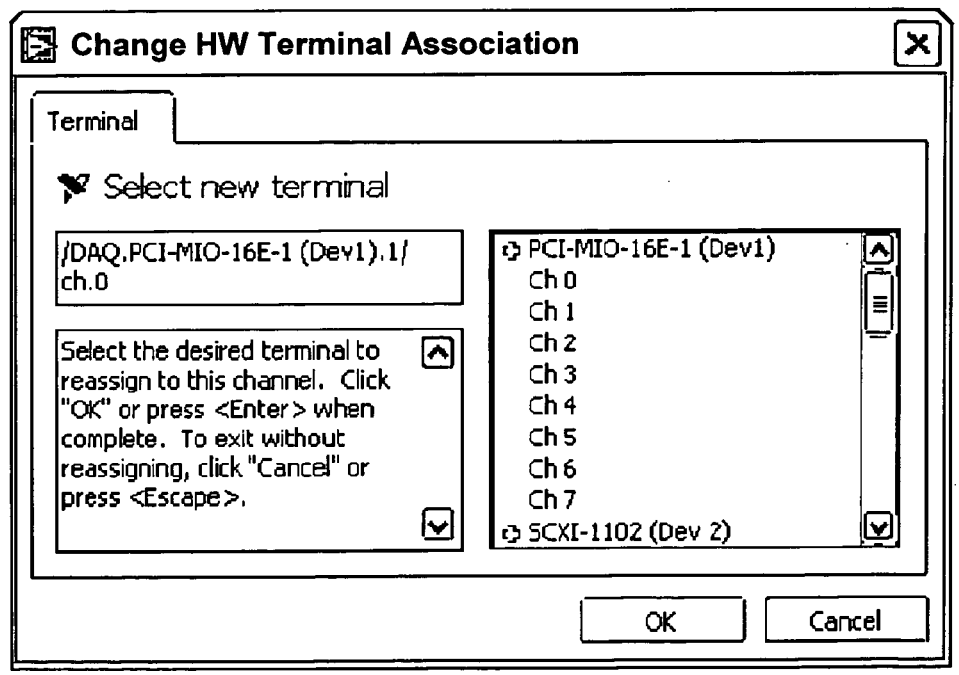

FIGS. 23A and 23B—Channel Configuration: Pop-Up Panels

FIGS. 23A and 23B illustrate pop-up panels which the GUI may present in response to the menu selections described above with reference to FIG. 22. FIG. 23A is a pop-up panel for changing the selected channel's name. FIG. 23B is a pop-up panel for changing the hardware terminal association for the selected channel. Thus, the user may easily change substantially any and all parameters associated with a channel.

Figure 24:
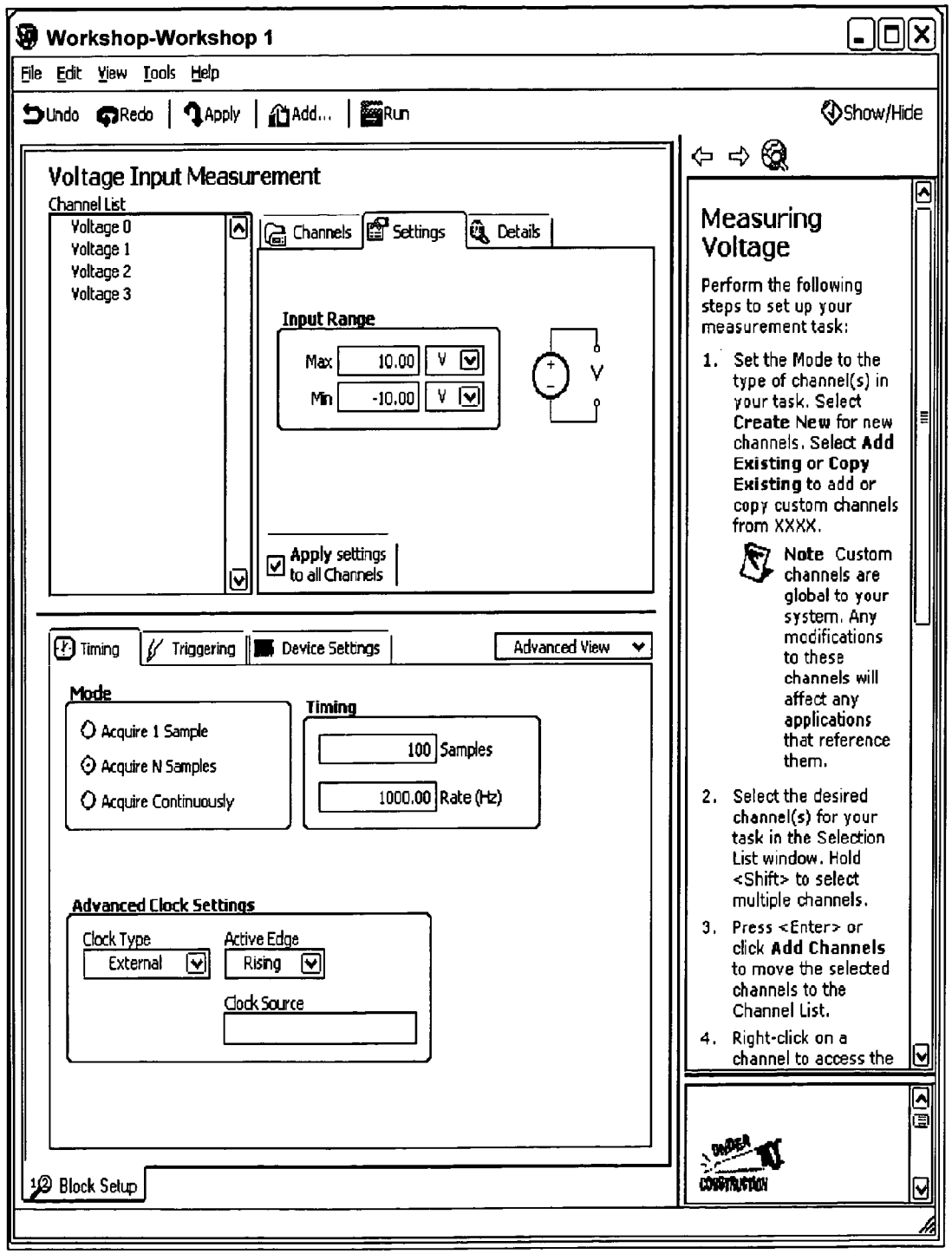
FIG. 24 illustrates an "advanced view" panel for setting timing parameters for a measurement task for the measurement task specifier, according to one embodiment.

FIG. 24—Timing: Advanced View

FIG. 24 illustrates an "advanced view" panel for setting timing parameters for the measurement task, as mentioned above with reference to FIG. 16. In this example, the selection of the advanced view for timing and triggering configuration provides options for timing, triggering, and device settings, selectable by tabs, as shown. Further details of the advanced view triggering and device setting panels are described below with reference to FIGS. 25 and 26, respectively.

As FIG. 24 shows, in this example, the advanced view timing panel presents sampling parameters, as described above with reference to FIG. 16, as well as additional parameters for clock settings. The clock parameters which may be specified may include the clock type, e.g., external or internal, and the active edge of the clock signal used to time an event, e.g., rising edge or falling edge of the clock signal pulse, among other clock parameters. The clock source may also be specified, as shown. For example, a particular clock device may be selected for provision of clocking signals for the measurement task.

Figure 25:
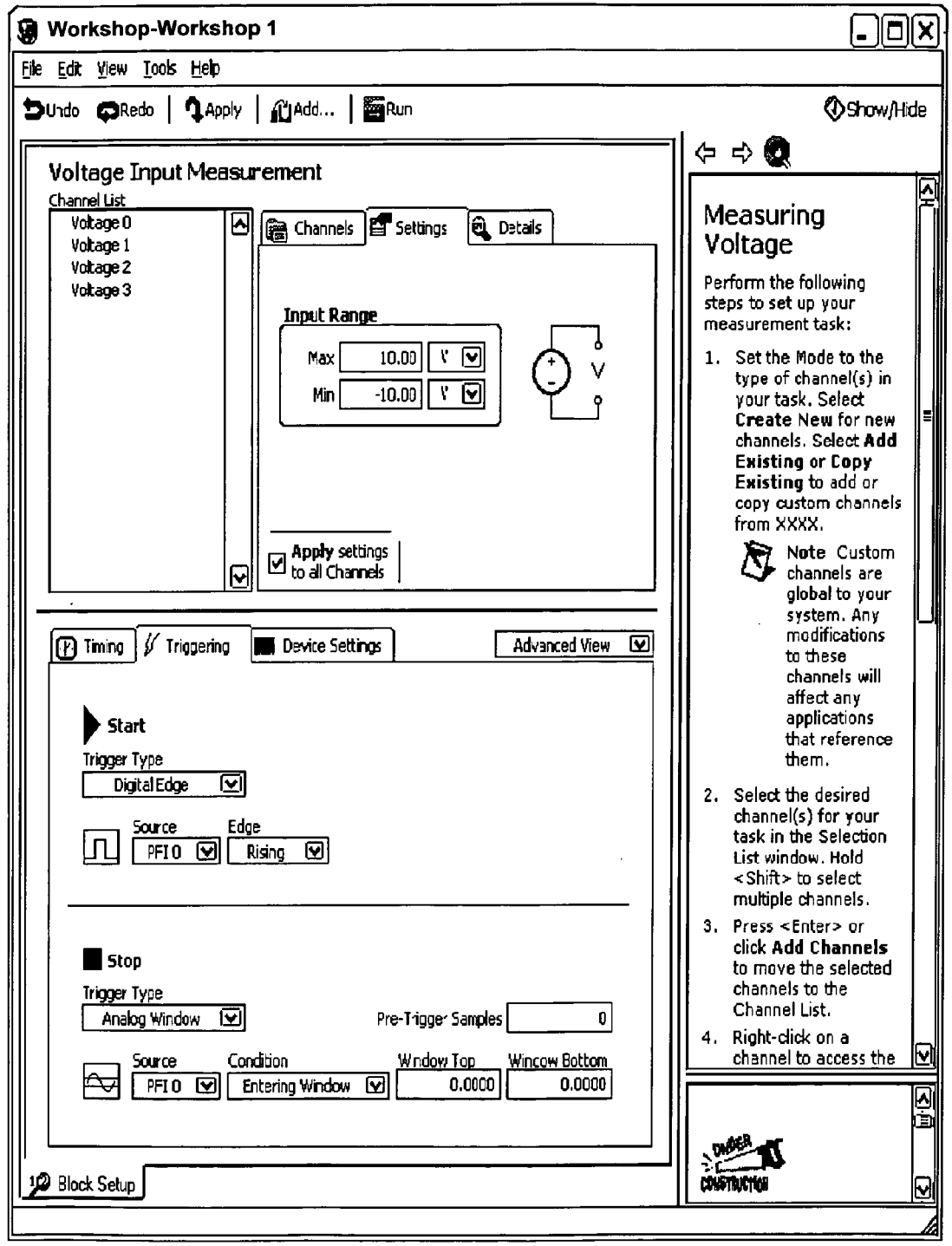
FIG. 25 illustrates an "advanced view" panel for setting triggering parameters for the measurement task for the measurement task specifier, according to one embodiment.

FIG. 25—Triggering: Advanced View

FIG. 25 illustrates an "advanced view" panel for setting triggering parameters for the measurement task, as mentioned above with reference to FIG. 24. In this example, the triggering panel may present one or more controls for specifying trigger parameters for the measurement task. In this example, controls for setting start and stop triggering parameters are presented. The start parameters include trigger type, e.g., digital edge, threshold, window, etc., as well as trigger source, and active edge of the trigger pulse. The stop trigger parameters include trigger type, source, condition, and window top and bottom. As FIG. 25 indicates, the parameter controls displayed may depend upon the trigger type selected, and thus may be context sensitive. For example, the controls presented for the trigger start parameters reflect that the trigger type is "digital edge", while those of the trigger stop reflect that the stop trigger type is "analog window". In this example, a control is also presented for specifying a number of pre-trigger samples. Pre-trigger samples may be used to capture data prior to the trigger event.

Figure 26:
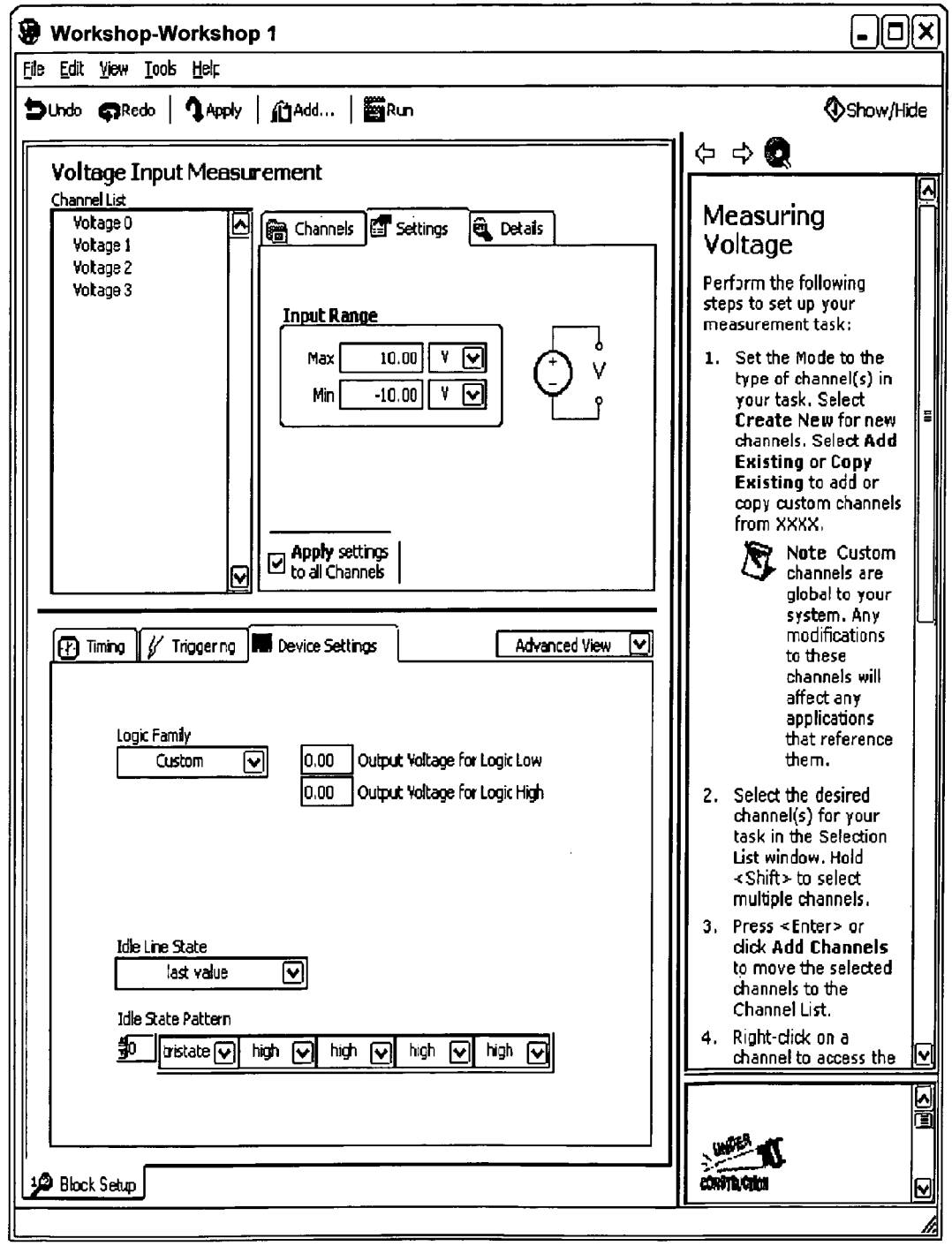
FIG. 26 illustrates a device settings panel, selectable under the advanced view for the timing and triggering panels, according to one embodiment.

FIG. 26—Device Settings

FIG. 26 illustrates one embodiment of a device settings panel, selectable under the advanced view for the timing and triggering panels. This panel may present one or more controls based upon the device selected in the channels configuration panel, described above with reference to FIG. 17. In other words, parameters specific to the selected device may be configured in this panel. In this example, logic parameters related to the PCI-MIO-16E-1 device are shown, including high/low state levels, idle line state, and idle state pattern. Of course, when other devices are selected, other corresponding parameters and controls may be presented.

Figure 27:
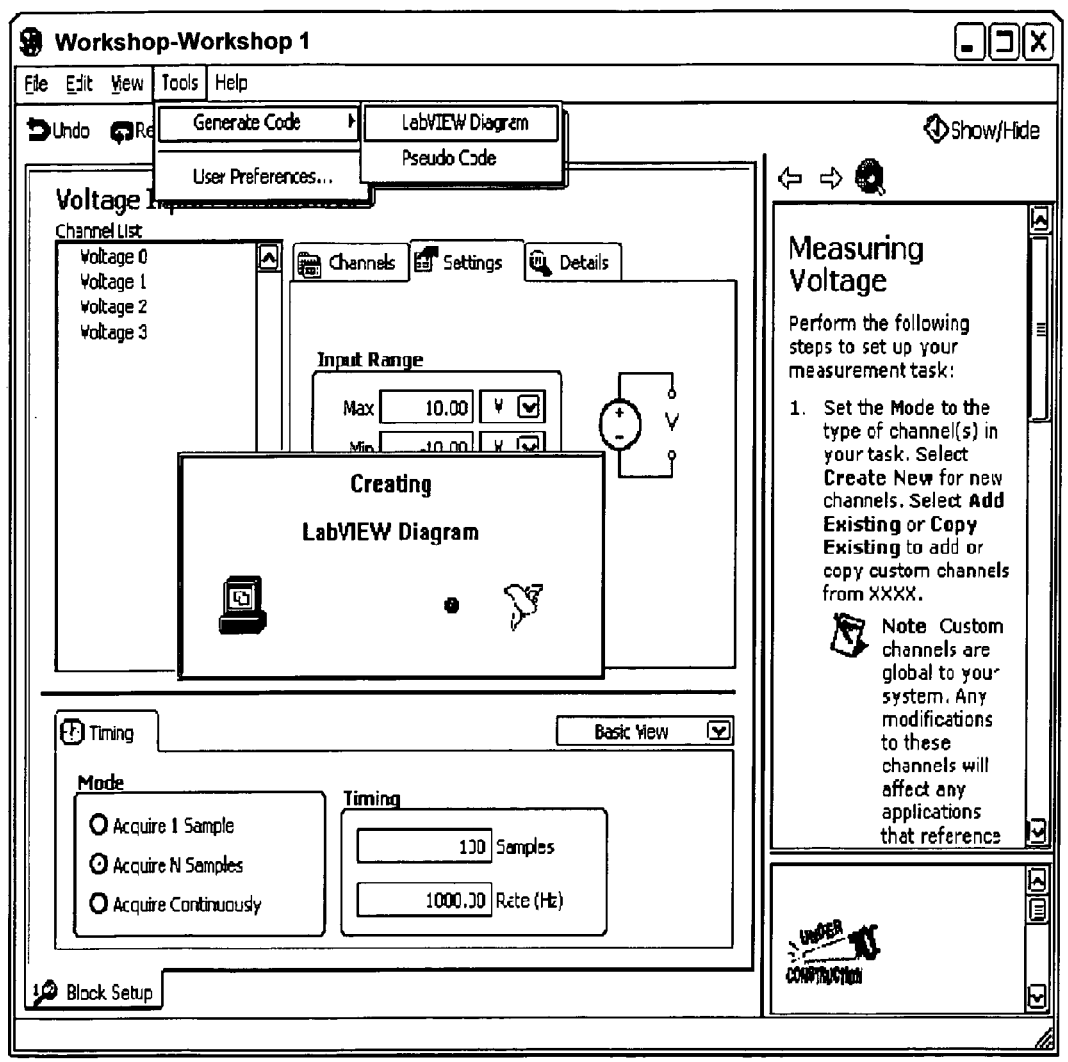
FIG. 27 illustrates options presented for the programmatic generation of an application program for performing the measurement task, according to one embodiment.

FIG. 27—Code Generation

As mentioned above, in one embodiment, options may be presented to the user for the programmatic generation of an application program for performing the measurement task. FIG. 27 illustrates an embodiment where the user may select code generation from a menu. In this example, options are presented for graphical code generation in the form of a block diagram, such as a LabVIEW diagram, and for pseudo code generation, which may include text-based programming code, such as C code or any other text-based code or pseudo code. It should be noted that although in the embodiment shown, the option to generate code is presented by the GUI of the measurement task specifier, other embodiments are also contemplated. For example, in one embodiment, the option to generate code may be presented by an application development environment (ADE), such as National Instruments LabVIEW graphical development environment. Additionally, means other than menus for selection of the code generation option are also contemplated, such as pop-up dialog boxes or menus, and GUI buttons, among others. Further details of the programmatic code generation are given below with reference to FIGS. 28A–28G.

FIGS. 28A–28G—Code Generation Levels

FIGS. 28A–28G illustrate options for selection of code generation levels and examples of generated code for each level. It is noted that the generated graphical program diagrams are intended to be exemplary only, and are not intended to limit the types or form of code generation to any particular type or form.

Figure 28A:
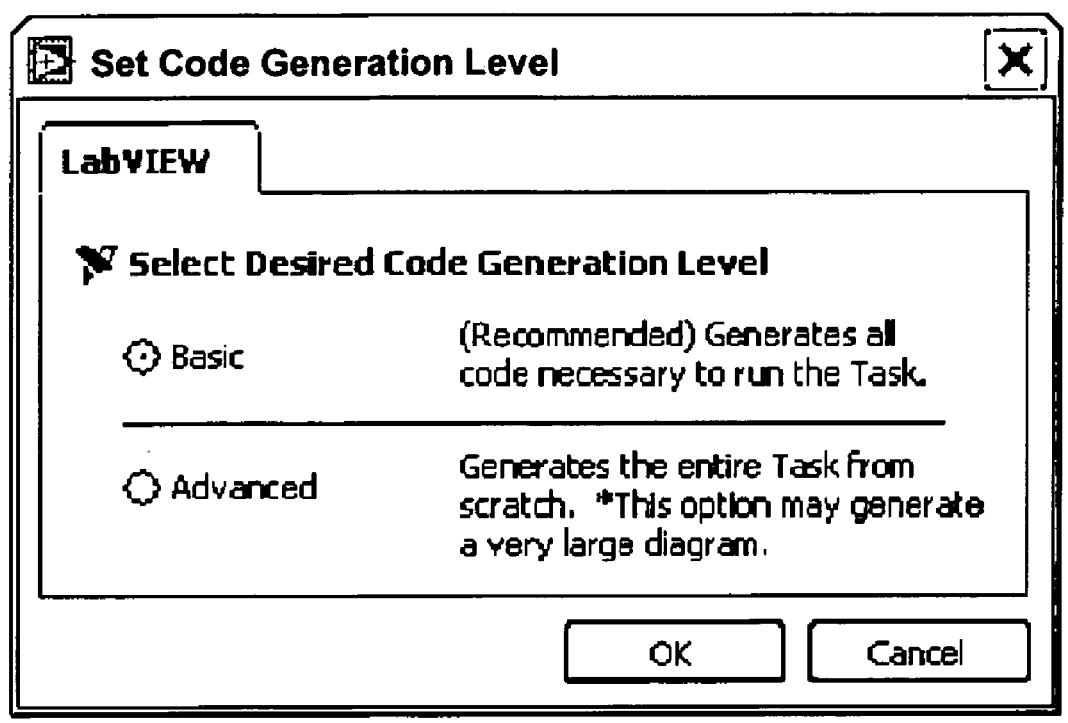
FIGS. 28A–28G illustrate options for selection of code generation levels and examples of generated code for each level for the measurement task specifier, according to one embodiment.

FIG. 28A—Code Generation Level Selection

FIG. 28A illustrates one embodiment of an options panel for selection of the code generation level. The code generation level panel may be displayed in response to the user selection of the option for programmatic code generation described above with reference to FIG. 27. In this embodiment, the options panel for selection of the code generation level is presented by the GUI of the measurement task specifier. In another embodiment, the option selections for code generation may be presented by an application development environment, e.g., LabVIEW. In yet another embodiment, the selection of code generation level may be inferred automatically, e.g., based on the context from which the measurement task specifier was invoked. For example, where the measurement task specifier is invoked or launched by clicking on a particular node in a block diagram or front panel, the type of node may automatically determine the level of code generation. In another embodiment, where the measurement task specifier is invoked by right-clicking on a node, and selecting from a pop-up menu, the code generation and/or code generation level selection may be invoked in the same manner.

Figure 28B:
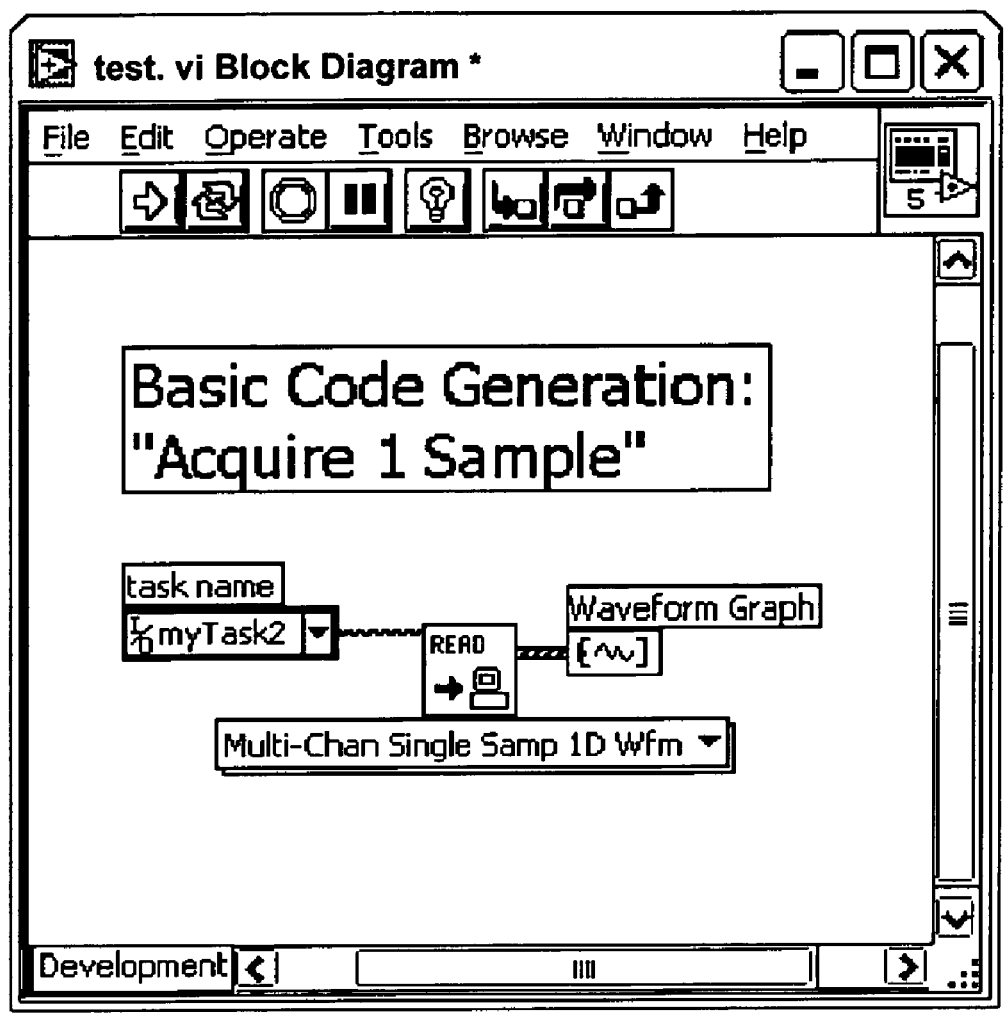
Figure 28C:
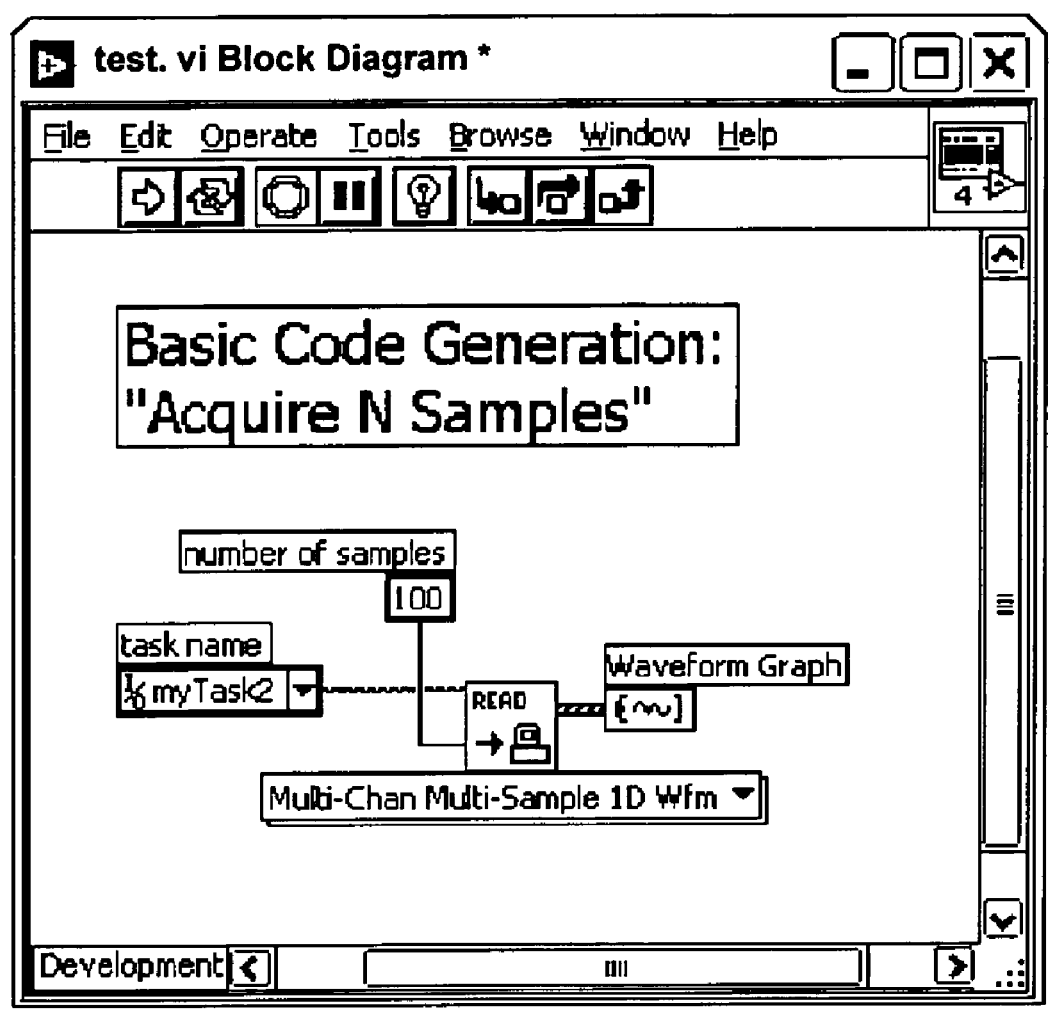
Figure 28D:
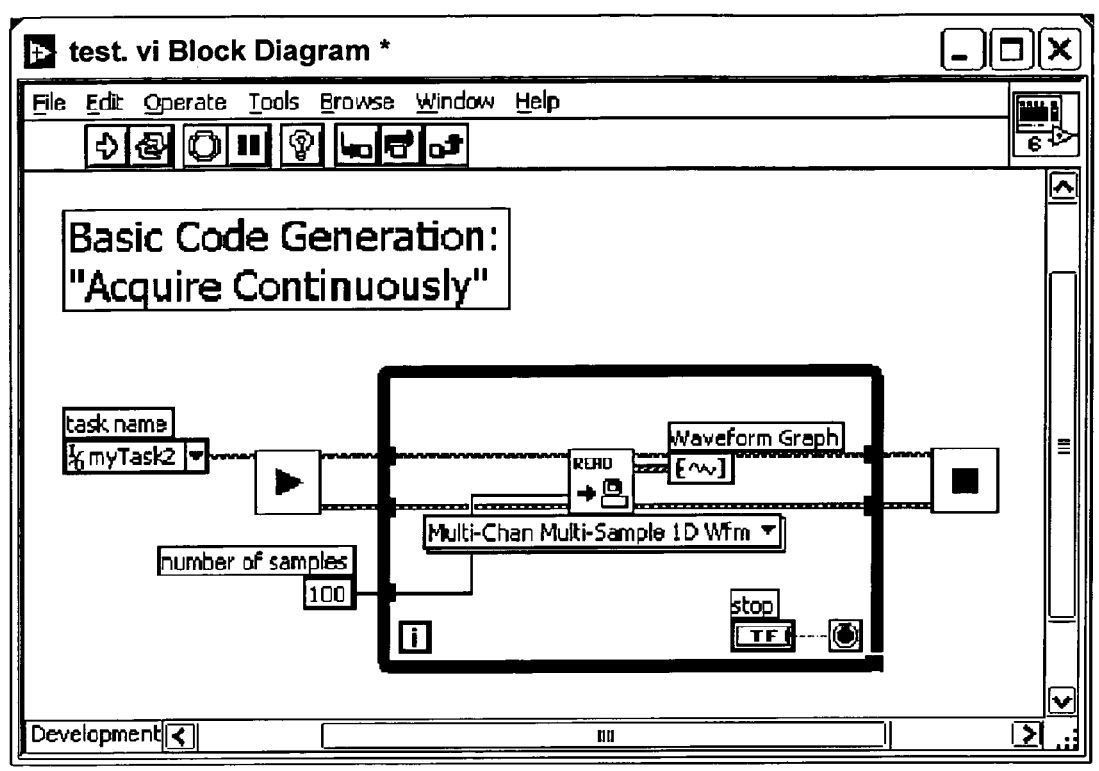
Figure 28E:
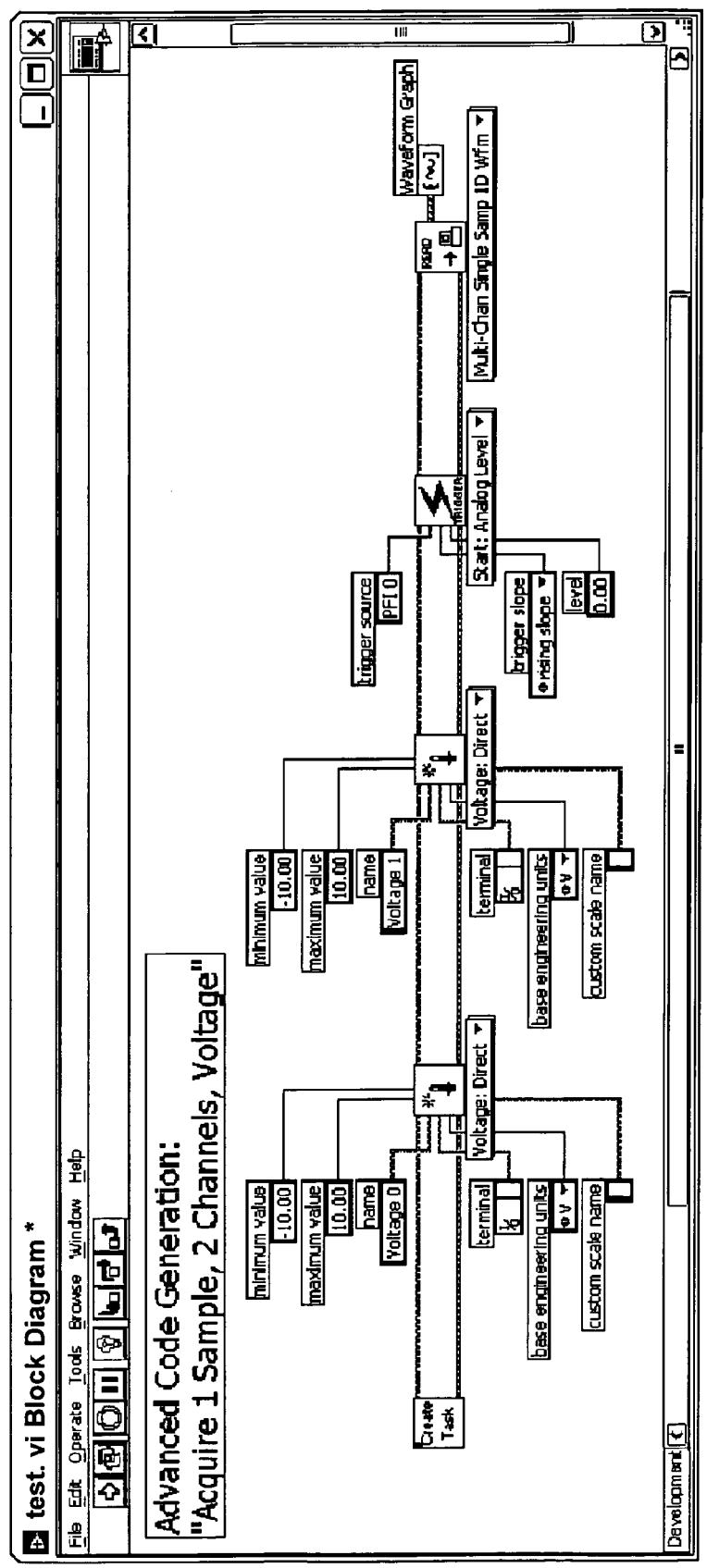
Figure 28F:
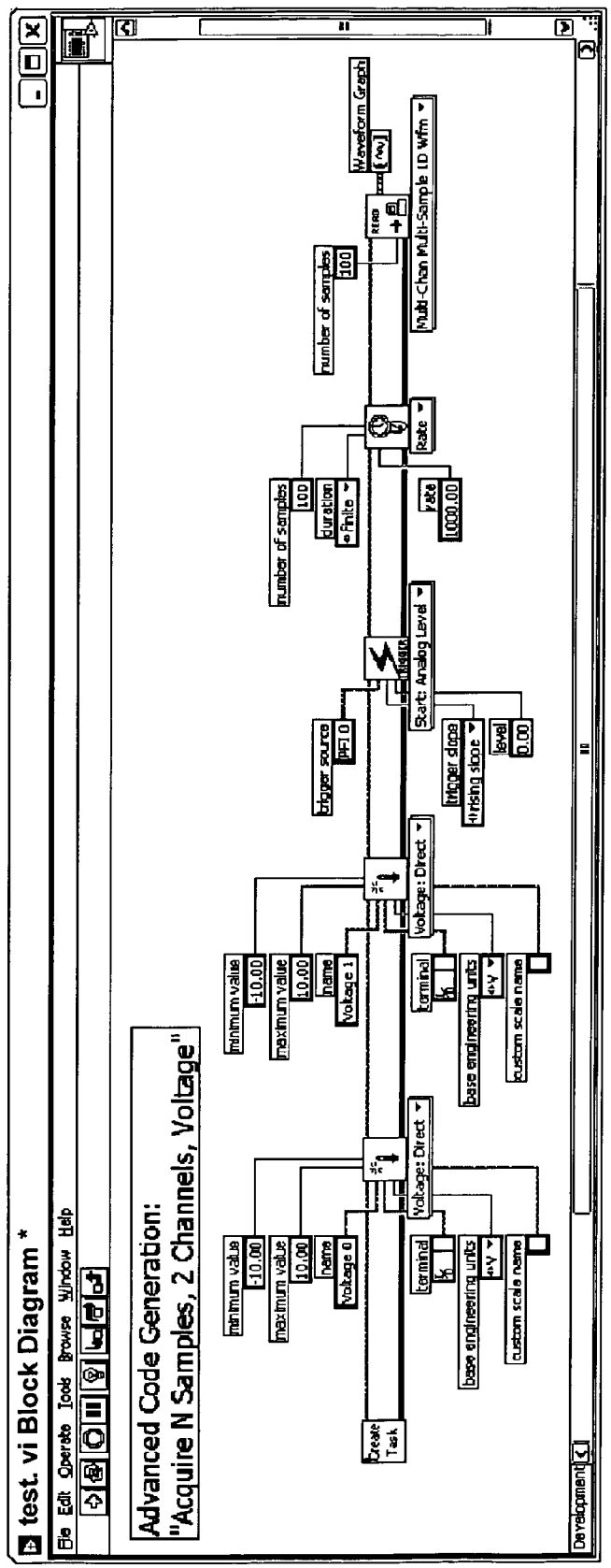
Figure 28G:
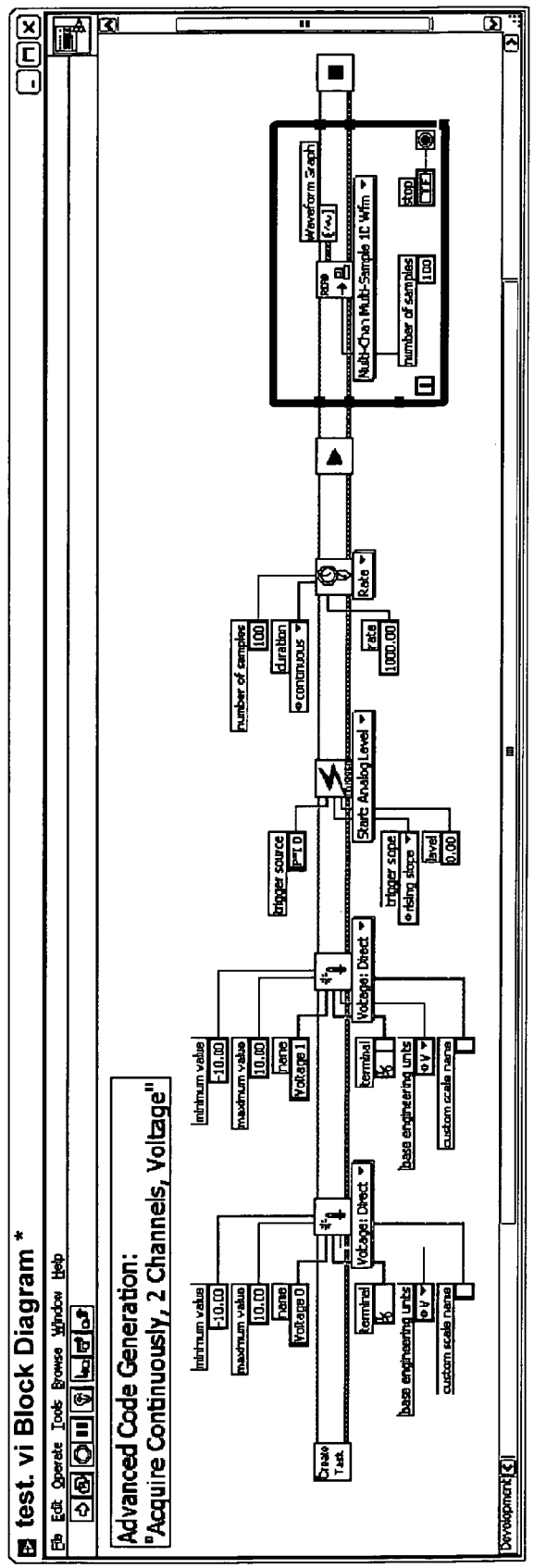

In this example, two different levels of code generation are presented: 1) basic, where all the code necessary to perform the specified task from the generated measurement task specification 740 is generated and represented by one or more nodes. Examples of basic code generation are shown in FIGS. 28B–28D, described below; and 2) advanced, where all the code necessary to perform the specified task is generated "from scratch", i.e., from the measurement parameters indicated by the user via the measurement task specifier 730, rather than from the generated measurement task specification 740. Examples of advanced code generation are shown in FIGS. 28E–28G, described below.

The provision of different levels of code generation may enhance the portability of the final product. For example, the basic level programs may use the measurement task specification 740 stored in a library or other storage means (such as MAX 704) to build a run-time 790. An issue with this level of generated code is that in order to run the program on another machine, not only the diagram or VI (the graphical program) is needed, but also the measurement task specification 740 that is stored (e.g., in MAX). Thus, the generated graphical program is not a complete exportable program. This is a primary reason for the advanced level of code generation. The advanced level program may actually build up the entire measurement task specification 740 "from scratch" on the user's diagram, i.e., the program may build the measurement task specification dynamically from the user-indicated parameters. The purpose of this is to show exactly what it takes to build a low level program. Also, because it builds everything from scratch, the program may easily be deployed to another machine, since it does not rely on the task object (the measurement task specification 740) to be present (in MAX).

In one embodiment, code may be generated at a simpler level than the 'basic' level described above. At this level, all code for the measurement task is generated into, or represented by, a single "wizard-locked" node or subVI. The term "wizard-locked" refers to the fact that whereas a typical graphical program node or subVI may be expanded into a sub-diagram, such as by (double) clicking on the node, a wizard-locked node simply invokes the "wizard" (in this case, the configuration tool 730), allowing the user to edit the node specifications or functionality without giving the user visual or direct access to the actual diagram. In other words, the actual graphical code is encapsulated by a single node, and the user does not have access to the contents of the node except through the wizard or configuration tool 730.

FIGS. 28B–28D—Basic Code Generation

FIGS. 28B–28D are examples of basic code generation for the voltage measurement example described above, according to one embodiment. In FIG. 28B, a single sample measurement is coded into a block diagram as a single node which accepts as input the configured measurement task specification 740, here labeled myTask2. FIG. 28C illustrates a generated block diagram of the same program, but with N samples (in this case, 100 samples) taken instead of a single sample.

It should be noted that the single node, in this case a read node, may encapsulate or encode both the conversion of the measurement task specification 740 into an executable run-time 790, as described above in steps 508 and 510 of FIG. 7, and the execution of the run-time to perform the specified task.

In other words, the graphical program may include a node which is configured to receive the measurement task specification as input, i.e., an input terminal of the node may be connected to an output terminal of another node in the graphical program, e.g., a measurement task specification node, which may provide the measurement task specification to the node as input. Upon execution of the graphical program, the node may receive the measurement task specification as input, invoke an expert system to analyze the measurement task specification and generate a run-time specification for the measurement task in response to the analyzing, as shown in 750 and 770 of FIG. 12. The node may then invoke a run-time builder to analyze the run-time specification and generate a run-time based on the run-time specification, as shown in 780 and 790 of FIG. 12. Finally, the node may invoke execution of the run-time to perform the measurement task. Thus, the single node may operate to convert the measurement task specification to an executable run-time, and execute the run-time to perform the specified measurement task. In one embodiment, this single node may be a primitive node provided by a graphical programming development environment for inclusion in the graphical program.

FIG. 28D illustrates a generated block diagram of the same program, but configured for continuous acquisition, i.e., for continuous sampling. In this case, in addition to the read node (embedded in a loop), there are explicit nodes for starting (e.g., a play or start node) and stopping (e.g., a stop node), respectively. In one embodiment, the play node may be or may function as the single node described above. In other words, the play node may receive the measurement task specification 740 as input, invoke the expert system 750 and run-time builder 780, as described above, thereby generating the run-time 790, and execute the generated run-time to perform the specified measurement task.

As FIG. 28D shows, in this example, the play node accepts the task as input, and is further wired to the read node through the loop. The read node is further wired to the stop node. The explicit start and stop nodes may be necessary because of the lack of starting and stopping conditions implicit in the task specification. In other words, the measurement task involves continuous acquisition of data until termination by the user. In the examples of FIGS. 28B and 28C, the play node (start) and the stop node may be considered to be implicit in the read node. It is further noted that were the task specified to generate a signal, the read node would be replaced with a write node. As FIG. 28D also shows, the number of samples returned by the read node per iteration cycle (of the while loop) is here specified to be 100 samples. In other words, for each cycle of the while loop, the read node may return 100 samples to the system. Note than in one embodiment, a play node (and a stop node) may be used when the measurement task does not include continuous acquisition of data.

FIGS. 28E–28G—Advanced Code Generation

FIGS. 28E–28G illustrate programmatically generated code at the advanced level for the voltage measurement task described above, according to one embodiment. As described above with reference to FIG. 28A, the code, i.e., the graphical block diagram, generated at the advanced level may include not only all the code necessary to perform the task (as in the basic level), but may include all the necessary program components explicitly. In other words, the full block diagram for each step or component of the specified measurement task may be included explicitly in the diagram. For example, as described below, the generated graphical program may include configuration components which operate to generate the measurement task specification from the user-supplied parameters. It is noted that advanced code generation may result in extremely large graphical programs or diagrams. The diagram or code generated at the advanced level may be the same as the diagram or code that a user would have to program manually, i.e., without the use of the configuration tool 730 (measurement task specifier 730), to perform the specified measurement task.

FIG. 28E illustrates a block diagram of the voltage measurement task described above where two channels are used and 1 sample is acquired. Note the explicit inclusion of channel, clock, and trigger configuration nodes, in addition to the read node. These configuration nodes are described in more detail below. FIG. 28F illustrates a block diagram of the voltage measurement task described above where two channels are used and N samples are taken (here shown as 100 samples). FIG. 28G illustrates a block diagram of the voltage measurement task described above where two channels are used to make continuous acquisitions of voltage data. As described above with reference to FIG. 28D, continuous acquisition of data involves a loop, as shown, as well as explicit play (start) and stop nodes for beginning and ending the continuous acquisition or sampling.

In the advanced code generation programs of FIGS. 28E–28G, the left-most node is a "create task" node, which operates to create a measurement task specification container or structure. This container may start out "empty", then be incrementally filled or built up by successive configuration nodes of the program, as shown. The top horizontal wire running through all of the nodes leading to the read node represents the measurement task specification's evolution or build process, and eventual input to the read node.

Thus, in one embodiment, the single node described above which receives the measurement task specification may be connected or wired to a configuration node, which may in turn be wired to further configuration nodes, and which operates to configure the measurement task specification for input to the node. This is in contrast to the basic code generation where the single node is wired to the measurement task specification node which represents the already generated measurement task specification 740. Thus, the configuration node(s) may operate to generate the measurement task specification 740 for input to the single node.

For example, in FIGS. 28E–28G, the next two nodes after the create task node are channel configuration nodes. These two nodes may operate to configure two corresponding channels for the voltage measurement by applying the channel parameters received by the task specifier 730. In other words, the two channel nodes may add channel configuration information to the measurement task specification 740. The next node in the succession is a trigger node which may add trigger configuration information to the specification 740. Note that in the diagram of FIG. 28E, because this is a one sample measurement, no clock configuration node is necessary. The program block diagrams of FIGS. 28F and 28G each include a clock configuration node just subsequent to the trigger configuration node which may add clocking configuration information to the measurement task specification 740. Thus, each successive configuration node may add respective configuration information (based on user input parameters collected or provided by the measurement task specifier 730) to the measurement task specification 740.

Finally, the last configuration node, e.g., the triggering configuration node in FIG. 28E, or the clock configuration node of FIGS. 28F and 28G, may be wired to the single node, thereby providing the resultant measurement task specification 740 as input to the node. Note that this resultant measurement task specification 740 is the same as that generated by the measurement task specifier 730 and represented by the measurement task specification node of FIGS. 28B–28D, described above. In this case, however, the specification 740 is generated "on the fly" during execution of the graphical program.

Note that in the diagrams of FIGS. 28E and 28F, the single node is a read node, for performing the specified finite sampling measuring tasks (i.e., measurements with a defined number of samples). In contrast, in the diagram of FIG. 28G, the single node is a play node rather than a read (or write) node because the measurement task is a continuous acquisition measurement which uses a loop. The play node may be connected to a read node for performing a measurement, and/or a write node for performing signal generation. Note than in this case, a stop node is also included in the diagram for terminating the continuous acquisition task. Thus, the graphical program may include a stop node connected to a read node and/or a write node for terminating a continuous measurement or generation task.

Figure 29:
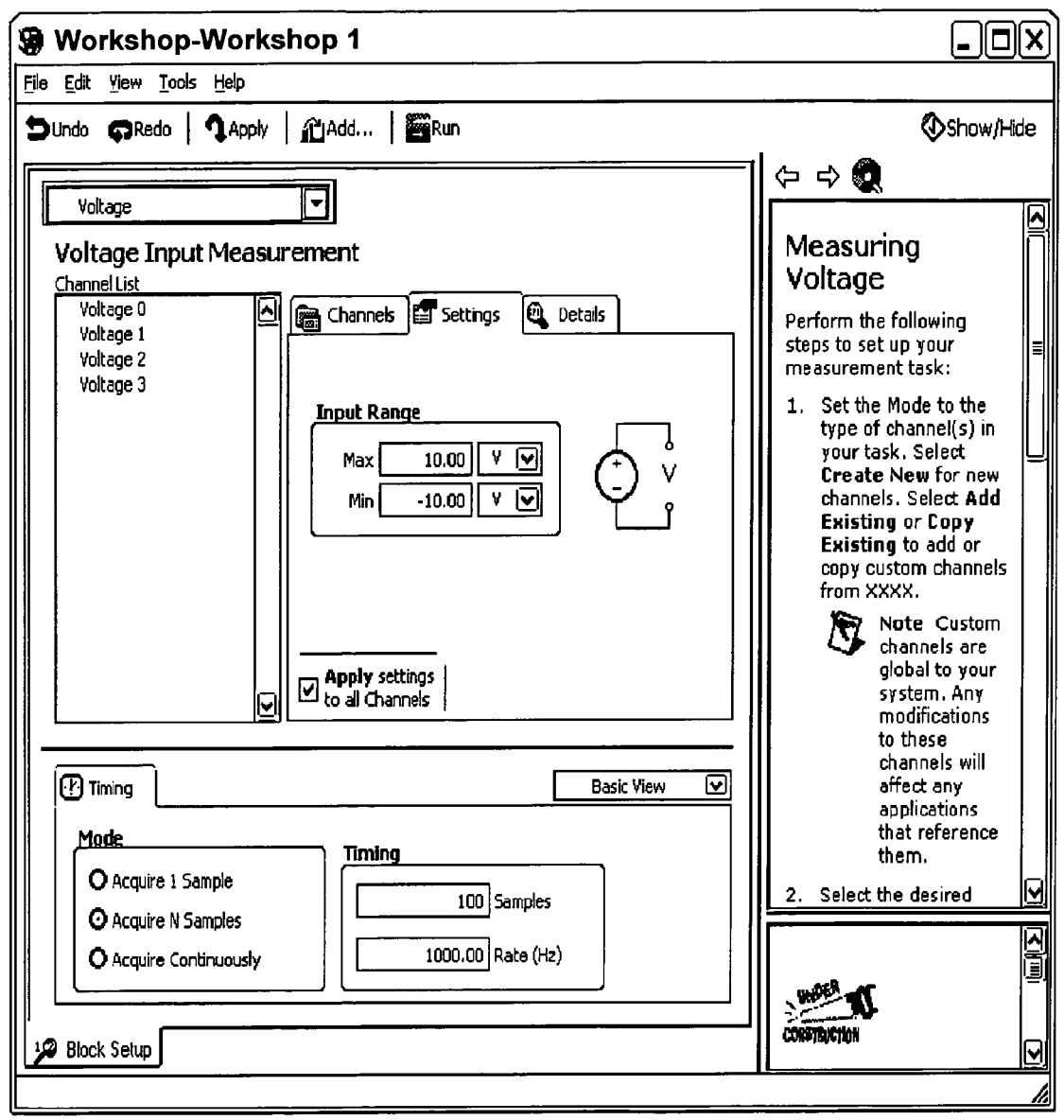
FIG. 29 illustrates an embodiment of a configuration tool that includes a measurements control that indicates the particular measurement type currently being configured for the measurement task specifier, according to one embodiment.

FIG. 29—Complex Measurement Tasks

In one embodiment, the configuration tool 730 may allow the specification of multiple measurement types in a single measurement task, subject to feasibility. For example, a measurement task may include measuring both temperature and pressure, or temperature and voltage. As another example, in a testing application, the measurement task may include both the generation of a signal for stimulation of a device, and measurement of the voltage response of the device. Thus, the measurement task may include one or more measurements, and/or one or more signal generations. FIG. 29 illustrates an embodiment of the configuration tool which includes a measurements control (in this case a ring control) which indicates the particular measurement (type) currently being configured. For example, assume that a temperature measurement has already been specified or configured by the user, and now the user is in the process of specifying a voltage measurement. The ring control therefore displays the current (voltage) measurement type. In one embodiment, the user may access the control, and select any previously specified measurement of the task, such as the mentioned temperature measurement, and edit parameters for that aspect of the task. Thus, the various different measurement types included in the measurement task may be considered sub-tasks in the overall measurement task.

In one embodiment, the measurement task may include a complex measurement operation using a plurality of measurement devices, where at least one of the measurement devices is a measurement hardware device. In another embodiment, at least one of the plurality of measurement devices may be a virtual measurement device, i.e., a device implemented in software.

Example Virtual Instrument Diagrams

FIGS. 30A, 30B, 31A and 31B illustrate various improvements of the present invention over some prior art systems. For illustrative purposes, Virtual Instruments (VIs) implemented in National Instruments LabVIEW™ graphical development environment are shown which use a variety of measurement devices, such as National Instruments E-Series™ Data Acquisition (DAQ) devices, to implement various measurement tasks. It should be noted that these embodiments are for illustrative purposes only, and are not intended to limit the invention to any particular implementations or types of measurement devices.

Figure 30A:
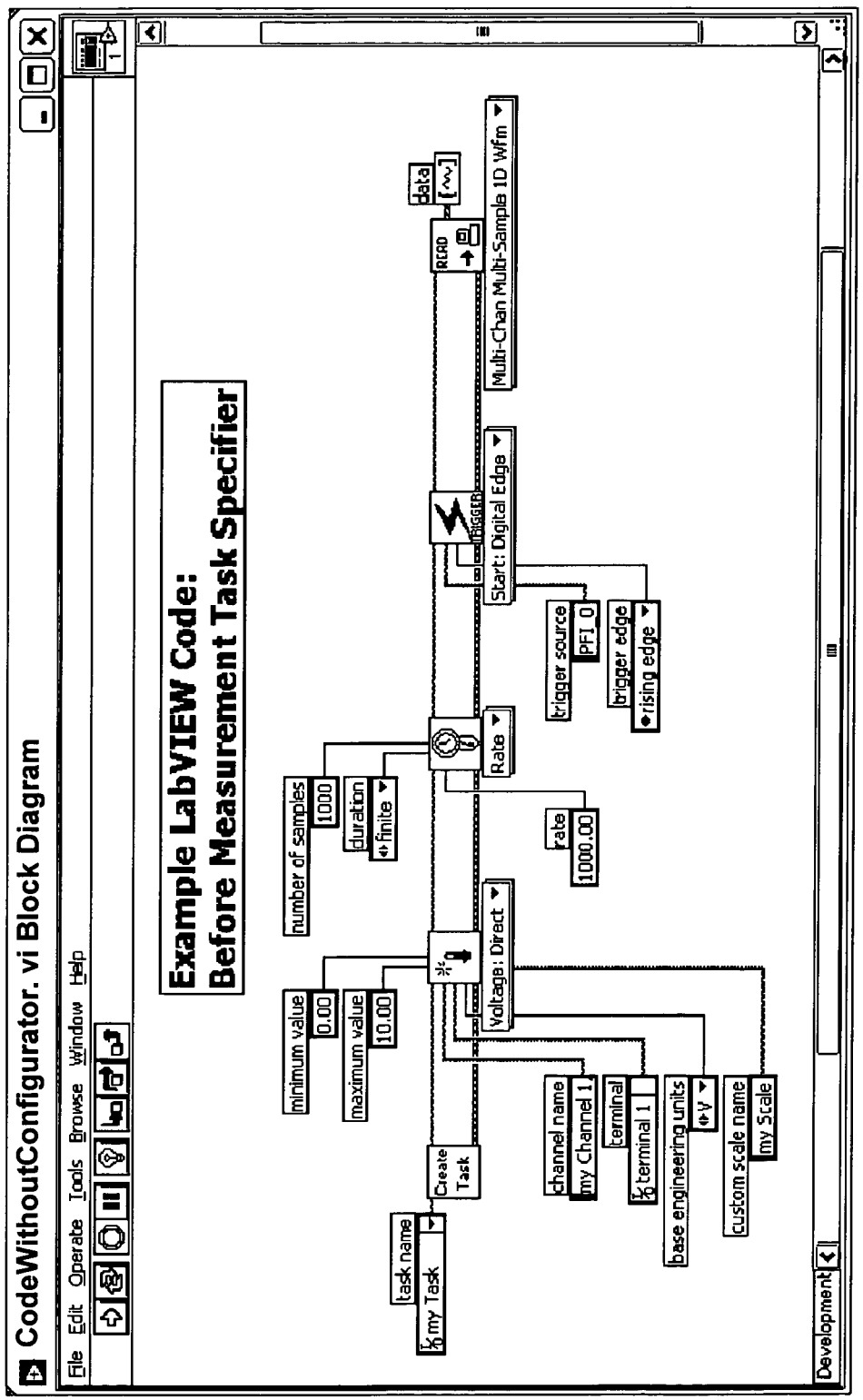
FIG. 30A illustrates a graphical program block diagram programmed manually by the user for a voltage measurement task, according to the prior art.
Figure 30B:
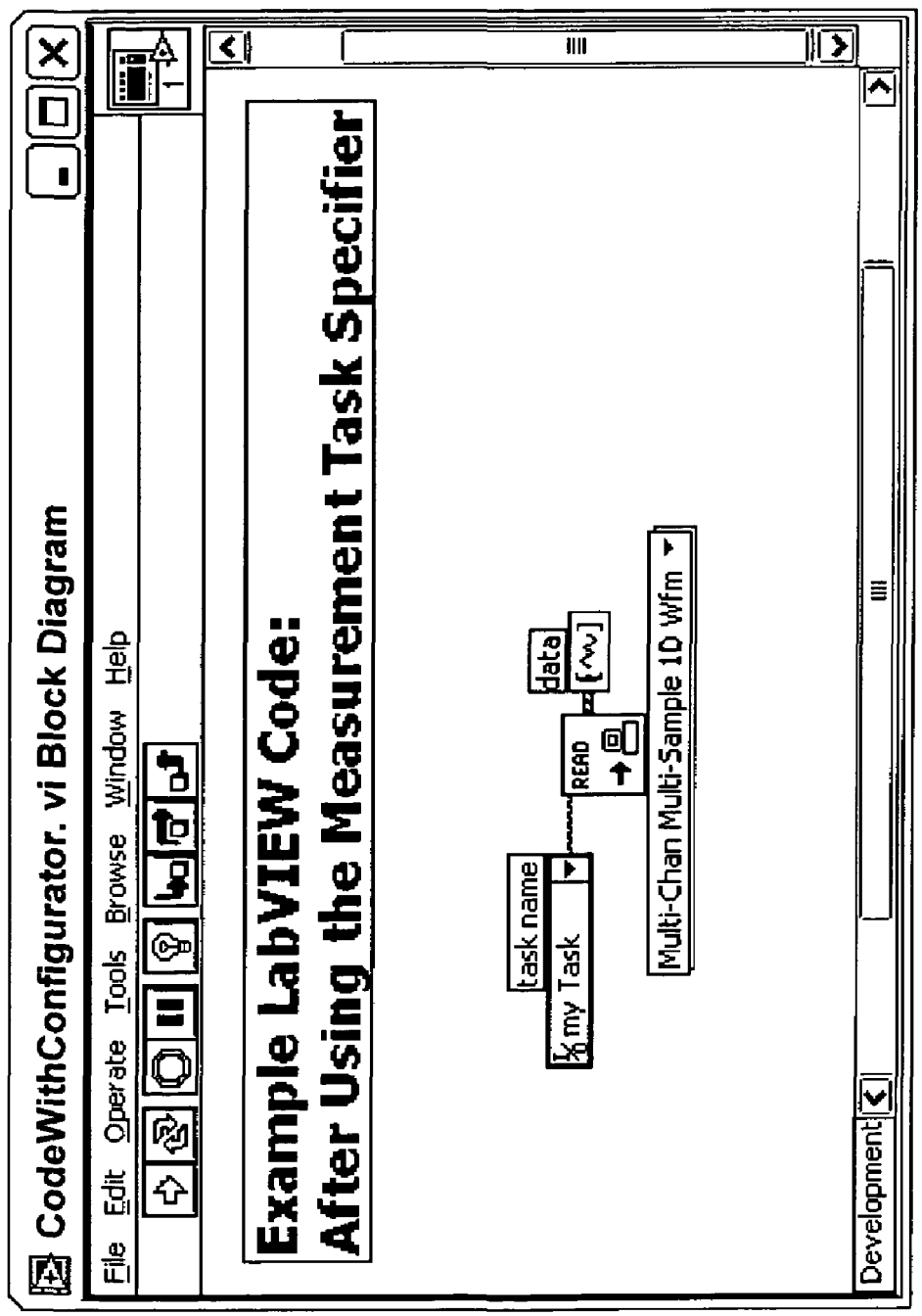
FIG. 30B illustrates a graphical program block diagram generated by the configuration tool for the voltage measurement task of FIG. 30A, according to one embodiment.

FIGS. 30A–30B—Comparison of Generated Code to Prior Art Code

FIGS. 30A and 30B illustrate differences between a graphical program block diagram generated by the configuration tool 730 for the voltage measurement task described above and a graphical program block diagram programmed manually by the user for the same voltage measurement task. FIG. 30A illustrates the manually produced (prior art) diagram. As FIG. 30A shows, each aspect of the measurement task is explicitly included in the diagram, including channel, timing, and triggering configuration. In contrast, FIG. 30B illustrates an example of the block diagram for performing the same measurement task as generated by the configuration tool 730 (i.e., the measurement task specifier 730). As FIG. 30B shows, the complexities of the block diagram of FIG. 30A have been reduced to a single node, the read node, which is wired to the task specification (myTask) 740 for input. As described above, because this task does not involve continuous acquisition, the play (start) node and stop nodes are implicit in the read node.

Figure 31A:
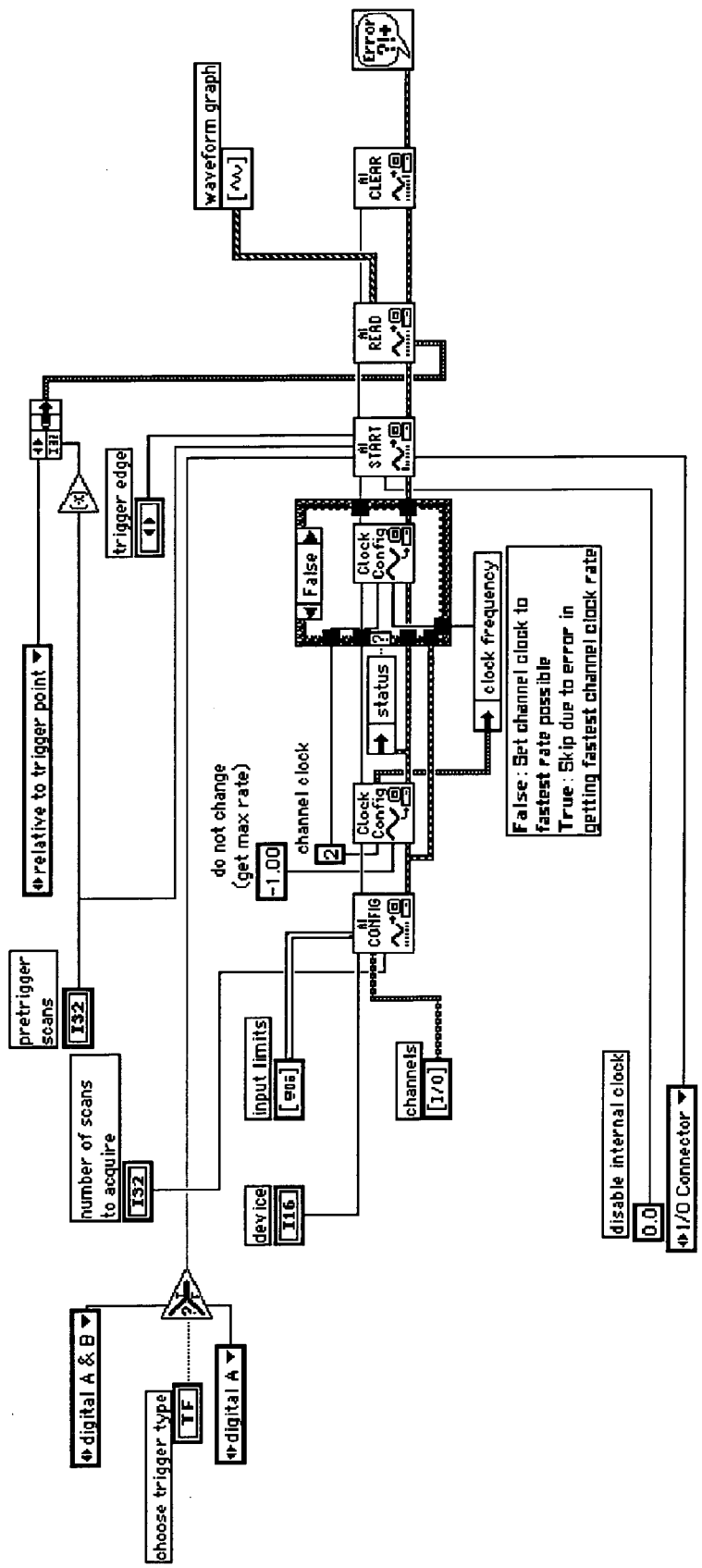
FIG. 31A illustrates a VI for acquisition of N scans with an external scan clock digital trigger, according to the prior art.

FIG. 31A—Acquisition of N Scans with External Scan Clock and Digital Trigger (Prior Art)

FIG. 31A illustrates a VI for acquisition of N scans with an external scan clock and digital trigger, according to the prior art. As FIG. 31A shows, there are a number of configuration sub-VIs scattered throughout the diagram, including clock configuration, trigger configuration, and analog input (AI) configuration. These configuration details add expense to the coding, debugging, and testing cycles, and may intimidate some customers.

FIG. 31B—Acquisition of N Scans with External Scan Clock and Digital Trigger

FIG. 31B illustrates a VI for acquisition of N scans with an external scan clock and digital trigger, according to one embodiment of the present invention. In one embodiment, the VI illustrated in FIG. 31B may be generated using the measurement task configuration tool 730, described above. As FIG. 31B shows, the specified VI is radically simpler than the prior art diagram of FIG. 31A. Benefits of such simplification may include reduction in expense of the code, debug, and test cycles of software development. Additionally, the removal of configuration clutter from the diagrams may encourage so-called "tinkerer" customers to more boldly explore and define measurement operations for a variety of applications.

As FIGS. 30A–30B and 31A–31B illustrate, the use of the measurement task specifier 730 to generate programs for perform measurement tasks may greatly simplify not only the specification of the task, but the resulting application programs, as well. Thus, the use of the measurement task specifier 730 may reduce the effort required of a user to specify, create, and maintain programs for performing desired measurement tasks, and may increase the usability of measurement systems.

Figure 32A:
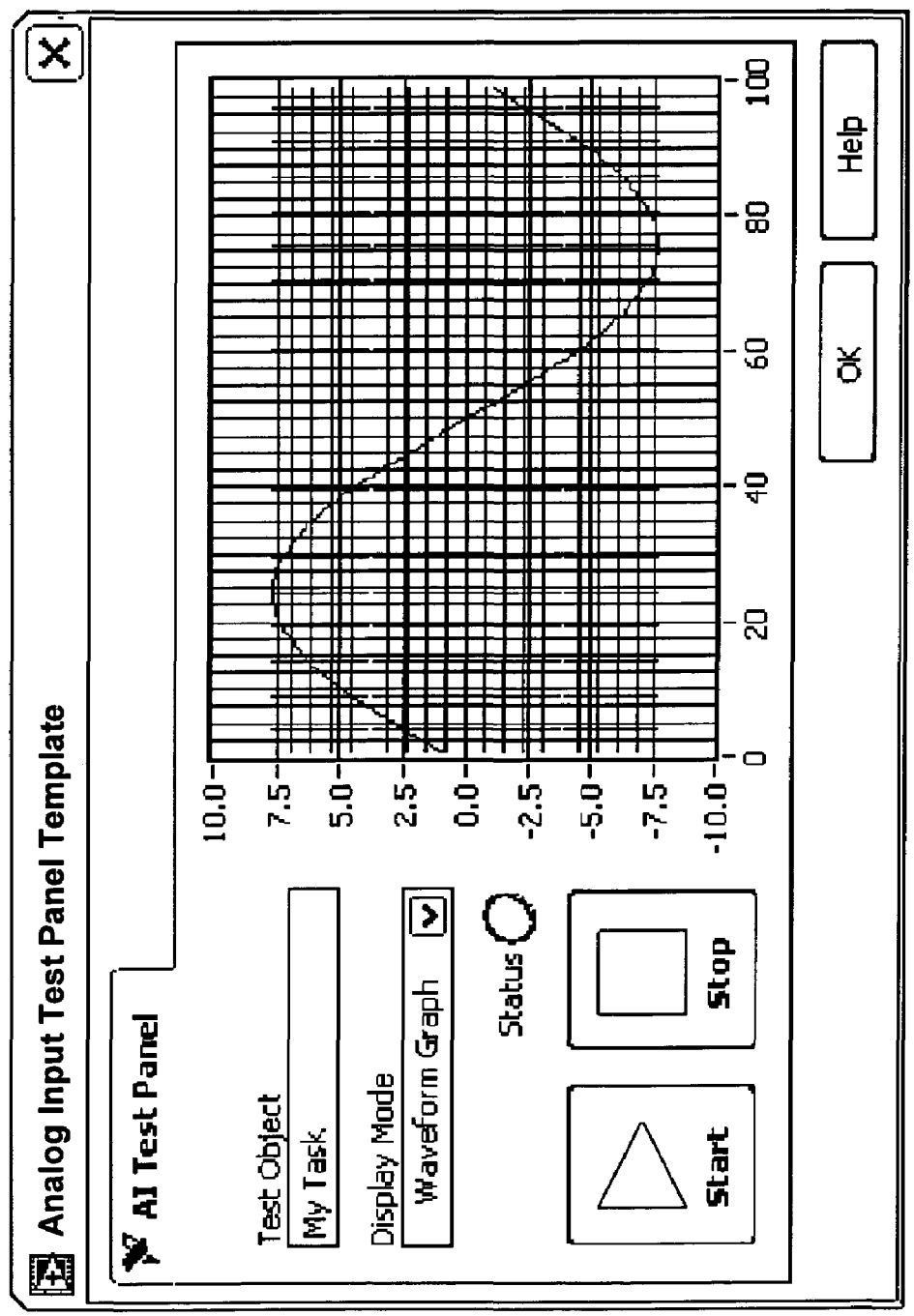
FIGS. 32A and 32B are example screen shots illustrating testing of the configured task, according to one embodiment.
Figure 32B:
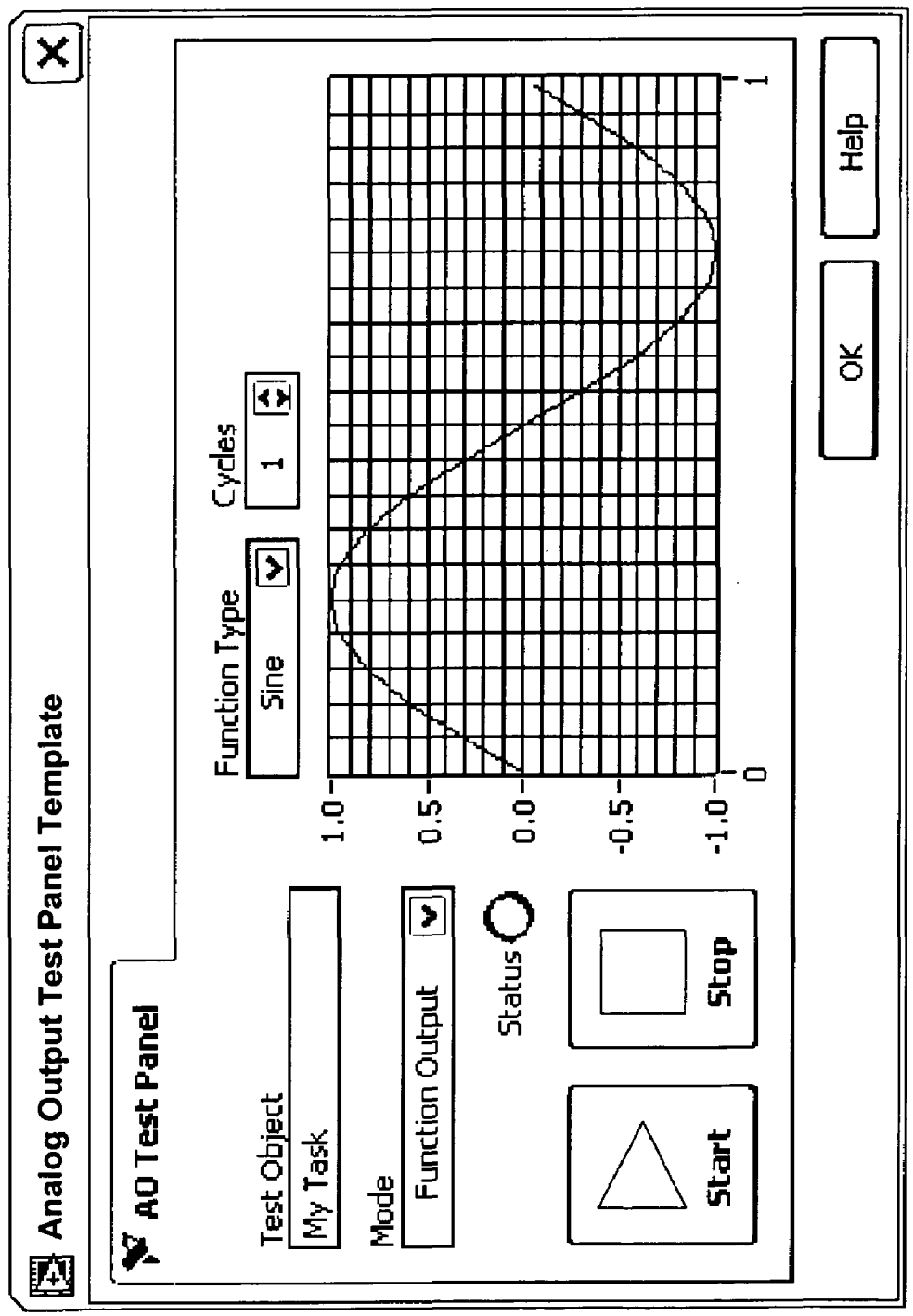

FIGS. 32A and 32B—Testing the Configured Task

In one embodiment, the measurement task specifier may provide the ability to test the current configuration settings. FIGS. 32A and 32B are example screen shots illustrating the testing of the configured task, according to one embodiment.

In one embodiment, one or more test panels may be displayed in response to user input, e.g., when the user presses the "run" button. These test panels may be unique to the current measurement type, or, in other embodiments, may be common across multiple measurement types. In one embodiment, as shown by FIGS. 32A and 32B, the user may be presented with the ability to run and stop the task. In the case of an input task, the user may see a graph of the acquired data, as shown in the Analog Input Test Panel of FIG. 32A. In the case of an output task, the user may be presented with the option to generate sample data to output, as shown in the Analog Output Test Panel of FIG. 32B. Such sample data may include Sine, Triangle, Square, and Sawtooth waveforms, among others.

It should be noted that the examples presented in FIGS. 32A and 32B are meant to be illustrative only, and are not intended to limit the form or capabilities of the testing capabilities to any particular architecture or feature set.

It should be noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the system and method of the present invention have been described in connection with several embodiments, the invention is not intended to be limited to the specific forms set forth herein, but on the contrary, it is intended to cover such alternatives, modifications, and equivalents as may be reasonably included within the spirit and scope of the invention as defined by the appended claims.

We claim:

1. A computer-implemented method for generating a measurement task specification for performing a measurement task, the method comprising:

displaying a graphical user interface (GUI) which presents information for guiding a user in specifying a measurement task, wherein said displaying the graphical user interface comprises displaying a plurality of panels which guide the user in specifying the measurement task, wherein said displaying a plurality of panels comprises displaying a first panel, wherein the first panel presents options for specifying values of a first parameter of the measurement task;

receiving user input to the graphical user interface characterizing the measurement task, wherein the user input indicates parameter values for a plurality of parameters of the measurement task, wherein said receiving user input to the graphical user interface comprises receiving first user input to the first panel, wherein said first user input indicates a value of the first parameter;

storing the parameter values in a memory;

analyzing the parameter values; and generating a measurement task specification in response to said analyzing;

wherein said measurement task specification is useable to produce a program which implements the measurement task;

wherein said displaying a plurality of panels further comprises displaying a second panel, wherein the second panel presents information based on said indicated value of the first parameter; and wherein said options comprise a default value for the first parameter of the measurement task, and wherein said receiving first user input to the first panel comprises one of:

receiving first user input overriding said default value for the first parameter with said value of the first parameter; and receiving first user input indicating acceptance of said default value for the first parameter as said value of the first parameter.

2. A computer-implemented method for generating a measurement task specification for performing a measurement task, the method comprising:

displaying a graphical user interface (GUI) which presents information for guiding a user in specifying a measurement task, wherein said displaying the graphical user interface comprises displaying a plurality of panels which guide the user in specifying the measurement task, wherein said displaying a plurality of panels comprises displaying a first panel, wherein the first panel presents options for specifying values of a first parameter of the measurement task;

receiving user input to the graphical user interface characterizing the measurement task, wherein the user input indicates parameter values for a plurality of parameters of the measurement task, wherein said receiving user input to the graphical user interface comprises receiving first user input to the first panel, wherein said first user input indicates a value of the first parameter;

storing the parameter values in a memory;

analyzing the parameter values; and generating a measurement task specification in response to said analyzing;

wherein said measurement task specification is useable to produce a program which implements the measurement task;

wherein said displaying a plurality of panels further comprises displaying a second panel, wherein the second panel presents information based on said indicated value of the first parameter, wherein said information presented by said second panel indicates a second parameter of the measurement task, and wherein said information presented by said second panel comprises a default value for the second parameter of the measurement task;

wherein said receiving user input to the graphical user interface further comprises receiving second user input to the second panel indicating a value of said second parameter of the measurement task;

wherein said receiving second user input to the second panel comprises one of:

receiving second user input overriding said default value of said second parameter with said value of said second parameter; and receiving second user input indicating acceptance of said default parameter value of said second parameter as said value of said second parameter.

3. A computer-implemented method for generating a measurement task specification for performing a measurement task, the method comprising:

displaying a graphical user interface (GUI) which presents information for guiding a user in specifying a measurement task, wherein said displaying the graphical user interface comprises displaying a plurality of panels which guide the user in specifying the measurement task, wherein said displaying a plurality of panels comprises displaying a first panel, wherein the first panel presents a list of measurement types for the measurement task;

receiving user input to the graphical user interface characterizing the measurement task, wherein the user input indicates parameter values for a plurality of parameters of the measurement task, wherein said receiving user input to said graphical user interface comprises receiving first user input to the first panel, wherein said first user input indicates a measurement type for the measurement task;

storing the parameter values in a memory;

analyzing the parameter values; and generating a measurement task specification in response to said analyzing;

wherein said measurement task specification is useable to produce a program which implements the measurement task;

wherein displaying a plurality of panels further comprises:

displaying a second panel in response to said first user input, wherein the second panel presents a list of available devices and corresponding channels, and wherein said list of available devices corresponds to said indicated measurement type; and wherein said receiving user input to the graphical user interface further comprises:

receiving second user input to the second panel, wherein said second user input indicates one or more channels for a device from said list of available devices and corresponding channels, and wherein each of the one or more channels corresponds to a terminal of said device.

4. The computer-implemented method of claim 3, wherein displaying a plurality of panels further comprises:

displaying a third panel in response to said second user input, wherein the third panel presents options for specifying values of one or more parameters for said indicated one or more channels; and wherein said receiving user input to the graphical user interface further comprises:

receiving third user input to the third panel, wherein said third user input indicates values of said one or more parameters for said indicated one or more channels.

5. The computer-implemented method of claim 3, wherein displaying a plurality of panels further comprises:

displaying two or more panel selection controls, wherein each of the two or more panel selection controls corresponds to a respective panel for specifying values of one or more parameters for said indicated one or more channels;

wherein said receiving user input to the graphical user interface further comprises:

receiving user selection input to one of said two or more panel selection controls;

wherein displaying a plurality of panels further comprises:

displaying the respective panel corresponding to said selected panel selection control, wherein said respective panel presents options for specifying values of said one or more parameters for said indicated one or more channels; and wherein said receiving user input to the graphical user interface further comprises:

receiving third user input to the respective panel, wherein said third user input indicates values of said one or more parameters for said indicated one or more channels.

6. The computer-implemented method of claim 3, wherein said displaying a plurality of panels further comprises:

displaying a device settings panel, wherein the device settings panel presents one or more device settings parameters for the measurement task, and wherein said one or more device settings parameters correspond to said device; and wherein said receiving user input to said graphical user interface comprises:

receiving user input to the device settings panel, wherein said user input to the device settings panel indicates values for said one or more device settings parameters for the measurement task.

7. A computer-implemented method for generating a measurement task specification for performing a measurement task, the method comprising:

displaying a graphical user interface (GUI) which presents information for guiding a user in specifying a measurement task, wherein said displaying a graphical user interface comprises displaying a plurality of GUI elements, wherein each of at least a subset of the plurality of GUI elements presents one or more parameters for the measurement task;

receiving user input to the graphical user interface characterizing the measurement task, wherein the user input indicates parameter values for a plurality of parameters of the measurement task, wherein said receiving user input to the graphical user interface comprises at least one of said plurality of GUI elements receiving user input specifying respective values for said one or more parameters;

storing the parameter values in a memory;

analyzing the parameter values; and generating a measurement task specification in response to said analyzing;

wherein said measurement task specification is useable to produce a program which implements the measurement task;

wherein at least one of said at least a subset of the plurality of GUI elements includes respective default values for said one or more parameters; and wherein said receiving user input specifying respective values for said one or more parameters comprises one of:

receiving user input overriding one or more of said respective default values with one or more of said specified respective values; and receiving user input indicating acceptance of one or more of said respective default values as one or more of said specified respective values.

8. The computer-implemented method of claim 7, wherein said displaying a graphical user interface comprises:

displaying context sensitive help information, wherein the context sensitive help information displayed is based on which of the plurality of GUI elements are currently displayed.

9. A computer-implemented method for generating a measurement task specification for performing a measurement task, the method comprising:

displaying a graphical user interface (GUI) which presents information for guiding a user in specifying a measurement task, wherein said displaying a graphical user interface comprises displaying a plurality of GUI elements, wherein each of at least a subset of the plurality of GUI elements presents one or more parameters for the measurement task;

receiving user input to the graphical user interface characterizing the measurement task, wherein the user input indicates parameter values for a plurality of parameters of the measurement task, wherein said receiving user input to the graphical user interface comprises at least one of said plurality of GUI elements receiving user input specifying respective values for said one or more parameters;

storing the parameter values in a memory;

analyzing the parameter values; and generating a measurement task specification in response to said analyzing;

wherein said measurement task specification is useable to produce a program which implements the measurement task;

wherein said displaying a plurality of GUI elements comprises:

displaying a list of measurement types for the measurement task; and wherein said receiving user input to the graphical user interface comprises:

receiving first user input indicating a measurement type from said list of measurement types;

wherein said displaying a graphical user interface further comprises:

displaying a list of available devices and corresponding channels in response to said first user input, wherein said list of available devices corresponds to said indicated measurement type; and wherein said receiving user input to the graphical user interface further comprises:

receiving second user input indicating one or more channels for a device from said list of available devices and corresponding channels, wherein each of the one or more channels corresponds to a terminal of said device.

10. The computer-implemented method of claim 9, wherein said displaying a graphical user interface further comprises:

displaying one or more GUI elements for specifying values of one or more parameters for said indicated one or more channels; and wherein said receiving user input to the graphical user interface further comprises:

receiving third user input to said one or more GUI elements indicating values of said one or more parameters for said indicated one or more channels.

11. The computer-implemented method of claim 9, wherein said displaying a graphical user interface further comprises:

displaying two or more selection GUI elements, wherein each of the two or more selection GUI elements corresponds to a respective set of one or more GUI elements for specifying values of one or more parameters for said indicated one or more channels;

wherein said receiving user input to the graphical user interface further comprises:

receiving user selection input to one of said two or more selection GUI elements;

wherein said displaying a graphical user interface further comprises:

displaying the respective set of one or more GUI elements corresponding to said selected selection GUI element, wherein said respective set of one or more GUI elements is useable for specifying values of said one or more parameters for said indicated one or more channels; and wherein said receiving user input to the graphical user interface further comprises:

receiving third user input to the respective set of one or more GUI elements, wherein said third user input indicates values of said one or more parameters for said indicated one or more channels.

12. The computer-implemented method of claim 9, wherein said displaying a graphical user interface further comprises:

displaying one or more device settings GUI elements for specifying one or more device settings parameters for the measurement task, and wherein said one or more device settings parameters correspond to said device; and wherein said receiving user input to said graphical user interface comprises:

receiving third user input to the one or more device settings GUI elements, wherein said third user input indicates values for said one or more device settings parameters for the measurement task.

13. A computer-implemented method for generating a measurement task specification for performing a measurement task, the method comprising:

displaying a graphical user interface (GUI) which presents information for guiding a user in specifying a measurement task;

receiving user input to the graphical user interface characterizing the measurement task, wherein the user input indicates parameter values for a plurality of parameters of the measurement task;

storing the parameter values in a memory;

analyzing the parameter values; and generating a measurement task specification in response to said analyzing;

wherein said measurement task specification is useable to produce a program which implements the measurement task;

automatically generating the program based on the parameter values, wherein the program is executable to perform the measurement task, wherein said automatically generating the program based on the parameter values comprises:

an expert system analyzing the measurement task specification, and generating a run-time specification for the measurement task in response to said analyzing; and a run-time builder analyzing the run-time specification, and generating a run-time based on the run-time specification, wherein said run-time is executable to perform the measurement task.

14. The computer-implemented method of claim 13, wherein said expert system analyzing the measurement task specification, and generating a run-time specification further comprises:

the expert system validating the measurement task specification prior to said generating the run-time specification.

15. The computer-implemented method of claim 13, wherein said run-time builder analyzing the run-time specification, and generating a run-time automatically further comprises:

the run-time builder configuring one or more measurement devices according to the run-time specification, wherein said run-time is executable to perform the measurement task using the configured one or more measurement devices.

* * * * *